US009123935B2

(12) United States Patent
Huang

(10) Patent No.: US 9,123,935 B2
(45) Date of Patent: *Sep. 1, 2015

(54) WIRELESS COMMUNICATION ACCESSORY FOR A MOBILE DEVICE

(75) Inventor: Daniel Huang, Irvine, CA (US)

(73) Assignee: mophie, Inc., Tustin, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 13/492,785

(22) Filed: Jun. 8, 2012

(65) Prior Publication Data

US 2012/0303520 A1 Nov. 29, 2012

Related U.S. Application Data

(63) Continuation-in-part of application No. 12/357,262, filed on Jan. 21, 2009, now Pat. No. 8,367,235.

(60) Provisional application No. 61/495,848, filed on Jun. 10, 2011, provisional application No. 61/021,897, filed on Jan. 18, 2008.

(51) Int. Cl.
*H01M 2/10* (2006.01)
*H01M 6/04* (2006.01)
(Continued)

(52) U.S. Cl.
CPC ............. *H01M 2/1066* (2013.01); *A45C 11/00* (2013.01); *A45C 15/00* (2013.01); *H01M 10/46* (2013.01);
(Continued)

(58) Field of Classification Search
USPC ................... 429/96, 100, 188, 98; 361/679.56
IPC .......... H04M 2001/0204; H01M 2/1066,2/1016
See application file for complete search history.

(56) References Cited

U.S. PATENT DOCUMENTS

D267,795 S 2/1983 Mallon
4,479,596 A 10/1984 Swanson
(Continued)

FOREIGN PATENT DOCUMENTS

CN 201252577 Y 6/2009
CN 202364273 U 8/2012
(Continued)

OTHER PUBLICATIONS

International Search Report for PCT/US2011/037249 mailed Jul. 13, 2011.
(Continued)

*Primary Examiner* — Patrick Ryan
*Assistant Examiner* — Julian Anthony
(74) *Attorney, Agent, or Firm* — Knobbe, Martens, Olson & Bear, LLP

(57) ABSTRACT

A wireless communication accessory for a mobile communication device comprising: a casing that conforms, at least partially, to the outer shape of the mobile communication device; a processing circuit housed within the casing and configured to process a first data; and a wireless transmitter coupled to the processing circuit, where the transmitter is configured to transmit the first data. The wireless communication accessory may further comprise a wireless receiver that is configured to receive a second data from an external wireless device. The first data may be associated with any or all of the following: payment card information for processing purchase transactions; public transportation account information for processing travel credits on public transportation systems; and access card information for gaining access into restricted areas.

33 Claims, 47 Drawing Sheets

(51) Int. Cl.
*G06F 1/16* (2006.01)
*H05K 5/00* (2006.01)
*H05K 7/00* (2006.01)
*H01M 10/46* (2006.01)
*A45C 11/00* (2006.01)
*A45C 15/00* (2006.01)
*H04B 1/3888* (2015.01)
*H04B 1/3877* (2015.01)
*H04M 1/18* (2006.01)
*H04M 1/725* (2006.01)
*H02J 7/00* (2006.01)
*H04M 1/02* (2006.01)

(52) U.S. Cl.
CPC ............ *H04B 1/3877* (2013.01); *H04B 1/3888* (2013.01); *H04M 1/185* (2013.01); *H04M 1/72575* (2013.01); *A45C 2011/002* (2013.01); *H02J 7/0045* (2013.01); *H04M 1/0262* (2013.01); *H04M 2250/14* (2013.01)

(56) References Cited

U.S. PATENT DOCUMENTS

| | | | |
|---|---|---|---|
| 4,515,272 A | 5/1985 | Newhouse | |
| D284,372 S | 6/1986 | Carpenter | |
| 4,951,817 A | 8/1990 | Barletta et al. | |
| D312,534 S | 12/1990 | Nelson et al. | |
| 5,001,772 A | 3/1991 | Holcomb et al. | |
| D322,719 S | 12/1991 | Jayez | |
| D327,868 S | 7/1992 | Oka | |
| 5,360,108 A | 11/1994 | Alagia | |
| 5,368,159 A | 11/1994 | Doria | |
| 5,383,091 A | 1/1995 | Snell | |
| 5,386,084 A | 1/1995 | Risko | |
| 5,508,123 A | 4/1996 | Fan | |
| D372,896 S | 8/1996 | Nagele et al. | |
| 5,586,002 A | 12/1996 | Notarianni | |
| 5,604,050 A | 2/1997 | Brunette et al. | |
| 5,610,979 A | 3/1997 | Yu | |
| D384,327 S | 9/1997 | Nakui | |
| 5,708,707 A | 1/1998 | Halttlunen et al. | |
| 5,711,013 A | 1/1998 | Collett et al. | |
| D392,248 S | 3/1998 | Johansson | |
| D392,939 S | 3/1998 | Finke-Anlauff | |
| 5,786,106 A | 7/1998 | Armani | |
| 5,816,459 A | 10/1998 | Armistead | |
| D400,495 S | 11/1998 | Deslyper et al. | |
| D400,496 S | 11/1998 | Barber et al. | |
| 5,859,481 A | 1/1999 | Banyas | |
| 5,864,766 A | 1/1999 | Chiang | |
| D405,801 S | 2/1999 | Nagele et al. | |
| D407,063 S | 3/1999 | Reis et al. | |
| 5,876,351 A | 3/1999 | Rohde | |
| D407,708 S | 4/1999 | Nagele et al. | |
| 5,896,277 A | 4/1999 | Leon et al. | |
| 5,959,433 A | 9/1999 | Rohde | |
| 5,973,477 A | 10/1999 | Chang | |
| D417,189 S | 11/1999 | Amero, Jr. et al. | |
| 6,043,626 A | 3/2000 | Snyder et al. | |
| D424,512 S | 5/2000 | Ho | |
| 6,081,595 A | 6/2000 | Picaud | |
| D428,019 S | 7/2000 | Amron | |
| 6,082,535 A | 7/2000 | Mitchell | |
| 6,171,138 B1 | 1/2001 | Le Febvre et al. | |
| D438,004 S | 2/2001 | Watson et al. | |
| 6,184,654 B1 | 2/2001 | Bachner, III et al. | |
| D439,218 S | 3/2001 | Yu | |
| 6,201,867 B1 | 3/2001 | Koike | |
| 6,208,115 B1 | 3/2001 | Binder | |
| 6,266,539 B1 | 7/2001 | Pardo | |
| D446,497 S | 8/2001 | Yu | |
| 6,273,252 B1 | 8/2001 | Mitchell | |
| D447,462 S | 9/2001 | Kosiba | |
| 6,313,982 B1 | 11/2001 | Hino | |
| 6,317,313 B1 | 11/2001 | Mosgrove et al. | |
| 6,324,380 B1 | 11/2001 | Kiuchi et al. | |
| 6,346,791 B1 | 2/2002 | Barguirdjian | |
| 6,405,056 B1 | 6/2002 | Altschul et al. | |
| D460,411 S | 7/2002 | Wang | |
| D460,761 S | 7/2002 | Croley | |
| 6,415,138 B2 | 7/2002 | Sirola et al. | |
| 6,445,577 B1 | 9/2002 | Madsen et al. | |
| 6,471,056 B1 | 10/2002 | Tzeng | |
| D469,427 S | 1/2003 | Ma et al. | |
| 6,536,589 B2 | 3/2003 | Chang | |
| 6,538,413 B1 | 3/2003 | Beard et al. | |
| D472,384 S | 4/2003 | Richardson | |
| 6,552,513 B1 | 4/2003 | Li | |
| 6,555,990 B1 | 4/2003 | Yang | |
| 6,583,601 B2 | 6/2003 | Simoes et al. | |
| 6,614,722 B2 | 9/2003 | Polany et al. | |
| 6,626,362 B1 | 9/2003 | Steiner et al. | |
| D481,716 S | 11/2003 | He et al. | |
| D482,529 S | 11/2003 | Hardigg et al. | |
| 6,646,864 B2 | 11/2003 | Richardson | |
| D484,874 S | 1/2004 | Chang et al. | |
| D485,834 S | 1/2004 | Davetas | |
| 6,681,003 B2 | 1/2004 | Linder et al. | |
| 6,701,159 B1 | 3/2004 | Powell | |
| 6,708,887 B1 | 3/2004 | Garrett et al. | |
| 6,714,802 B1 | 3/2004 | Barvesten | |
| 6,785,566 B1 | 8/2004 | Irizarry | |
| 6,819,549 B1 | 11/2004 | Lammers-Meis et al. | |
| D500,041 S | 12/2004 | Tsujimoto | |
| D506,612 S | 6/2005 | Rosa et al. | |
| D508,495 S | 8/2005 | Bone et al. | |
| D513,123 S | 12/2005 | Richardson et al. | |
| 6,980,777 B2 | 12/2005 | Shepherd et al. | |
| D513,451 S | 1/2006 | Richardson et al. | |
| 6,992,461 B2 | 1/2006 | Liang et al. | |
| D514,808 S | 2/2006 | Morine et al. | |
| D516,309 S | 3/2006 | Richardson et al. | |
| D516,553 S | 3/2006 | Richardson et al. | |
| D516,554 S | 3/2006 | Richardson et al. | |
| D516,807 S | 3/2006 | Richardson et al. | |
| D517,007 S | 3/2006 | Yong-Jian et al. | |
| D520,744 S | 5/2006 | Pangerc et al. | |
| 7,050,841 B1 | 5/2006 | Onda | |
| 7,069,063 B2 | 6/2006 | Halkosaari et al. | |
| D525,582 S | 7/2006 | Chan | |
| 7,072,699 B2 | 7/2006 | Eiden | |
| 7,079,879 B1 | 7/2006 | Sylvester et al. | |
| 7,081,736 B2 | 7/2006 | Seil et al. | |
| D526,780 S | 8/2006 | Richardson et al. | |
| D526,958 S | 8/2006 | Shimizu | |
| D530,079 S | 10/2006 | Thomas et al. | |
| D535,252 S | 1/2007 | Sandnes | |
| 7,158,376 B2 | 1/2007 | Richardson et al. | |
| 7,166,987 B2 | 1/2007 | Lee et al. | |
| D537,063 S | 2/2007 | Kim et al. | |
| 7,180,735 B2 | 2/2007 | Thomas et al. | |
| 7,180,754 B2 | 2/2007 | Qin et al. | |
| 7,194,291 B2 | 3/2007 | Peng | |
| D540,539 S | 4/2007 | Gutierrez | |
| 7,203,467 B2 | 4/2007 | Siddiqui | |
| D542,286 S | 5/2007 | Taniyama et al. | |
| D542,524 S | 5/2007 | Richardson et al. | |
| D543,541 S | 5/2007 | Chung et al. | |
| D544,486 S | 6/2007 | Hussaini et al. | |
| 7,230,823 B2 | 6/2007 | Richardson et al. | |
| D547,056 S | 7/2007 | Griffin et al. | |
| D547,057 S | 7/2007 | Griffin et al. | |
| D550,455 S | 9/2007 | Barnhart | |
| D551,252 S | 9/2007 | Andre et al. | |
| 7,266,391 B2 | 9/2007 | Warren | |
| D551,856 S | 10/2007 | Ko et al. | |
| D553,857 S | 10/2007 | Pendergraph et al. | |
| D556,679 S | 12/2007 | Weinstein et al. | |
| D556,681 S | 12/2007 | Kim | |
| D557,205 S | 12/2007 | Kim | |
| D557,264 S | 12/2007 | Richardson et al. | |
| D557,494 S | 12/2007 | Mayette et al. | |
| D557,897 S | 12/2007 | Richardson et al. | |

(56) References Cited

U.S. PATENT DOCUMENTS

| | | |
|---|---|---|
| 7,312,984 B2 | 12/2007 | Richardson et al. |
| D558,667 S | 1/2008 | Park et al. |
| D558,757 S | 1/2008 | Andre et al. |
| D558,972 S | 1/2008 | Oh |
| D558,973 S | 1/2008 | Hussaini et al. |
| D559,267 S | 1/2008 | Griffin |
| D560,229 S | 1/2008 | Yagi |
| D561,092 S | 2/2008 | Kim |
| 7,336,973 B2 | 2/2008 | Goldthwaite et al. |
| D563,093 S | 3/2008 | Nussberger |
| 7,343,184 B2 | 3/2008 | Rostami |
| D565,291 S | 4/2008 | Brandenburg et al. |
| 7,397,658 B2 | 7/2008 | Finke-Anlauff et al. |
| 7,400,917 B2 | 7/2008 | Wood et al. |
| D574,326 S | 8/2008 | Lim |
| D574,819 S | 8/2008 | Andre et al. |
| D575,056 S | 8/2008 | Tan |
| 7,428,427 B2 | 9/2008 | Brunstrom et al. |
| D577,904 S | 10/2008 | Sasaki |
| D581,151 S | 11/2008 | Aipa |
| D581,155 S | 11/2008 | Richardson et al. |
| D581,421 S | 11/2008 | Richardson et al. |
| D582,149 S | 12/2008 | Tan |
| 7,464,814 B2 | 12/2008 | Carnevali |
| D584,732 S | 1/2009 | Cho et al. |
| 7,479,759 B2 | 1/2009 | Vilanov et al. |
| D587,008 S | 2/2009 | Richardson et al. |
| D587,896 S | 3/2009 | Aipa |
| D589,016 S | 3/2009 | Richardson et al. |
| 7,536,099 B2 | 5/2009 | Dalby et al. |
| D593,319 S | 6/2009 | Richardson et al. |
| D593,746 S | 6/2009 | Richardson et al. |
| D594,849 S | 6/2009 | Ko |
| 7,555,325 B2 | 6/2009 | Goros |
| D597,089 S | 7/2009 | Khan et al. |
| 7,562,813 B2 * | 7/2009 | Humphrey et al. ........... 235/379 |
| D597,301 S | 8/2009 | Richardson et al. |
| D598,407 S | 8/2009 | Richardson et al. |
| 7,577,462 B2 | 8/2009 | Kumar |
| D600,640 S | 9/2009 | Stein et al. |
| D600,908 S | 9/2009 | Richardson et al. |
| D601,955 S | 10/2009 | Ekmekdje |
| D601,959 S | 10/2009 | Lee et al. |
| D601,960 S | 10/2009 | Dai |
| 7,609,512 B2 | 10/2009 | Richardson et al. |
| D603,602 S | 11/2009 | Richardson et al. |
| D603,603 S | 11/2009 | Laine et al. |
| 7,612,997 B1 | 11/2009 | Diebel et al. |
| D605,850 S | 12/2009 | Richardson et al. |
| D606,528 S | 12/2009 | Khan et al. |
| D606,529 S | 12/2009 | Ferrari et al. |
| 7,635,086 B2 | 12/2009 | Spencer, II |
| 7,638,969 B2 | 12/2009 | Woud |
| 7,647,082 B2 | 1/2010 | Holmberg |
| D609,228 S | 2/2010 | Ferrari et al. |
| D609,463 S | 2/2010 | Bullen |
| D610,538 S | 2/2010 | Wu et al. |
| 7,656,120 B2 | 2/2010 | Neu et al. |
| 7,663,878 B2 | 2/2010 | Swan et al. |
| 7,667,433 B1 | 2/2010 | Smith |
| D610,807 S | 3/2010 | Bau |
| D611,042 S | 3/2010 | Ferrari et al. |
| D611,478 S | 3/2010 | Richardson et al. |
| D613,282 S | 4/2010 | Richardson et al. |
| D615,077 S | 5/2010 | Richardson et al. |
| D615,535 S | 5/2010 | Richardson et al. |
| D615,536 S | 5/2010 | Richardson et al. |
| D615,967 S | 5/2010 | Richardson et al. |
| D616,360 S | 5/2010 | Huang |
| D616,361 S | 5/2010 | Huang |
| D617,753 S | 6/2010 | Cheng |
| D617,784 S | 6/2010 | Richardson et al. |
| D617,785 S | 6/2010 | Richardson et al. |
| D617,786 S | 6/2010 | Richardson et al. |
| D617,787 S | 6/2010 | Richardson et al. |
| D618,231 S | 6/2010 | Fahrendorff et al. |
| 7,733,637 B1 | 6/2010 | Lam |
| D619,573 S | 7/2010 | Khan et al. |
| D619,574 S | 7/2010 | Richardson et al. |
| D619,991 S | 7/2010 | Huang |
| D620,487 S | 7/2010 | Richardson et al. |
| D621,394 S | 8/2010 | Richardson et al. |
| D621,395 S | 8/2010 | Richardson et al. |
| D621,821 S | 8/2010 | Richardson et al. |
| D621,822 S | 8/2010 | Richardson et al. |
| 7,778,023 B1 | 8/2010 | Mohoney |
| 7,782,610 B2 | 8/2010 | Diebel et al. |
| D623,179 S | 9/2010 | Richardson et al. |
| D623,180 S | 9/2010 | Diebel |
| D623,638 S | 9/2010 | Richardson et al. |
| D623,639 S | 9/2010 | Richardson et al. |
| D623,640 S | 9/2010 | Freeman |
| D624,317 S | 9/2010 | Wenchel et al. |
| D624,533 S | 9/2010 | Richardson et al. |
| D624,908 S | 10/2010 | Huskinson |
| D624,909 S | 10/2010 | Huskinson |
| D624,910 S | 10/2010 | Richardson et al. |
| D625,303 S | 10/2010 | Kim |
| D626,120 S | 10/2010 | Richardson et al. |
| D626,121 S | 10/2010 | Richardson et al. |
| D626,538 S | 11/2010 | Brown et al. |
| D626,539 S | 11/2010 | Brown et al. |
| D626,540 S | 11/2010 | Brown et al. |
| D626,964 S | 11/2010 | Richardson et al. |
| D628,568 S | 12/2010 | Richardson et al. |
| D628,994 S | 12/2010 | Griffin, Jr. et al. |
| 7,859,222 B2 | 12/2010 | Woud |
| D631,246 S | 1/2011 | Boettner |
| 7,863,856 B2 | 1/2011 | Sherman et al. |
| 7,863,862 B2 | 1/2011 | Idzik et al. |
| D631,877 S | 2/2011 | Rak et al. |
| D632,648 S | 2/2011 | Yang |
| D632,683 S | 2/2011 | Richardson et al. |
| D632,684 S | 2/2011 | Richardson et al. |
| D632,685 S | 2/2011 | Richardson et al. |
| D632,686 S | 2/2011 | Magness et al. |
| 7,889,489 B2 | 2/2011 | Richardson et al. |
| 7,889,498 B2 | 2/2011 | Diebel et al. |
| D634,704 S | 3/2011 | Tieleman et al. |
| D634,741 S | 3/2011 | Richardson et al. |
| 7,899,397 B2 | 3/2011 | Kumar |
| 7,907,394 B2 | 3/2011 | Richardson et al. |
| 7,911,530 B2 | 3/2011 | Sawachi |
| D636,386 S | 4/2011 | Richardson et al. |
| D636,387 S | 4/2011 | Willes et al. |
| 7,930,011 B2 | 4/2011 | Shi et al. |
| 7,933,122 B2 | 4/2011 | Richardson et al. |
| D637,588 S | 5/2011 | Richardson et al. |
| D637,589 S | 5/2011 | Willes et al. |
| D637,590 S | 5/2011 | Michie et al. |
| D637,591 S | 5/2011 | Willes et al. |
| D637,592 S | 5/2011 | Magness et al. |
| D637,952 S | 5/2011 | Tan |
| D638,005 S | 5/2011 | Richardson et al. |
| D638,411 S | 5/2011 | Willes et al. |
| D638,413 S | 5/2011 | Magness et al. |
| D638,414 S | 5/2011 | Magness et al. |
| D638,828 S | 5/2011 | Melanson et al. |
| D638,829 S | 5/2011 | Melanson et al. |
| D638,830 S | 5/2011 | Magness et al. |
| D639,731 S | 6/2011 | Sun |
| D640,679 S | 6/2011 | Willes et al. |
| D640,680 S | 6/2011 | Magness et al. |
| 7,957,524 B2 | 6/2011 | Chipping |
| D641,013 S | 7/2011 | Richardson et al. |
| D641,014 S | 7/2011 | Smith et al. |
| D641,974 S | 7/2011 | Stampfli |
| D642,170 S | 7/2011 | Johnson et al. |
| D642,171 S | 7/2011 | Melanson et al. |
| D642,558 S | 8/2011 | Magness et al. |
| D643,029 S | 8/2011 | Feng |
| D643,424 S | 8/2011 | Richardson et al. |
| D644,215 S | 8/2011 | Dong |
| D644,216 S | 8/2011 | Richardson et al. |

(56) References Cited

U.S. PATENT DOCUMENTS

| | | |
|---|---|---|
| D644,219 S | 8/2011 | Sawada |
| 7,988,010 B2 | 8/2011 | Yang et al. |
| 8,004,962 B2 | 8/2011 | Yang et al. |
| D644,635 S | 9/2011 | Richardson et al. |
| D644,639 S | 9/2011 | Weller et al. |
| D647,084 S | 10/2011 | Fathollahi |
| D647,108 S | 10/2011 | Lee |
| 8,028,794 B1 | 10/2011 | Freeman |
| 8,046,039 B2 | 10/2011 | Lee et al. |
| D648,714 S | 11/2011 | Jones, III et al. |
| D648,715 S | 11/2011 | Jones, III et al. |
| D648,716 S | 11/2011 | Jones, III et al. |
| D648,717 S | 11/2011 | Fahrendorff et al. |
| D649,143 S | 11/2011 | Jones, III et al. |
| D649,539 S | 11/2011 | Hong |
| D650,810 S | 12/2011 | Lemelman et al. |
| D652,827 S | 1/2012 | Fahrendorff et al. |
| D652,828 S | 1/2012 | Fahrendorff et al. |
| D653,202 S | 1/2012 | Hasbrook et al. |
| D653,659 S | 2/2012 | Fahrendorff et al. |
| D654,069 S | 2/2012 | Kwon |
| D654,483 S | 2/2012 | Richardson et al. |
| D654,931 S | 2/2012 | Lemelman et al. |
| D655,281 S | 3/2012 | Turocy |
| D655,699 S | 3/2012 | Bau |
| D656,495 S | 3/2012 | Andre et al. |
| D658,165 S | 4/2012 | Freeman |
| 8,150,485 B2 | 4/2012 | Lee |
| D658,643 S | 5/2012 | Fahrendorff et al. |
| 8,167,127 B2 | 5/2012 | Martin et al. |
| D662,923 S | 7/2012 | Piedra et al. |
| D663,263 S | 7/2012 | Gupta et al. |
| D663,319 S | 7/2012 | Chen et al. |
| D664,091 S | 7/2012 | Pliner et al. |
| 8,224,408 B2 | 7/2012 | Tomasini et al. |
| D665,386 S | 8/2012 | Fathollahi |
| D665,735 S | 8/2012 | Kang et al. |
| 8,245,842 B2 | 8/2012 | Bau |
| 8,247,102 B2 | 8/2012 | Hua |
| D667,783 S | 9/2012 | Zhang et al. |
| D670,281 S | 11/2012 | Corpuz et al. |
| D670,689 S | 11/2012 | Wang |
| D671,105 S | 11/2012 | Rothbaum et al. |
| D671,106 S | 11/2012 | Rothbaum et al. |
| D671,493 S | 11/2012 | Hasbrook et al. |
| 8,321,619 B2 | 11/2012 | Kular et al. |
| 8,328,008 B2 | 12/2012 | Diebel et al. |
| D674,394 S | 1/2013 | Kajimoto |
| D675,603 S | 2/2013 | Melanson et al. |
| D676,032 S | 2/2013 | Stump et al. |
| D676,432 S | 2/2013 | Hasbrook et al. |
| 8,367,235 B2 | 2/2013 | Huang et al. |
| 8,380,264 B2 | 2/2013 | Hung et al. |
| D677,249 S | 3/2013 | Li et al. |
| D678,869 S | 3/2013 | Diebel |
| 8,393,466 B2 | 3/2013 | Rayner |
| D679,271 S | 4/2013 | Liu |
| D679,684 S | 4/2013 | Baker et al. |
| D682,196 S | 5/2013 | Leung |
| 8,452,242 B2 | 5/2013 | Spencer, II |
| 8,457,701 B2 | 6/2013 | Diebel |
| D685,356 S | 7/2013 | Diebel |
| D686,152 S | 7/2013 | Lee et al. |
| D686,606 S | 7/2013 | Hong |
| 8,483,758 B2 | 7/2013 | Huang |
| D687,426 S | 8/2013 | Requa |
| 8,499,933 B2 | 8/2013 | Ziemba |
| 8,505,718 B2 | 8/2013 | Griffin, Jr. et al. |
| 8,509,864 B1 | 8/2013 | Diebel |
| 8,531,833 B2 | 9/2013 | Diebel et al. |
| D691,990 S | 10/2013 | Rayner |
| 8,560,014 B1 | 10/2013 | Hu et al. |
| D693,801 S | 11/2013 | Rayner |
| 8,579,172 B2 | 11/2013 | Monaco et al. |
| D696,234 S | 12/2013 | Wright |
| D697,502 S | 1/2014 | Chu et al. |
| D704,688 S | 5/2014 | Reivo et al. |
| D710,795 S | 8/2014 | Gupta et al. |
| D711,312 S | 8/2014 | Tien |
| 8,917,506 B2 | 12/2014 | Diebel et al. |
| D721,356 S | 1/2015 | Hasbrook et al. |
| D721,685 S | 1/2015 | Hasbrook et al. |
| D721,687 S | 1/2015 | To et al. |
| 2001/0054148 A1 | 12/2001 | Hoornaert et al. |
| 2002/0111189 A1 | 8/2002 | Chou |
| 2002/0147035 A1 | 10/2002 | Su |
| 2002/0197965 A1 | 12/2002 | Peng |
| 2003/0000984 A1 | 1/2003 | Vick, III |
| 2003/0096642 A1 | 5/2003 | Bessa et al. |
| 2003/0151890 A1 | 8/2003 | Huang et al. |
| 2003/0218445 A1 | 11/2003 | Behar |
| 2003/0228866 A1 | 12/2003 | Pezeshki |
| 2004/0096054 A1 | 5/2004 | Nuovo |
| 2004/0097256 A1 | 5/2004 | Kujawski |
| 2004/0104268 A1 | 6/2004 | Bailey |
| 2004/0268005 A1 | 12/2004 | Dickie |
| 2005/0088141 A1 | 4/2005 | Lee et al. |
| 2005/0090301 A1 | 4/2005 | Lange et al. |
| 2005/0093510 A1 | 5/2005 | Seil et al. |
| 2005/0116684 A1 | 6/2005 | Kim |
| 2005/0231159 A1 | 10/2005 | Jones et al. |
| 2005/0247787 A1 | 11/2005 | Von Mueller et al. |
| 2005/0248312 A1 | 11/2005 | Cao et al. |
| 2005/0286212 A1 | 12/2005 | Brignone et al. |
| 2006/0010588 A1 | 1/2006 | Schuster et al. |
| 2006/0052064 A1 | 3/2006 | Goradesky |
| 2006/0058073 A1 | 3/2006 | Kim |
| 2006/0063569 A1 | 3/2006 | Jacobs et al. |
| 2006/0099999 A1 | 5/2006 | Park |
| 2006/0105722 A1 | 5/2006 | Kumar |
| 2006/0105824 A1 | 5/2006 | Kim et al. |
| 2006/0125445 A1 | 6/2006 | Cao et al. |
| 2006/0205447 A1 | 9/2006 | Park et al. |
| 2006/0255493 A1 | 11/2006 | Fouladpour |
| 2007/0004450 A1 | 1/2007 | Parikh |
| 2007/0019804 A1 | 1/2007 | Kramer |
| 2007/0093140 A1 | 4/2007 | Begic et al. |
| 2007/0123316 A1 | 5/2007 | Little |
| 2007/0142097 A1 | 6/2007 | Hamasaki et al. |
| 2007/0152633 A1 | 7/2007 | Lee |
| 2007/0161404 A1 | 7/2007 | Yasujima et al. |
| 2007/0167190 A1 | 7/2007 | Moosavi et al. |
| 2007/0225031 A1 | 9/2007 | Bodkin et al. |
| 2007/0236180 A1 | 10/2007 | Rodgers |
| 2007/0261978 A1 | 11/2007 | Sanderson |
| 2007/0262134 A1 | 11/2007 | Humphrey et al. |
| 2007/0297149 A1 | 12/2007 | Richardson et al. |
| 2008/0007214 A1 | 1/2008 | Cheng |
| 2008/0026794 A1 | 1/2008 | Warren |
| 2008/0026803 A1 | 1/2008 | Demuynck |
| 2008/0032758 A1 | 2/2008 | Rostami |
| 2008/0053770 A1 | 3/2008 | Tynyk |
| 2008/0096620 A1 | 4/2008 | Lee et al. |
| 2008/0108395 A1 | 5/2008 | Lee et al. |
| 2008/0119244 A1 | 5/2008 | Malhotra |
| 2008/0123287 A1 | 5/2008 | Rossell et al. |
| 2008/0132289 A1 | 6/2008 | Wood et al. |
| 2008/0150367 A1 | 6/2008 | Oh et al. |
| 2009/0009945 A1 | 1/2009 | Johnson et al. |
| 2009/0017883 A1 | 1/2009 | Lin |
| 2009/0051319 A1 | 2/2009 | Fang et al. |
| 2009/0069050 A1 | 3/2009 | Jain et al. |
| 2009/0073650 A1 | 3/2009 | Huang et al. |
| 2009/0096417 A1 | 4/2009 | Idzik et al. |
| 2009/0108800 A1 | 4/2009 | Woud |
| 2009/0111543 A1 | 4/2009 | Tai et al. |
| 2009/0114556 A1 | 5/2009 | Tai et al. |
| 2009/0117955 A1 | 5/2009 | Lo |
| 2009/0128092 A1 | 5/2009 | Woud |
| 2009/0143104 A1 | 6/2009 | Loh et al. |
| 2009/0144456 A1 | 6/2009 | Gelf et al. |
| 2009/0146898 A1 | 6/2009 | Akiho et al. |
| 2009/0160399 A1 | 6/2009 | Woud |
| 2009/0160400 A1 | 6/2009 | Woud |

(56) References Cited

U.S. PATENT DOCUMENTS

| | | | |
|---|---|---|---|
| 2009/0181729 | A1 | 7/2009 | Griffin, Jr. et al. |
| 2009/0186264 | A1 | 7/2009 | Huang |
| 2009/0205983 | A1 | 8/2009 | Estlander |
| 2009/0247244 | A1 | 10/2009 | Mittleman et al. |
| 2009/0284216 | A1 | 11/2009 | Bessa et al. |
| 2009/0301289 | A1 | 12/2009 | Gynes |
| 2009/0312058 | A9 | 12/2009 | Wood et al. |
| 2009/0314400 | A1 | 12/2009 | Liu |
| 2009/0325657 | A1 | 12/2009 | Ramsdell et al. |
| 2010/0013431 | A1 | 1/2010 | Liu |
| 2010/0022277 | A1 | 1/2010 | An et al. |
| 2010/0026589 | A1 | 2/2010 | Dou et al. |
| 2010/0048267 | A1 | 2/2010 | Lin |
| 2010/0064883 | A1 | 3/2010 | Gynes |
| 2010/0078343 | A1 | 4/2010 | Hoellwarth et al. |
| 2010/0088439 | A1 | 4/2010 | Ang et al. |
| 2010/0093412 | A1 | 4/2010 | Serra et al. |
| 2010/0096284 | A1 | 4/2010 | Bau |
| 2010/0113106 | A1 | 5/2010 | Supran |
| 2010/0195279 | A1 | 8/2010 | Michael |
| 2010/0200456 | A1 | 8/2010 | Parkinson |
| 2010/0203931 | A1 | 8/2010 | Hynecek et al. |
| 2010/0224519 | A1 | 9/2010 | Kao |
| 2010/0243516 | A1 | 9/2010 | Martin et al. |
| 2010/0302716 | A1 | 12/2010 | Gandhi |
| 2010/0328203 | A1 | 12/2010 | Hsu |
| 2011/0049005 | A1 | 3/2011 | Wilson et al. |
| 2011/0055447 | A1 | 3/2011 | Costa |
| 2011/0084081 | A1 | 4/2011 | Chung et al. |
| 2011/0090626 | A1 | 4/2011 | Hoellwarth et al. |
| 2011/0117974 | A1 | 5/2011 | Spitalnik et al. |
| 2011/0136555 | A1 | 6/2011 | Ramies et al. |
| 2011/0159324 | A1 | 6/2011 | Huang et al. |
| 2011/0199041 | A1 | 8/2011 | Yang |
| 2011/0253569 | A1 | 10/2011 | Lord |
| 2011/0259664 | A1 | 10/2011 | Freeman |
| 2011/0287726 | A1 | 11/2011 | Huang |
| 2011/0297578 | A1 | 12/2011 | Stiehl et al. |
| 2012/0013295 | A1 | 1/2012 | Yeh |
| 2012/0071214 | A1 | 3/2012 | Ash, Jr. et al. |
| 2012/0088555 | A1 | 4/2012 | Hu |
| 2012/0088558 | A1 | 4/2012 | Song |
| 2012/0122520 | A1 | 5/2012 | Phillips |
| 2012/0161696 | A1 | 6/2012 | Cook et al. |
| 2012/0209745 | A1 | 8/2012 | Spencer, II |
| 2012/0282977 | A1 | 11/2012 | Haleluk |
| 2013/0045775 | A1 | 2/2013 | Heywood |
| 2013/0084799 | A1 | 4/2013 | Marholev et al. |
| 2013/0189923 | A1 | 7/2013 | Lewin |
| 2013/0273983 | A1 | 10/2013 | HSU |
| 2013/0314880 | A1 | 11/2013 | Sun et al. |
| 2014/0065948 | A1 | 3/2014 | Huang |
| 2014/0165379 | A1 | 6/2014 | Diebel et al. |
| 2015/0010806 | A1 | 1/2015 | Huang et al. |

FOREIGN PATENT DOCUMENTS

| | | |
|---|---|---|
| CN | 202535667 U | 11/2012 |
| CN | 302573150 S | 9/2013 |
| JP | 8-18637 | 1/1996 |
| JP | 2000-175720 | 6/2000 |
| KR | 10-2005-0027961 | 3/2005 |
| KR | 10-2008-0017688 | 2/2008 |
| KR | 20-2010-0005030 | 5/2010 |
| KR | 10-2010-0132724 | 12/2010 |
| KR | 10-2011-0005507 | 1/2011 |
| TW | D156538 | 10/2013 |
| WO | WO 95/15619 | 6/1995 |
| WO | WO 97/33497 | 9/1997 |
| WO | WO 03/065227 A1 | 8/2003 |
| WO | WO 2008/151362 A2 | 12/2008 |

OTHER PUBLICATIONS

Written Opinion of the International Searching Authority for PCT/US2011/037249 mailed Jul. 13, 2011.
International Search Report for PCT/US2011/037254 mailed Jul. 13, 2011.
Written Opinion of the International Searching Authority for PCT/US2011/037254 mailed Jul. 13, 2011.
International Search Report for PCT/US2011/037244 mailed Jul. 19, 2011.
Written Opinion of the International Searching Authority for PCT/US2011/037244 mailed Jul. 19, 2011.
International Search Report for PCT/US2011/037257 mailed Sep. 22, 2011.
Written Opinion of the International Searching Authority for PCT/US2011/037257 mailed Sep. 22, 2011.
Mophie Juice Pack iPhone 1G Product Reference, May 1, 2008, 22 pages.
Horwitz, Jeremy; "Kensington Mini Battery Pack and Charger for iPhone and iPod," iLounge; May 16, 2008; available at http://www.ilounpe.com/index.php/reviews/entry/kensington-mini-battery-pack-and-charger-for-iphone-and-ipod/; retrieved May 12, 2009; 3 pages.
Rafferty, Sven; Mybat External Battery for iPhone and iPod; SvenOnTech; May 18, 2008; available at <http://sventech,com/reviews/?p=74>; retrieved May 12, 2009; 4 pages.
Rees, Dave; "Richard Solo Backup Battery for iPhone/iPod Review," The Gadgeteer Jun. 16, 2008; available at http://the-gadgeteer.com/2008/06/16/richard_solo_backup_battery_for_iphone_ipod/; retrieved May 12, 2009; 8 pages.
"Cheap DIY iPhone External Battery"; Michael Fisher's Web Log; Jul. 22, 2008; available at http://fastdad.wordpress.com/2008/07/22/cheap-diy-iphone-external-battery/>; retrieved May 12, 2009 10 pages.
Mophie Juice Pack iPhone 3G Product Reference, Aug. 4, 2008, 33 pages.
"Mini Battery Pack and Charger for iPhone and iPod," Kensington; Sep. 30, 2008; available at http://files.acco.com/KENSINGTON/K33442US/K33442US-usconsumer.pdf; retrieved May 12, 2009., 1 page.
Coldewey, Devin; "Combination iPhone battery pack and flash from FastMac," *CrunchGear*; Nov. 4, 2008; available at http://www.crunchgear.com/2008/11/04/combination-iphone-battery-pack-and-flash-from-fastmac/>; retrieved May 12, 2009; 3 pages.
Horwitz, Jeremy ; "iLuv i603/ i604 Rechargeable Lithium Polymer Batteries with Silicone Skin," iLounge; Jun. 27, 2006 available at http://www.ilounge.com/index.php/reviews/iluv-i603-rechargeable-lithium-polymer-battery-with-silicone-skin/>; retrieved May 12, 2009; 3 pages.
U.S. Appl. No. 14/517,492, file Oct. 17, 2014, Huang et al.
U.S. Appl. No. 14/547,060, filed Nov. 18, 2014, Huang.
U.S. Appl. No. 14/187,046, filed Feb. 21, 2014, To et al.
U.S. Appl. No. 14/205,024, filed Mar. 11, 2014, Huang et al.
U.S. Appl. No. 14/205,167, filed Mar. 11, 2014, Huang et al.
U.S. Appl. No. 29/406,346, filed Nov. 11, 2011, Brand.
U.S. Appl. No. 29/433,665, filed Oct. 3, 2012, Namminga et al.
U.S. Appl. No. 29/438,697, filed Nov. 30, 2012, Namminga et al.
U.S. Appl. No. 29/435,907, filed Oct. 30, 2012, To et al.
U.S. Appl. No. 29/438,877, filed Dec. 4, 2012, To et al.
U.S. Appl. No. 29/440,062, filed Dec. 18, 2012, To et al.
International Preliminary Report on Patentability for PCT/US2011/037244, dated Nov. 29, 2012.
International Preliminary Report on Patentability for PCT/US2011/037249, dated Nov. 29, 2012.
International Preliminary Report on Patentability for PCT/US2011/037254, dated Nov. 29, 2012.
International Preliminary Report on Patentability for PCT/US2011/037257, dated Nov. 29, 2012.
International Search Report and Written Opinion of the International Searching Authority for PCT/US2012/041768, dated Feb. 27, 2013.
International Preliminary Report on Patentability for PCT/US2012/041768, dated Dec. 27, 2013.
International Search Report and Written Opinion of the International Searching Authority for PCT/US2013/057276, dated Dec. 10, 2013.
International Search Report and Written Opinion of the International Searching Authority for PCT/US2014/017781, dated Jun. 8, 2014.

(56) References Cited

OTHER PUBLICATIONS

International Search Report and Written Opinion of the International Searching Authority for PCT/US2014/023592, dated Aug. 28, 2014.
Mophie Pulse for iPod Touch 4G, http://www.mophie.com/pulse-iPod-Touch-4th-Gen-vibrating-gaming-case-p/2015_PUL-T4-GRY.htm.
"Sandberg BatteryCase for iPhone 4/4S delivers more band for your buck," dated Mar. 15, 2012, http://www.gizmag.com/sanberg-batterycase-iphone/21839.
Shawn Brown, "Incase Power Slider battery doubles as a case," dated Nov. 19, 2008, http://www.iphonebuzz.com/incase-power-slider-battery-doubles-as-a-case-195224.php.
Nick Guy, "Incipio offGRID Battery Case for iPhone 5/5s," dated Oct. 9, 2013, http://www.ilounge.com/index.php/reviews/entry/incipio-offgrid-battery-case-for-iphone5-5s/.
Jeremy Horwitz, "Mophie Juice Pack Plus for iPhone 5," dated May 21, 2013, http://www.ilounge.com/index.php/reviews/entry/mophie-juice-pack-plus-for-iphone-5/.
Nick Guy, "RND Power Solutions Sync & Charge Dock with Lightning Connector," dated Nov. 18, 2013, http://www.ilounge.com/index.php/reviews/entry/tylt-energi-sl.
Julie Strietelmeier, "Seidio INNODock Desktop Cradle for Treo 650," dated Jul. 28, 2005, http://the-gadgeteer.com/2005/07/28/seidio_innodock_desktop_cradle_for_treo_650/.
Brian Nyhuis, "Mophie Juice Pack Battery Case for Samsung Galaxy S III Review," dated Nov. 28, 2012, http://www.legitreviews.com/mophie-juice-pack-battery-case-for-samsung-galaxy-s-iii-review_2084.
"PowerSkin Samsung Galaxy S3 Case with Backup Battery," dated Aug. 19, 2012, http://gadgetsin.com/powerskin-samsung-galaxy-s3-case-with-backup-battery.htm.
"iPhone 4 Case with Battery Pack," dated Sep. 28, 2010, http://gadgetsin.com/iphone-4-case-with-battery-pack.htm.
Jonathan Pena, "iPhone 5 Cases, Round 3," dated Sep. 16, 2012, http://www.technologytell.com/apple/103833/iphone-5-cases-round-3/.
Jeremy Horwitz, "Mophie Juice Pack for iPhone," dated Dec. 7, 2007, http://www.ilounge.com/index.php/reviews/entry/mophie-juice-pack-for-iphone/.
Dr. Macenstein, "Review: Mophie Juice Pack for iPhone," dated Apr. 27, 2008, http://macenstein.com/default/archives/1314.
Wayne Schulz, "iPhone Extended Battery Review—Mophie Juice Pack," dated Jun. 17, 2008, http://www.geardiary.com/2008/06/17/iphone-extended-battery-review-mophie-juice-pack/.
Mophie Juice Pack iPhone 1G Product—Figures 1-7—Retrieved from http://www.mophie.com/products/juice-pack on Apr. 10, 2009.
Mophie Juice Pack iPhone 1G Product—Figure 8—Retrieved from http://www.mophie.com/pages/information/ on Apr. 10, 2009.
Mophie Juice Pack iPhone 1G Product—Figures 9-14—Retrieved from http://www.mophie.com/blogs/Juice_Pack_FAQ on Apr. 10, 2009.
Mophie Juice Pack iPhone 1G Product—Figures 15-16—Retrieved from http://mophie.com/blogs/Juice—Pack—FAQ on Apr. 20, 2009. Figure 16 is dated May 1, 2008.
Tomas Ratas, "Mophie Juice Pack—iPhone 3G," dated Dec. 9, 2008, http://www.testfreaks.com/blog/review/mophie-juice-pack-iphone-3g/.
Dr. Macenstein, "Review: Mophie Juice Pack 3G for iPhone," dated Nov. 27, 2008, http://macenstein.com/default/archives/1820.
Ewdison Then, "Mophie Juice Pack iPhone 3G Review," dated Nov. 12, 2008, http://www.slashgear.com/mophie-juice-pack-iphone-3g-review-1222446/.
Mophie Juice Pack iPhone 3G Product—Figures 1-8—Retrieved from http://www.mophie.com/products/juice-pack-iphone-3g on Apr. 10, 2009.
Mophie Juice Pack iPhone 3G Product—Figures 9-10—Retrieved from http://www.mophie.com/pages/iphone-3g-details on Apr. 10, 2009.
Mophie Juice Pack iPhone 3G Product—Figures 11-14—Retrieved from http://mophie.com/blogs/Juice_Pack_3G_FAQ on Apr. 10, 2009.
Mophie Juice Pack iPhone 3G Product—Figures 15-16—Retrieved from http://mophie.com/blogs/press on Apr. 20, 2009. Figure 15 is dated Aug. 4, 2008, and Figure 16 is dated Nov. 10, 2008.
Mophie Juice Pack iPhone 3G User Manual—Retrieved from http://static3.shopify.com/s/files/1/0008/4942/assets/mophie_juice_pack_3G_manual_rl.pdf on Apr. 10, 2009.
Panasonic Lithium Ion Batteries Technical Handbook, dated 2007.
Chris Foresman, "Several Backup Batteries Can Extend Your Daily iPhone 3G Use," dated Jul. 18, 2008, http://arstechnica.com/apple/2008/07/several-backup-batteries-can-extend-your-daily-iphone-3g-use/.
Using Your Treo 650 Smartphone by palmOne, dated 2005.
Lisa Gade, "Palm Treo 750," dated Jan. 17, 2007, http://www.mobiletechreview.com/phones/Treo-750.htm.
Incase Power Slider 3G for iPhone 3G Product Reference, alleged by Incase to be available on Nov. 28, 2008.
iPhone User's Guide, 2007.
"Power Slider," Web Archive Date Dec. 4, 2008, https://web.archive.org/web/20081204105303/http://goincase.com/products/detail/power-slider-ec20003/?.
Azadeh Ensha, "A Case for Filling the iPhone 3G's Power Vacuum," Dated Nov. 27, 2008.
Joseph Flatley, "Incase Power Slider for iPhone 3G Doubles the Juice, Lets You Sync," dated Nov. 17, 2008.
Darren Quick, "Mophie Juice Pack for iPhone 3G now shipping," dated Nov. 10, 2008, http://www.gizmag.com/mophie-juice-pack-iphone-3g/10342/.
Otterbox Catalog, 2006.
Jeremy Horowitz, "PhoneSuit MiLi Power Pack for iPhone," Jan. 29, 2009, http://www.ilounge.com/index.php/reviews/entry/phonesuit-mili-power-pack-for-iphone/.
Jeremy Horowitz, "FastMac TruePower iV Universal Battery Charger," Dec. 11, 2008, http://www.ilounge.com/index.php/reviews/entry/fastmac-truepower-iv-universal-battery-charger/.
Jeremy Horowitz, "Konnet PowerKZ Extended Power for iPhone," Apr. 2, 2009, http://www.ilounge.com/index.php/reviews/entry/konnet-powerkz-extended-power-for-iphone/.
"Test: Batterie iPhone SKPAD" with Machine English Translation, Feb. 2, 2009, http://iphonesofa.com/2009/02/02/test-batterie-iphone-skpad.
Kanamori et al., "USB battery-charger designs meet new industry standards," EDN pp. 63-70, dated Feb. 21, 2008.
AVR458: Charging Lithium-Ion Batteries with ATAVRBC100, which appear to include a date of Aug. 2008.
Battery Charging Specification, dated Apr. 15, 2009.
BCM2033 Product Brief, 2 pages, dated Nov. 1, 2002.
"USB battery charger detector intelligently powers mobiles," Dec. 17, 2007, http://www.eetasia.com/ART_8800493819_765245_NP_10b171b6.HTMce#.
Webpage Archive, Mophie.com, Nov. 25, 2007.
Ben Kaufman, "Behind the Invention: The mophie Juice Pack," dated Dec. 31, 2013, https://medium.com/@benkaufman/behind-the-invention-the-mophie-juice-pack-a0620f74efcf.
Mophie Relo Recharge, dated Feb. 7, 2006, http://songsling.com/recharge.html.
*Case-Ari, LLC* v. *mStation, Inc.*, Case No. 1:2010-CV-01874 in the United States District Court for the Northern District of Georgia, filed Jun. 17, 2010 (Docket).
*Daniel Huang* v. *GC Technology, LLC*, Case No. CV10-4705 CAS (VBKx) in the United States District Court for the Central District of California, filed Jun. 24, 2010 (Docket).
*Hali-Power, Inc.* v. *mStation Corp.*, Case No. 1:2010-CV-00773 in the United States District Court for the Northern District of New York, filed Jun. 30, 2010 (Docket).
*Mophie, Inc.* v. *Loza & Loza, LLP*, Case No. SACV11-00539 DOC (MLGx) in the United States District Court for the Central District of California, filed Apr. 7, 2011 (Docket).
Mophie's Complaint, filed Apr. 7, 2011 in *Mophie, Inc.* v. *Loza & Loza, LLP*, Case No. SACV11-00539 DPC (MLGx) in the United States District Court for the Central District of California.

(56) References Cited

OTHER PUBLICATIONS

*Mophie, Inc.* v. *Foreign Trade Corporation*, Case No. 8:12-CV-00292-JST-RNB in the United States District Court for the Central District of California, filed Feb. 24, 2012 (Docket).
*Mophie, Inc.* v. *Kdlinks Inc.*, Case No. 2:2012-CV-02639 in the United States District Court for the Central District of California, filed Mar. 27, 2012 (Docket).
*Otter Products, LLC* v. *Mophie, LLC*, Case No. 1:2012-CV-01969 in the United States District Court for the District of Colorado, filed Jul. 27, 2012 (Docket).
Mophie's Answer, filed Oct. 15, 2012 in *Otter Products, LLC* v. *Mophie, LLC*, Case No. 1:2012-CV-01969 in the United States District Court for the District of Colorado.
Otter's Motion for Summary Judgment of Infringement and Declaration in Support Thereof, filed May 13, 2013 in *Otter Products, LLC* v. *Mophie, LLC*, Case No. 1:2012-CV-01969 in the United States District Court for the District of Colorado.
Mophie's Opposition to Motion for Summary Judgment of Infringement, filed Jun. 6, 2013 in *Otter Products, LLC* v. *Mophie, LLC*, Case No. 1:2012-CV-01969 in the United States District Court for the District of Colorado.
Mophie's Claim Construction Brief, filed Jun. 14, 2013 in *Otter Products, LLC* v. *Mophie, LLC*, Case No. 1:2012-CV-01969 in the United States District Court for the District of Colorado.
Otter's Claim Construction Brief, filed Jun. 14, 2013 in *Otter Products, LLC* v. *Mophie, LLC*, Case No. 1:2012-CV-01969 in the United States District Court for the District of Colorado.
Mophie's Brief in Response to Otter's Claim Construction Brief, filed Jun. 24, 2013 in *Otter Products, LLC* v. *Mophie, LLC*, Case No. 1:2012-CV-01969 in the United States District Court for the District of Colorado.
Otter's Rebuttal Brief for Construction of Claim Terms and Declaration, filed Jun. 24, 2013 in *Otter Products, LLC* v. *Mophie, LLC*, Case No. 1:2012-CV-01969 in the United States District Court for the District of Colorado.
Otter's Reply in Support of Motion for Summary Judgment of Infringement, filed Jun. 24, 2013 in *Otter Products, LLC* v. *Mophie, LLC*, Case No. 1:2012-CV-01969 in the United States District Court for the District of Colorado.
Joint Claim Construction Statement, filed Jun. 26, 2013 in *Otter Products, LLC* v. *Mophie, LLC*, Case No. 1:2012-CV-01969 in the United States District Court for the District of Colorado.
*Incase Designs, Inc.* v. *Mophie, Inc.*, Case No. 3:2013-CV-00602 in the United States District Court for the Northern District of California, filed Feb. 12, 2013 (Docket).
Mophie's Amended Answer and Counterclaims, filed May 8, 2013 in *Incase Designs, Inc.* v. *Mophie, Inc.*, Case No. 3:2013-CV-00602 in the United States District Court for the Northern District of California.
Mophie's Opposition to Motion to Strike Amended Affirmative Defenses, Filed Jun. 12, 2013 in *Incase Designs, Inc.* v. *Mophie, Inc.*, Case No. 3:2013-CV-00602 in the United States District Court for the Northern District of California.
Mophie's Reply in Support of Motion to Stay and Supporting Declaration, filed Sep. 3, 2103 in *Incase Designs, Inc.* v. *Mophie, Inc.*, Case No. 3:2013-CV-00602 in the United States District Court for the Northern District of California.
*Incase Designs, Inc.* v. *Mophie, Inc.*, Case No. 3:2013-CV-03356 in the United States District Court for the Northern District of California, filed Jul. 18, 2013 (Docket).
*Incase Designs, Corp.* v. *Mophie, Inc.*, Case No. 3:2013-CV-04314 in the United States District Court for the Northern District of California, filed Sep. 18, 2013 (Docket).
Mophie Motion 1—To Be Accorded Benefit, filed Nov. 20, 2013 in Patent Interference No. 105,946(RES).
Declaration of John Feland, Ph.D, in Support of Mophie Motion 1 To Be Accorded Benefit, dated Nov. 20, 2013, in Patent Interference No. 105,946(RES).

Mophie Motion 2—For Judgment that Incase's Involved Claims are Unpatentable, filed Nov. 20, 2013 in Patent Interference No. 105,946(RES).
Declaration of John Feland, Ph.D, In Support of Mophie Motion 2 for Judgement That Incase's Involved Claims are Unpatentable, dated Nov. 20, 2013, in Patent Interference No. 105,946(RES).
Incase Motion 1—Motion for Benefit, filed Nov. 20, 2013 in Patent Interference No. 105,946(RES).
Incase Motion 2—Motion to Undesignate Claims, filed Nov. 20, 2013 in Patent Interference No. 105,946(RES).
Incase Motion 3—Motion for Judgment Based on Lack of Written Description, filed Nov. 20, 2013 in Patent Interference No. 105,946(RES).
Incase Motion 4—Motion for Unpatentability of Mophie Claims, filed Nov. 20, 2013 in Patent Interference No. 105,946(RES).
Declaration of Andrew Wolfe, filed Nov. 20, 2013 in Patent Interference No. 105,946(RES).
Declaration of Thomas Overthun, filed Nov. 20, 2013 in Patent Interference No. 105,946(RES).
Declaration of Gabriel Dan, filed Nov. 20, 2013 in Patent Interference No. 105,946(RES).
Mophie's Third Amended Complaint, filed Jun. 27, 2014, in *Mophie, Inc.* v. *Source Vista*, Case No. 8:13-CV-01321 in the United States District Court for the Central District of California.
LivingSocial's Answer to Mophie's Fifth Amended Complaint and Counterclaims, filed Sep. 24, 2014, in *Mophie, Inc.* v. *Source Vista*, Case No. 8:13-CV-01321 in the United States District Court for the Central District of California.
Shah's Answer, Affirmative Defenses, and Counterclaims to Plaintiffs Fifth Amended Complaint, filed Sep. 24, 2014, in *Mophie, Inc.* v. *Source Vista*, Case No. 8:13-CV-01321 in the United States District Court for the Central District of California.
Expert Report of Dr. David Munson, dated Aug. 28, 2014, in *Mophie, Inc.* v. *Source Vista*, Case No. 8:13-CV-01321 in the United States District Court for the Central District of California.
Expert Report of John Feland, Ph.D, dated Aug. 28, 2014, in *Mophie, Inc.* v. *Source Vista*, Case No. 8:13-CV-01321 in the United States District Court for the Central District of California.
Rebutal Expert Report of John Feland, Ph.D, dated Sep. 25, 2014, in *Mophie, Inc.* v. *Source Vista*, Case No. 8:13-CV-01321 in the United States District Court for the Central District of California.
Rebutal Expert Report of Dr. David Munson, dated Sep. 25, 2014, in *Mophie, Inc.* v. *Source Vista*, Case No. 8:13-CV-01321 in the United States District Court for the Central District of California.
Mophie's Second Amended Response to LivingSocial's Interrogatory No. 1[21], dated Aug. 28, 2014, in *Mophie, Inc.* v. *Source Vista*, Case No. 8:13-CV-01321 in the United States District Court for the Central District of California.
Mophie's Second Amended Response to Serve Global's Interrogatory No. 2, dated Aug. 28, 2014, in *Mophie, Inc.* v. *Source Vista*, Case No. 8:13-CV-01321 in the United States District Court for the Central District of California.
Defendant's Memorandum in Support of Motion for Partial Summary Judgement, dated Sep. 23, 2014, in *Mophie, Inc.* v. *Source Vista*, Case No. 8:13-CV-01321 in the United States District Court for the Central District of California.
Declaration of David Munson in Support of Defendant's Motion for Partial Summary Judgment, dated Sep. 22, 2014, in *Mophie, Inc.* v. *Source Vista*, Case No. 8:13-CV-01321 in the United States District Court for the Central District of California.
John Feland, Ph.D. Deposition Transcript, dated Sep. 30, 2014, in *Mophie, Inc.* v. *Source Vista*, Case No. 8:13-CV-01321 in the United States District Court for the Central District of California.
Matthew Brand Deposition Transcript, dated Jul. 23, 2014, in *Mophie, Inc.* v. *Source Vista*, Case No. 8:13-CV-01321 in the United States District Court for the Central District of California.
Dharmesh Shah Deposition Transcript, dated Jul. 11, 2014, in *Mophie, Inc.* v. *Source Vista*, Case No. 8:13-CV-01321 in the United States District Court for the Central District of California.
Defendants' Statement of Uncontroverted Material Fact and Contentions of Law, filed Sep. 22, 2014 in *Mophie, Inc.* v. *Source Vista*, Case No. 8:13-CV-01321 in the United States District Court for the Central District of California.

(56) References Cited

OTHER PUBLICATIONS

Memorandum of Points and Authorities in Support of Mophie's Motion for Summary Judgment, filed Sep. 22, 2014, in *Mophie, Inc. v. Source Vista*, Case No. 8:13-CV-01321 in the United States District Court for the Central District of California.
Statement of Uncontroverted Facts and Conclusions of Law in Support of Mophie's Motion for Summary Judgment, filed Sep. 22, 2014, in *Mophie, Inc. v. Source Vista*, Case No. 8:13-CV-01321 in the United States District Court for the Central District of California.
Mophie's Opposition to Shah and Serve Global's Motion for Partial Summary Judgment, dated Oct. 3, 2014, in *Mophie, Inc. v. Source Vista*, Case No. 8:13-CV-01321 in the United States District Court for the Central District of California.
Statement of Genuine Disputes of Material Fact in Opposition to Shah and Serve Global's Motion for Partial Summary Judgment, filed Oct. 3, 2014, in *Mophie, Inc. v. Source Vista*, Case No. 8:13-CV-01321 in the United States District Court for the Central District of California.
Opposition of LivingSocial to Mophie's Motion for Summary Judgment, dated Oct. 3, 2014, in *Mophie, Inc. v. Source Vista*, Case No. 8:13-CV-01321 in the United States District Court for the Central District of California.
Defendants' Opposition to Plaintiff's Motion for Summary Judgment, filed Oct. 3, 2014, in *Mophie, Inc. v. Source Vista*, Case No. 8:13-CV-01321 in the United States District Court for the Central District of California.
Defendants' Response to Plaintiffs Statement of Uncontroverted Material Fact and Contentions of Law, filed Oct. 3, 2014, in *Mophie, Inc. v. Source Vista*, Case No. 8:13-CV-01321 in the United States District Court for the Central District of California.
David Munson Deposition Transcript, dated Sep. 29, 2014, in *Mophie, Inc. v. Source Vista*, Case No. 8:13-CV-01321 in the United States District Court for the Central District of California.
Mophie's First Amended Complaint, filed Jun. 25, 2014, in *Mophie, Inc. v. UNC Electronics. Inc.*, Case No. 8:13-CV-01705 in the United States District Court for the Central District of California.
UNU's Answer and Counterclaims, filed Jul. 10, 2014, in *Mophie, Inc. v. UNU Electronics Inc.*, Case No. 8:13-CV-01705 in the United States District Court for the Central District of California.
Mophie's Responses to Defendant's Third Set of Interrogatories (No. 12), dated Aug. 21, 2014, in *Mophie, Inc. v. UNU Electronics Inc.*, Case No. 8:13-CV-01705 in the United States District Court for the Central District of California.
Mophie's Responses to Defendant's First set of Requests for Admissions (Nos. 1-46), dated Aug. 19, 2014, in *Mophie, Inc. v. UNU Electronics Inc.*, Case No. 8:13-CV-01705 in the United States District Court for the Central District of California.
Mophie's Responses to Defendant's Second set of Requests for Admissions (Nos. 47-109), dated Aug. 19, 2014, in *Mophie, Inc. v. UNU Electronics Inc.*, Case No. 8:13-CV-01705 in the United States District Court for the Central District of California.
Request for Ex Parte Reexamination of U.S. Patent No. 8,367,235, filed Aug. 14, 2014.
Corrected Request for Ex Parte Reexamination of U.S. Patent No. 8,367,235, filed Sep. 18, 2014.
Declaration of John Feland, Ph.D. In Support of Mophie's Opposition to Defendants Motion for Partial Summary Judgment, filed Oct. 3, 2014, in *Mophie, Inc. v. Source Vista*, Case No. 8:13-CV-01321 in the United States District Court for the Central District of California.
LivingSocial's Reply in Support of Motion for Summary Judgment, Filed Oct. 10, 2014, in *Mophie, Inc. v. Source Vista*, Case No. 8:13-CV-01321 in the United States District Court for the Central District of California.
Defendants' Reply in Support of Motion for Partial Summary Judgment, Filed Oct. 10, 2014, in *Mophie, Inc. v. Source Vista*, Case No. 8:13-CV-01321 in the United States District Court for the Central District of California.

Reply in Support of Mophie's Motion for Summary Judgment, Filed Oct. 10, 2014, in *Mophie, Inc. v. Source Vista*, Case No. 8:13-CV-01321 in the United States District Court for the Central District of California.
Mophie's Reply to Counterclaims of LivingSocial, filed Oct. 14, 2014, in *Mophie, Inc. v. Source Vista*, Case No. 8:13-CV-01321 in the United States District Court for the Central District of California.
Mophie's Reply to Counterclaims of Shah, filed Oct. 14, 2014, in *Mophie, Inc. v. Source Vista*, Case No. 8:13-CV-01321 in the United States District Court for the Central District of California.
Defendant's Response to Mophie's Fourth Set of Interrogatories, dated Sep. 23, 2014, in *Mophie, Inc. v. UNU Electronics Inc.*, Case No. 8:13-CV-01705 in the United States District Court for the Central District of California.
Plaintiff Mophie's Preliminary Claim Constructions and Identification of Extrinsic Evidence, dated Oct. 14, 2014, in *Mophie, Inc. v. UNU Electronics Inc.*, Case No. 8:13-CV-01705 in the United States District Court for the Central District of California.
Defendant's Preliminary Claim Constructions and Extrinsic Evicence, dated Oct. 14, 2014, in *Mophie, Inc. v. UNU Electronics Inc.*, Case No. 8:13-CV-01705 in the United States District Court for the Central District of California.
Plaintiff Mophie's Opening Brief on Claim Construction, filed Oct. 29, 2014, in *Mophie, Inc. v. UNU Electronics Inc.*, Case No. 8:13-CV-01705 in the United States District Court for the Central District of California.
Declaration of John Feland, Ph.D. In Support of Plaintiff's Preliminary Claim Constructions, filed Oct. 29, 2014, in *Mophie, Inc. v. UNU Electronics Inc.*, Case No. 8:13-CV-01705 in the United States District Court for the Central District of California.
Supplemental Declaration of John Feland, Ph.D. In Support of Plaintiff's Claim Constructions, filed Oct. 29, 2014, in *Mophie, Inc. v. UNU Electronics Inc.*, Case No. 8:13-CV-01705 in the United States District Court for the Central District of California.
Declaration of Sheila N. Swaroop in Support of Mophie's Opening Claim Construction Brief, filed Oct. 29, 2014, in *Mophie, Inc. v. UNU Electronics Inc.*, Case No. 8:13-CV-01705 in the United States District Court for the Central District of California.
Transcript of Deposition of John Feland, dated Oct. 21, 2014, in *Mophie, Inc. v. UNU Electronics Inc.*, Case No. 8:13-CV-01705 in the United States District Court for the Central District of California.
Defendant's Opening Claim Construction Brief, dated Oct. 29, 2014, in *Mophie, Inc. v. UNU Electronics Inc.*, Case No. 8:13-CV-01705 in the United States District Court for the Central District of California.
Order Granting Request for Ex Parte Reexamination of U.S. Patent No. 8,367,235, in Reexamination Control U.S. Appl. No. 90/013,319, dated Oct. 24, 2014.
Order Re LivingSocial's Motion for Summary Judgment, Mophie's Motion for Summary Judgment, Source Vista and Shah's Motion for Partial Summary Judgment, and Mophie's Motion to Bifurcate, dated Nov. 12, 2014, in *Mophie, Inc. v. Source Vista*, Case No. 8:13-CV-01321 in the United States District Court for the Central District of California.
Mophie's Memorandum in Support of its Motion for Reconsideration, filed Nov. 19, 2014, in *Mophie, Inc. v. Source Vista*, Case No. 8:13-CV-01321 in the United States District Court for the Central District of California.
Declaration of Sheila N. Swaroop in Support of Mophie's Motion for Reconsideration, filed Nov. 19, 2014, in *Mophie, Inc. v. Source Vista*, Case No. 8:13-CV-01321 in the United States District Court for the Central District of California.
Order Denying Plantiff's Motion for Reconsideration, dated Nov. 21, 2014, in *Mophie, Inc. v. Source Vista*, Case No. 8:13-CV-01321 in the United States District Court for the Central District of California.

* cited by examiner

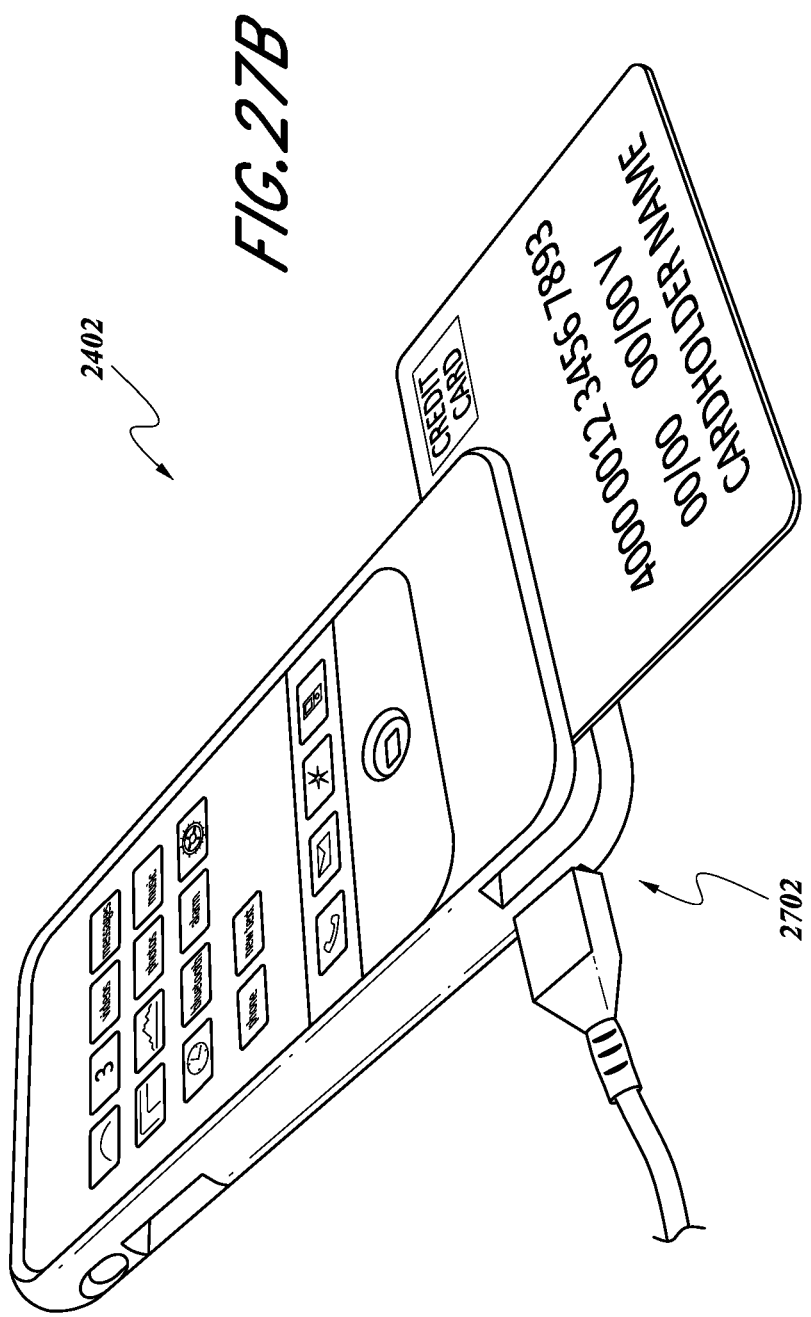

US 9,123,935 B2

WIRELESS COMMUNICATION ACCESSORY FOR A MOBILE DEVICE

CLAIM OF PRIORITY

The present Utility Application for Patent claims priority as a continuation-in-part to U.S. patent application Ser. No. 12/357,262 entitled "Battery Pack, Holster, and Extendible Processing and Interface Platform for Mobile Devices" and filed Jan. 21, 2009 which in turn claims priority to U.S. Provisional Application 61/021,897 entitled "Battery Pack and Holster for Mobile Devices" and filed Jan. 18, 2008, both of which are expressly incorporated by reference herein. The present Utility Application for Patent additionally claims priority to U.S. Provisional Application 61/495,848 entitled "Near Field Communication Accessory for a Mobile Device" filed Jun. 10, 2011, which is also expressly incorporated by reference herein.

FIELD OF THE INVENTION

Aspects relate to accessories for mobile devices and, more particularly, to an external protective case and/or holster for mobile electronic devices, where the external protective case/holster incorporates a battery pack, an external processing accessory, a payment processing accessory, television signal receiver accessory, a wireless communication accessory, a near field communication accessory, and/or a modular multi-input/output device.

BACKGROUND

Many mobile devices (e.g., mobile phones, digital assistants, mobile communication devices, handheld computing devices, personal music/video/content players and storage devices) are often powered by battery power sources. Such battery power sources are often housed within the mobile device and may be changed and/or recharged as needed. However, as more powerful mobile devices are designed, these tend to consume power more quickly, thereby shortening the time between charges. This tends to limit the usefulness of the mobile device since the user must find a power source to recharge the battery source and wait until it is recharged.

Additionally, such mobile devices are designed to satisfy the needs of a wide array of consumers. For instance, such mobile devices may have somewhat limited processing capabilities (e.g., to extend battery power) and limited input/output capabilities. Consequently, users who wish to extend the capabilities of the mobile device to implement various types of solutions are prevented from doing so.

SUMMARY

In one embodiment, a wireless communication accessory for a mobile communication device is disclosed, comprising: a casing that conforms, at least partially, to the outer shape of the mobile communication device; a processing circuit housed within the casing and configured to process a first data; and a wireless transmitter coupled to the processing circuit, where the transmitter is configured to transmit the first data. In another embodiment, the wireless communication accessory further comprises a wireless receiver coupled to the processing circuit, where the receiver is configured to receive a second data. In another embodiment, the wireless accessory further comprises an internal interface coupled to a mobile device interface of the mobile communication device to allow for communication between the mobile communication device and the wireless communication accessory.

In another embodiment, the casing defines a cavity that removably secures the mobile communication device, and wherein at least one surface of the mobile communication device remains exposed. In another embodiment, the first data is associated with payment card information, and the first data is transmitted by the wireless communication transmitter to execute a purchase transaction. In another embodiment, the first data is associated with a public transportation account, and the first data is transmitted by the wireless communication transmitter to purchase transportation. In another embodiment, the first data is associated with access card information, and the first data is transmitted by the wireless communication transmitter to allow access to a restricted area. In another embodiment, the second data is coupon data associated with a merchant. In another embodiment, the wireless communication accessory further comprises a cryptography module configured to encrypt the first data prior to transmission by the wireless communication transmitter.

In another embodiment, the wireless communication accessory further comprises an application that when executed by the processing circuit causes the wireless communication accessory to log a time, date, and location associated with the purchase transaction. In another embodiment, the mobile communication device prompts the user to enter a password or personal identification number (PIN) prior to execution of the purchase transaction by the wireless communication accessory. In another embodiment, a GPS unit is used to determine the location of the purchase transaction.

BRIEF DESCRIPTION OF THE DRAWINGS

FIGS. 27A and 27B illustrate perspective views of a mobile device housed within the casing of the payment processing accessory.

DETAILED DESCRIPTION

In the following detailed description, numerous specific details are set forth in order to provide a thorough understanding of the invention. However, the invention may be practiced without these specific details. In other instances, well known methods, procedures, and/or components have not been described in detail so as not to unnecessarily obscure aspects of the invention.

Various embodiments provide battery packs shaped to conform to the external shape of a mobile device, thereby providing a permanent or long-term replacement power source without significantly affecting the size and usability of the mobile device.

According to one feature, the wireless communication module could be a nearfield communication (NFC) interface. In this way, even non-NFC enabled mobile device could participate in NFC transactions. For the purpose of illustration, many of the figures and specific examples describe NFC modules; however, the invention includes not only NFC interfaces or even radio frequency interfaces generally, but is intended to cover all wireless communication types. Among the expressly included wireless communication methods are radio, NFC, Bluetooth, Wi-Fi, cellular, infrared, satellite, GPD, electromagnetic radiation, IEEE 802.15.4, wireless USB, UWB, 6LoWPAN, HSPA+, LTE, GSM, WiMAX, and EV-DO. The technology is not limited to only these communication standards, but at least all of these standards are expressly included within the meaning of a wireless communication.

According to another feature, the battery pack may provide recharge power to the mobile device while also providing an external signaling and/or charging interface to the mobile device. This way, the mobile device need not be removed from the battery pack in order to charge it or provide data (e.g., synchronization, etc.).

According to yet another feature, the battery pack may include one or more different types of communication interfaces to extend the communication capabilities of the mobile device. This allows the mobile device to communicate via other interfaces that may not be built into the mobile device.

According to yet another feature, the battery pack may include one or more processors to extend the processing capabilities of the battery pack. For instance, the one or more processors may increase the processing capabilities of the battery pack and/or provide purpose-specific processors. That is, the interface between the battery pack and mobile device may allow the mobile device to use the one or more processors to execute application on the battery pack. Note that such applications may, in some instances, continue to operate even if the mobile device is detached from the battery pack.

According to yet another feature, the battery pack may include and inductive recharging device or a near-distance recharging device no that its power cells may be recharged without actually physically plugging it to a recharge power source.

First Embodiment of Battery Pack

Figure 1:
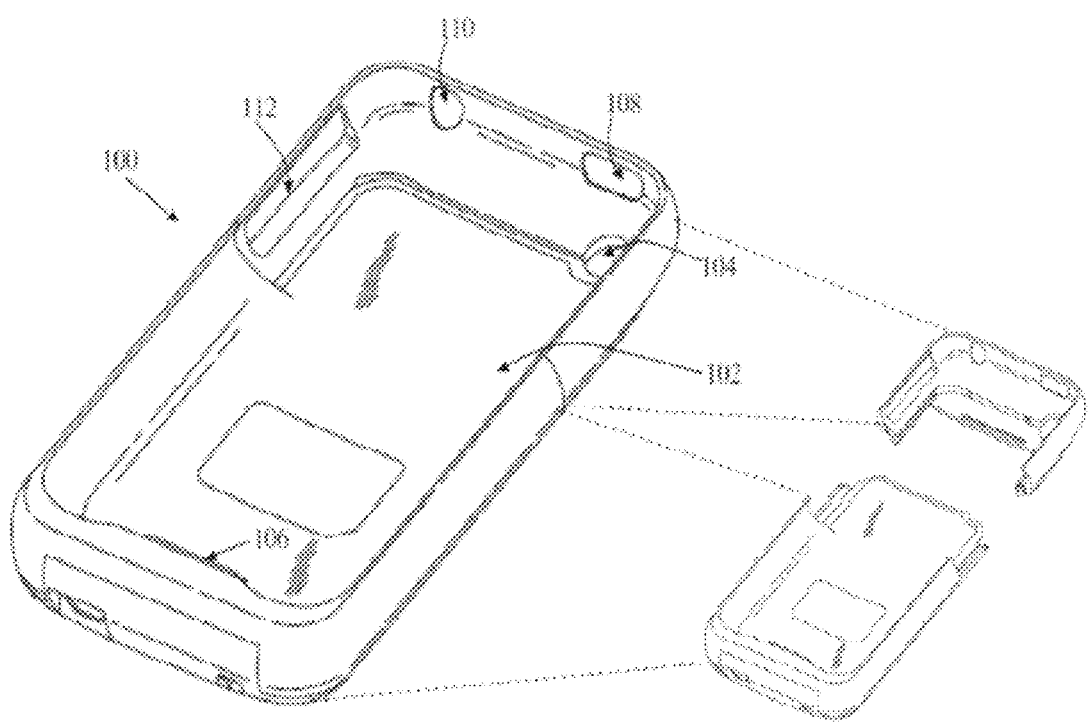
FIG. 1 illustrates a perspective view of a battery pack for a mobile device according to one example.

FIG. 1 illustrates a perspective view of a battery pack for a mobile device according to one example. In this example, the battery pack 100 is shaped to receive or house a mobile phone within a contoured cavity 102. The battery pack 100 has an integrated rechargeable power cell capable of providing power to operate and/or recharge a mobile device mobile device. For illustrative purposes, mobile device is depicted as the mobile communication device sold under the trademark iPhone by Apple Inc.; it is understood by those familiar with the art that other mobile devices such as computers, mobile phones, media players, music players, personal digital assistants (PDAs), tablet computers, and the like may be equally applicable.

Figure 2:
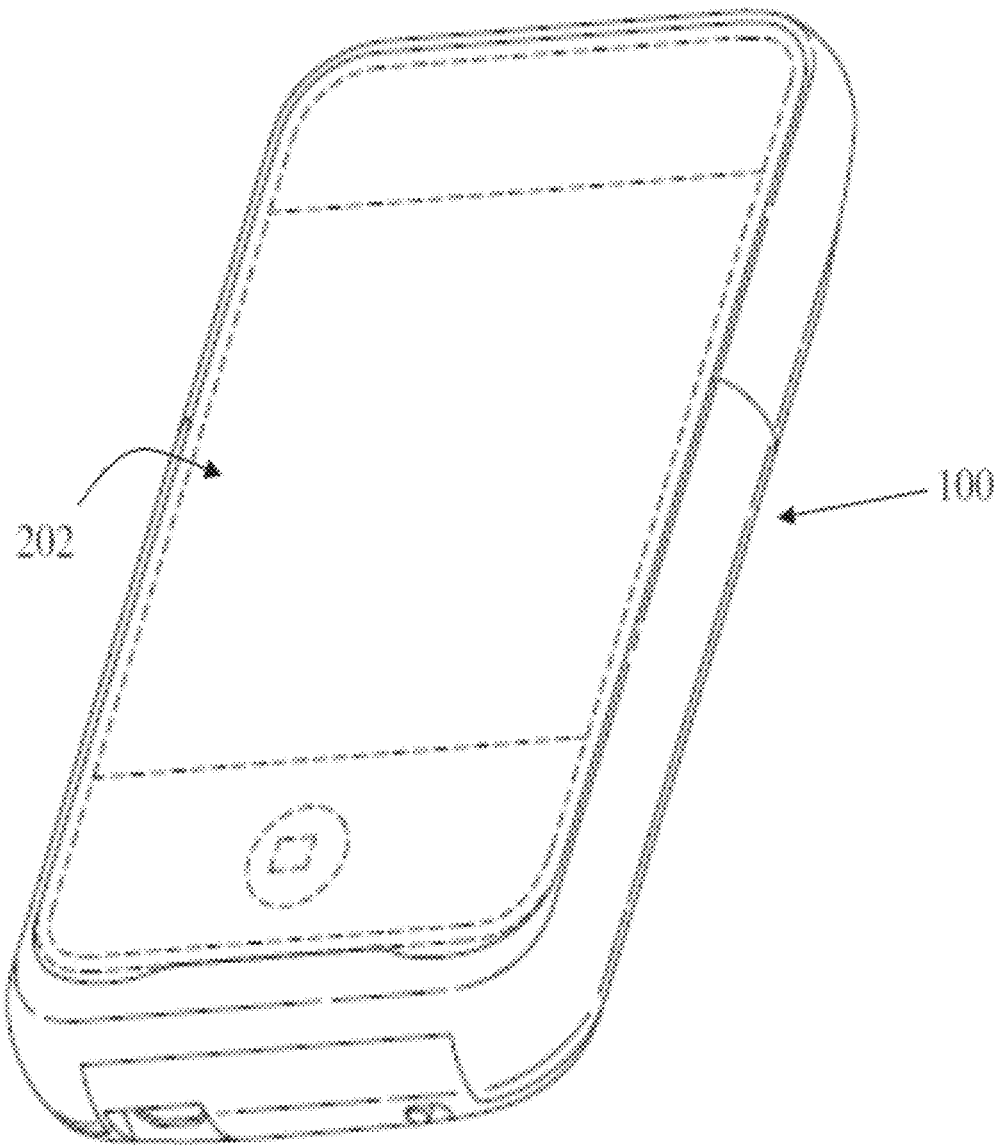
FIG. 2 illustrates how a mobile device can be housed within the battery pack of FIG. 1.

FIG. 2 illustrates how a mobile device can be housed within the battery pack 100 of FIG. 1. As can be appreciated from this figure, the battery pack 100 is shaped to closely wrap around the mobile device 202 and serves as a protective case for the mobile device 202.

Figure 3:
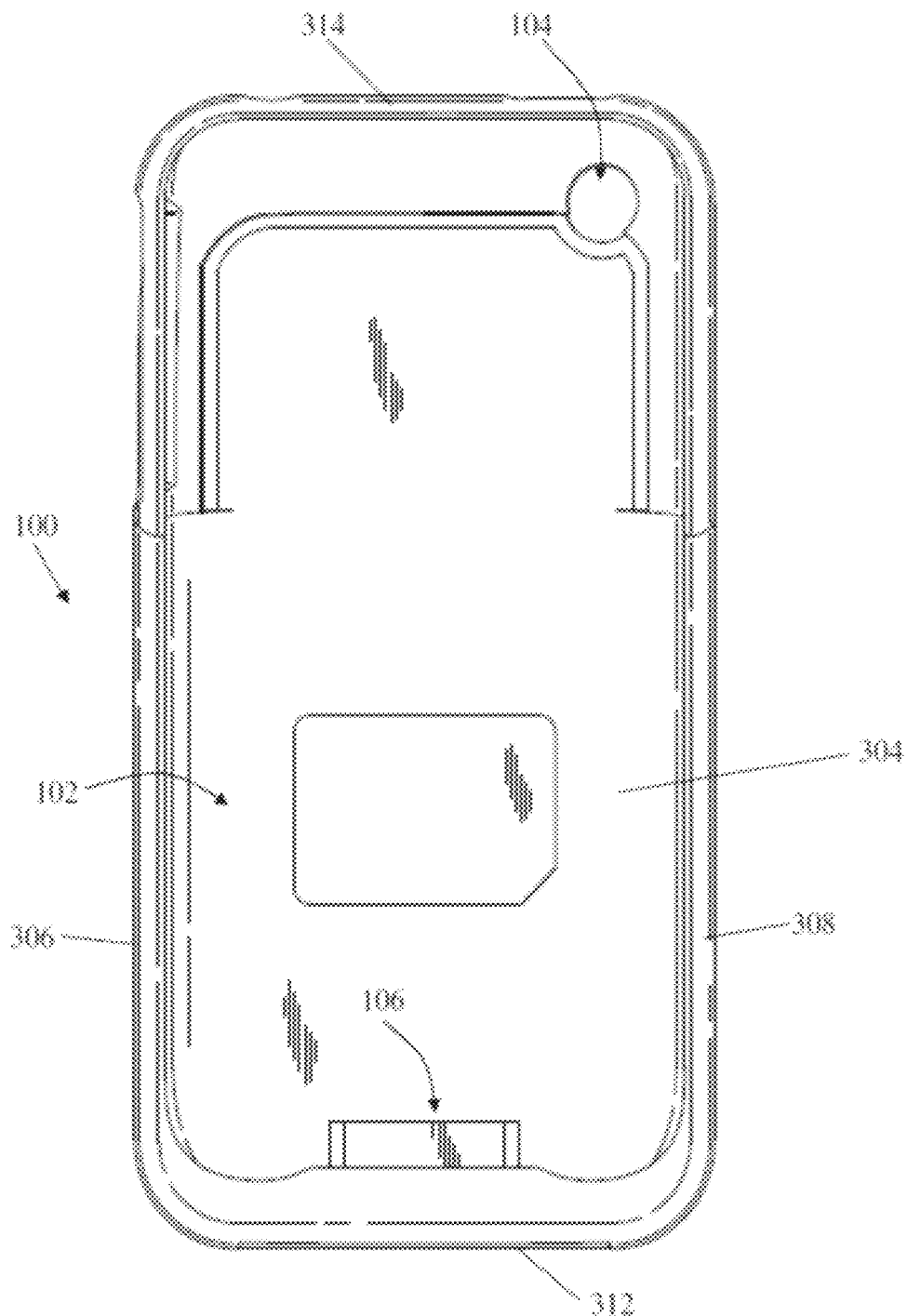
FIG. 3 illustrates a front view of the battery pack of FIG. 1.

FIG. 3 illustrates a front view of the battery pack 100 of FIG. 1. The battery pack 100 includes a back plane 304, first and second sides 306 and 308, a bottom side 312, and a top side 314. The back plane 304, first and second sides 306, bottom side 312 and top side 314 may be shaped to form a pocket or cavity 102 in which a mobile device to be powered can be housed. The top side 314 of the battery pack 100 may slide out to allow insertion and removal of the mobile device.

Referring again to FIG. 1, the battery pack 100 may include one or more openings 104, 108, 110, and 112 to facilitate access to various features of the mobile phone. For instance, a first opening 104 on the back plane 304 of the battery pack 100 may allow unobstructed view for a camera lens on the back of the mobile device. A second opening 108 may provide access to a screen on/off switch for the mobile device. A third opening 110 may provide access to an audio jack on the mobile device. A fourth opening 112 on the first side 306 may provide access to a volume control sliding switch.

The battery pack 100 may also include a connector or interface 106 within the cavity 102 (e.g., on the bottom side 312) through which power can be provided to the mobile device from the internal power cell of the battery pack 100. Additionally, the connector 106 may be coupled to an external interface to provide input and/or output signals to the mobile device.

From FIG. 1, it can be appreciated that the battery pack may include two sections that separate to allow insertion of the mobile device and can then be coupled together to secure the mobile device in place. The size and shape of the battery pack 100 may be approximately that of the external contour of a mobile device to which it is intended to provide power.

Figure 4:
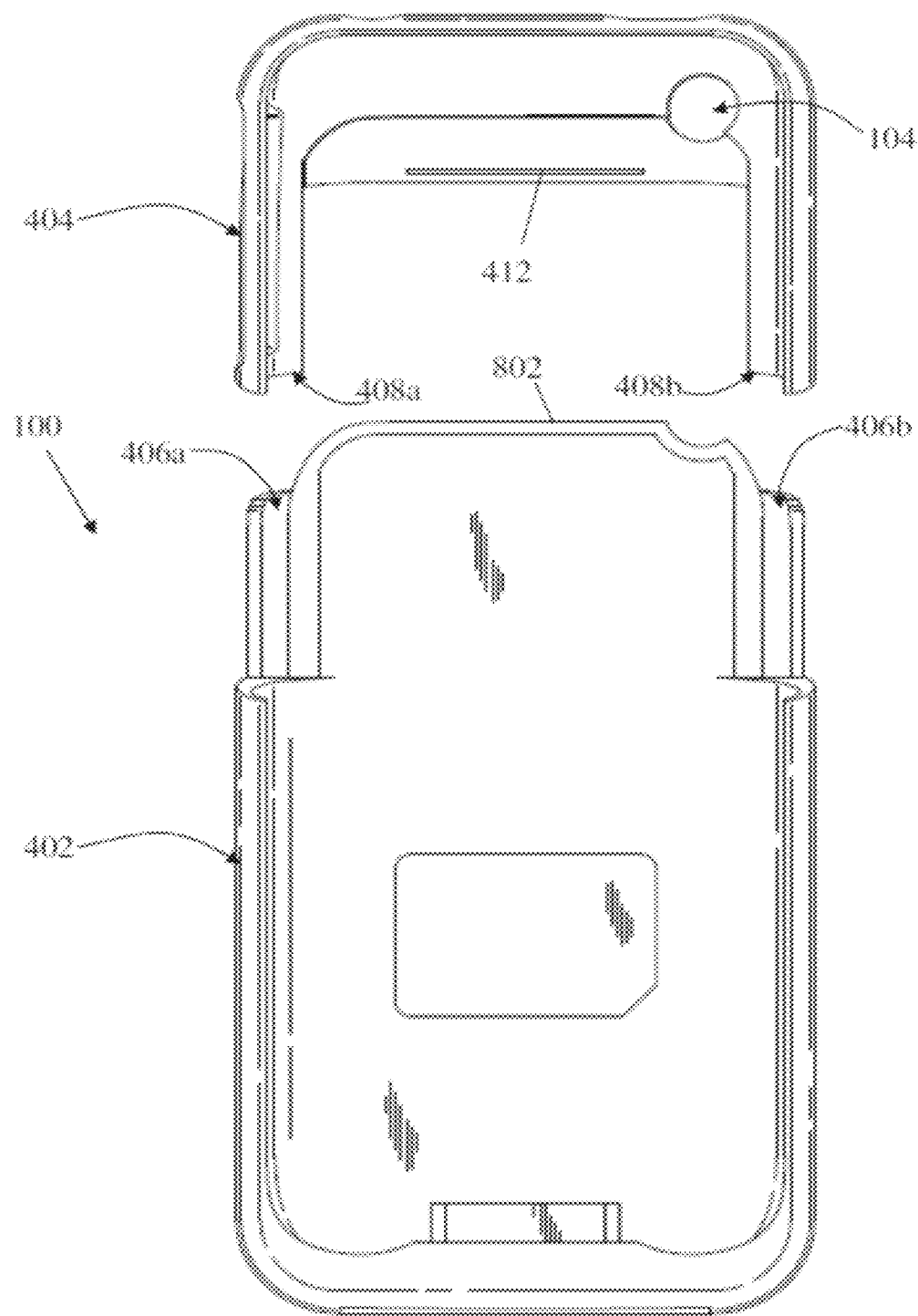
FIG. 4 illustrates the battery pack of FIG. 1 in an open configuration.

FIG. 4 illustrates the battery pack of FIG. 1 in an open configuration. The battery pack 100 may include a bottom section 402 and a top section 404 that can be separated from each other to insert a mobile device within the battery pack 100 and can then be coupled together secure the mobile device in place. For example, the bottom section 402 may include receiving grooves 406a and 406b that receive rails 408a and 408b from the top section 404. In this manner, the top section 404 can be coupled to the bottom section 402 by pressure fit. For example, a tongue section 802 (FIG. 8) may slide on to the top section 404 such that an engaging tab 412 couples into a receiving groove 804 (FIG. 8) to secure the top section 404 to the bottom section 402.

Figure 5:
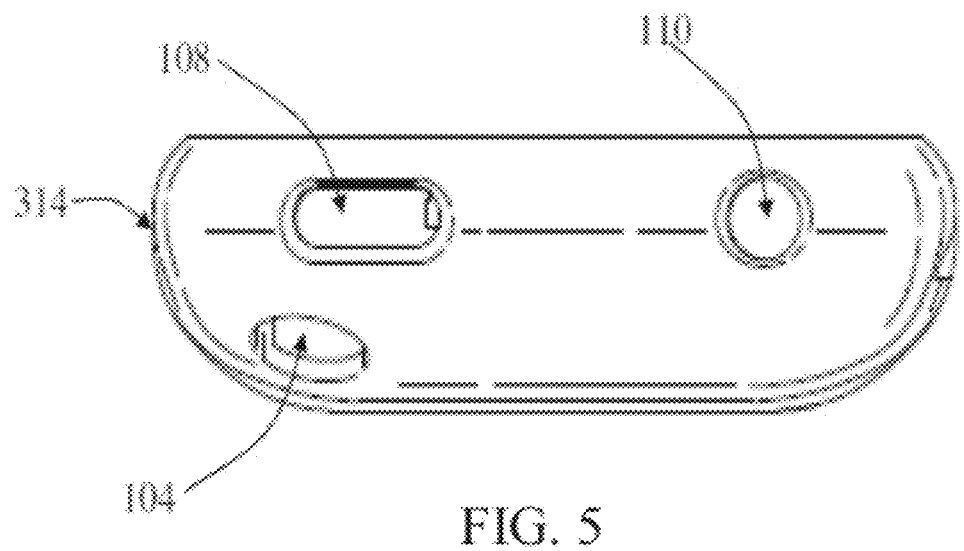
FIG. 5 illustrates a top view of the battery pack of FIG. 1.

FIG. 5 illustrates a top view of the battery pack 100 of FIG. 1. In this view, the top side 314 of the battery pack 100 is shown and the first opening 104, second opening 108, and third opening 110 can be appreciated.

Figure 6:
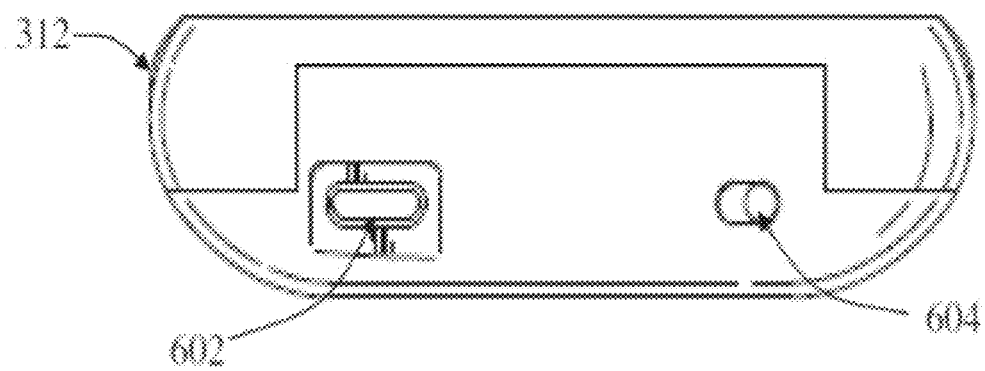
FIG. 6 illustrates a bottom view of the battery pack of FIG. 1.

FIG. 6 illustrates a bottom view of the battery pack 100 of FIG. 1. In this view, the bottom side 312 of the battery pack 100 is shown. In this view, an external interface 602 (e.g., mini or micro USB connector) is shown. This external interface 602 may serve to recharge the internal power cell of the battery pack. Additionally, the external interface 602 may also provide a pass-through signaling interface for the internal connector or interface 106, thereby allowing the mobile device to communicate via the external interface 602. A switch 604 may also be located on the bottom side 312 of the battery pack and can function to switch power from the battery pack On or Off. That is, when the mobile device has sufficient power on its own, the power cell of the battery pack is not needed and can be switched Off until it is needed.

Figure 7:
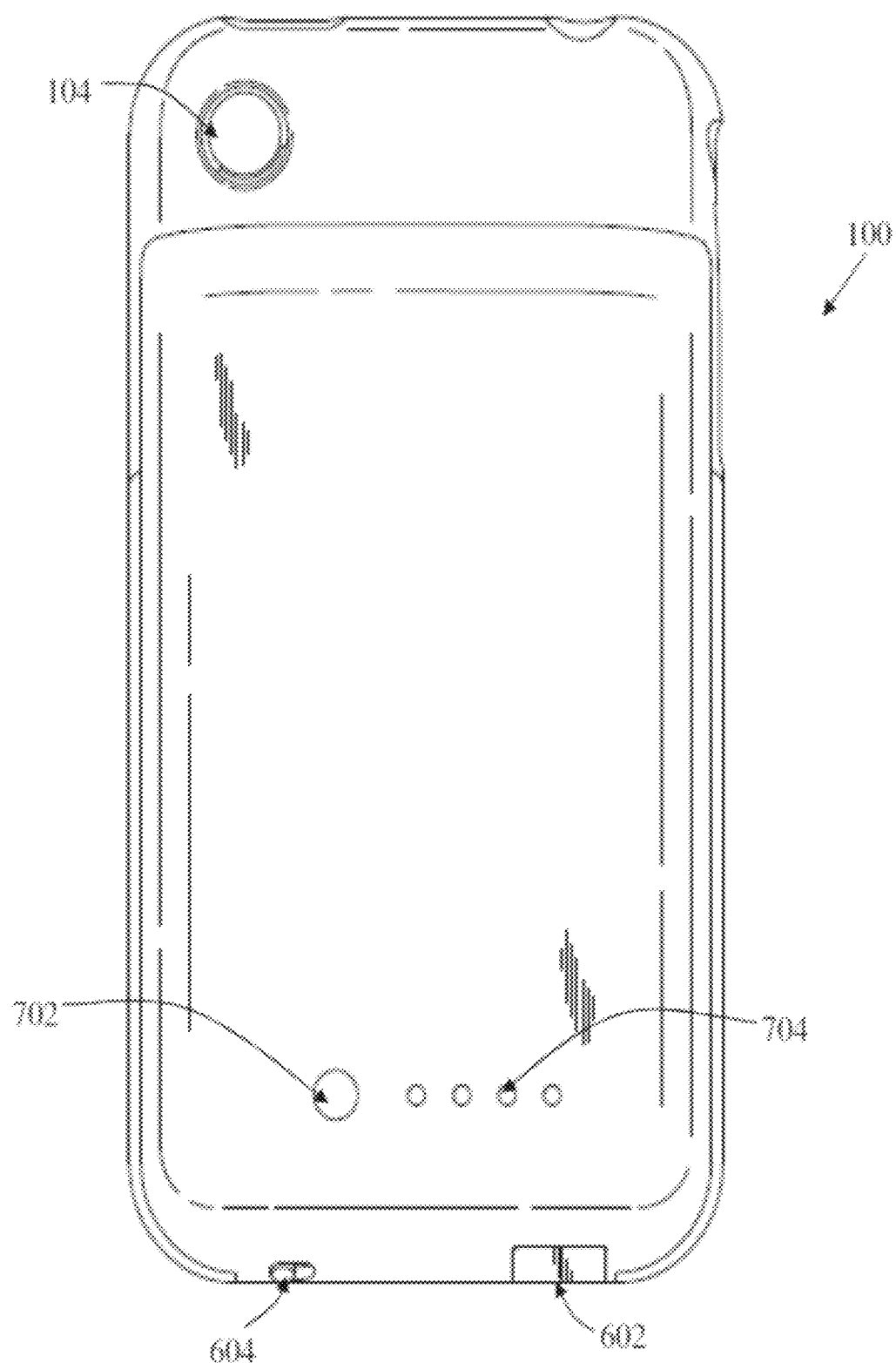
FIG. 7 illustrates a back view of the battery pack of FIG. 1.

FIG. 7 illustrates a back view of the battery pack 100 of FIG. 1. In this example, a test button 702 is provided that, when pushed, causes plurality of LED lights 704 to indicate the power or charge level of the internal power cell of the battery pack 100.

Figure 8:
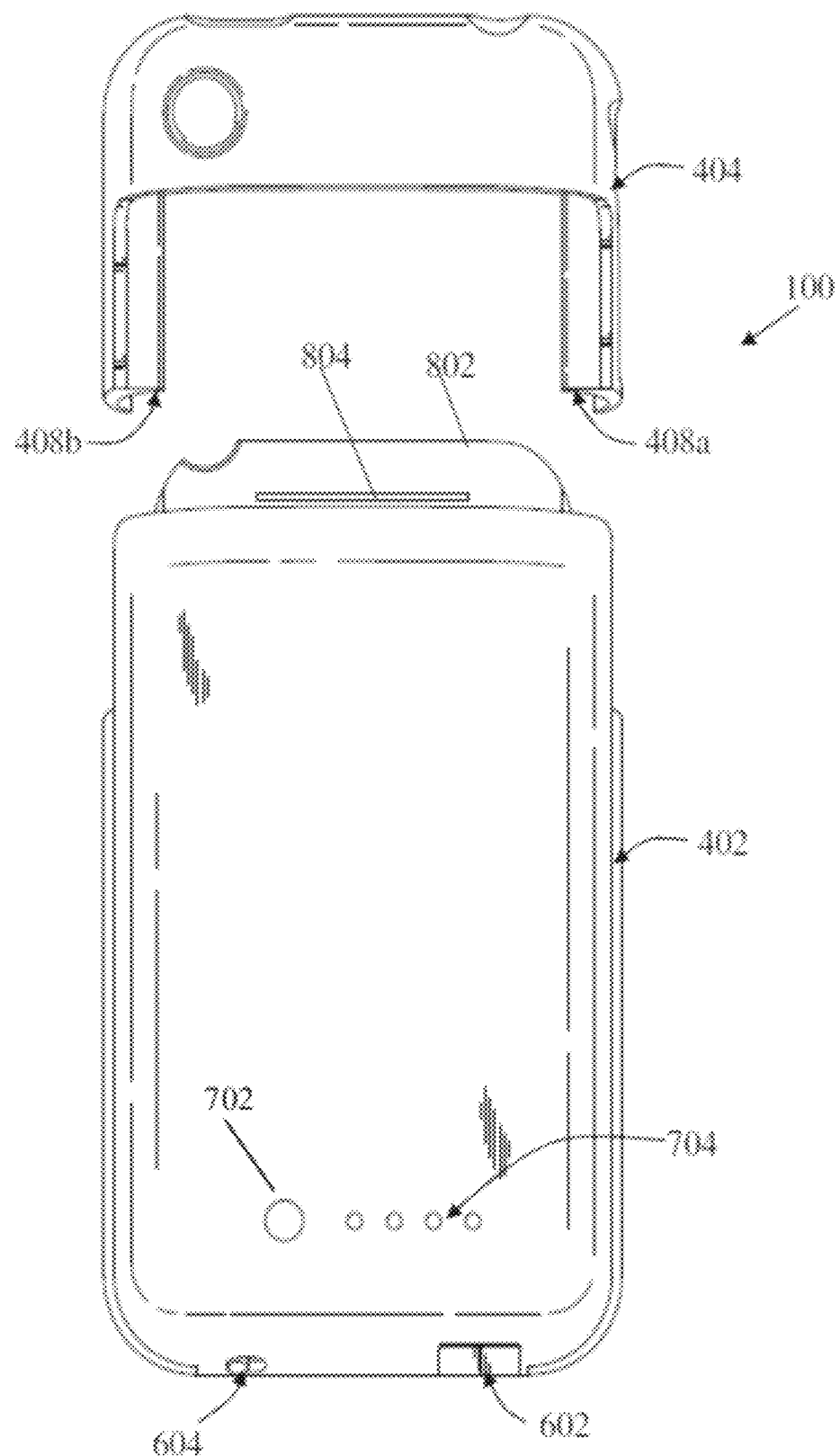
FIG. 8 illustrates back view of the battery pack of FIG. 1 in an open position.

FIG. 8 illustrates back view of the battery pack 100 of FIG. 1 in an open position.

Figure 9:
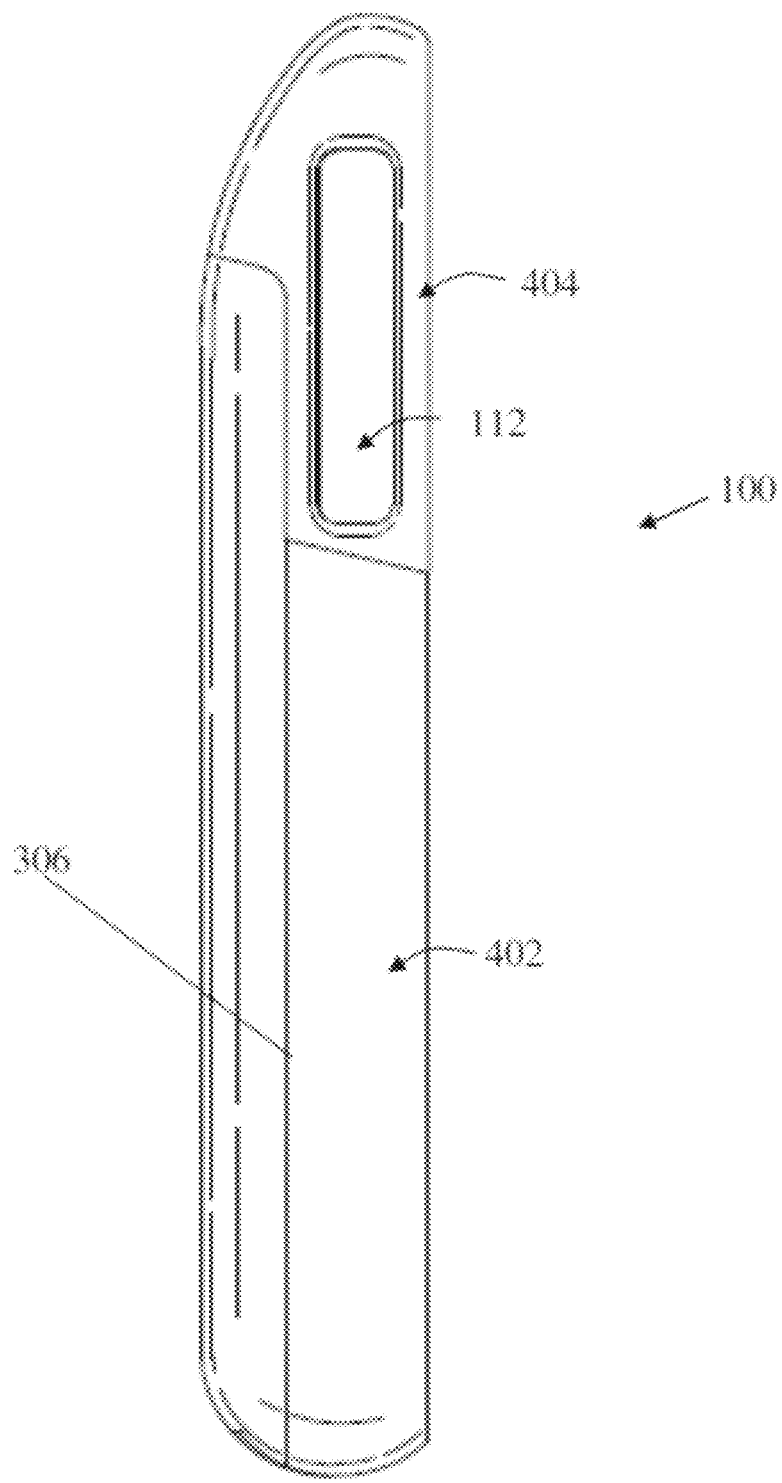
FIG. 9 illustrates a first side view of the battery pack of FIG. 1.

FIG. 9 illustrates a first side view of the battery pack of FIG. 1.

Figure 10:
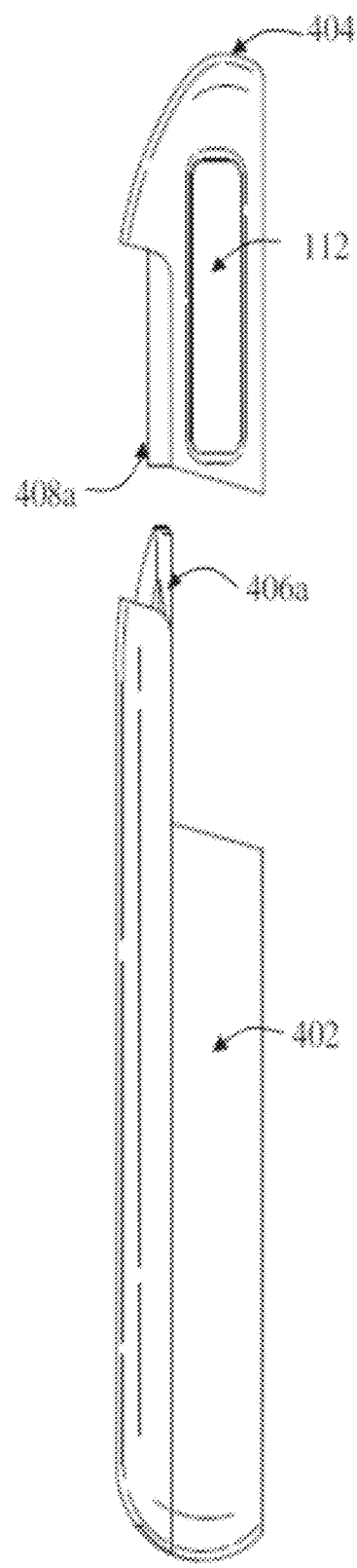
FIG. 10 illustrates the first side view of the battery pack of FIG. 1 in an open position.

FIG. 10 illustrates the first side view of the battery pack of FIG. 1 in an open position.

Figure 11:
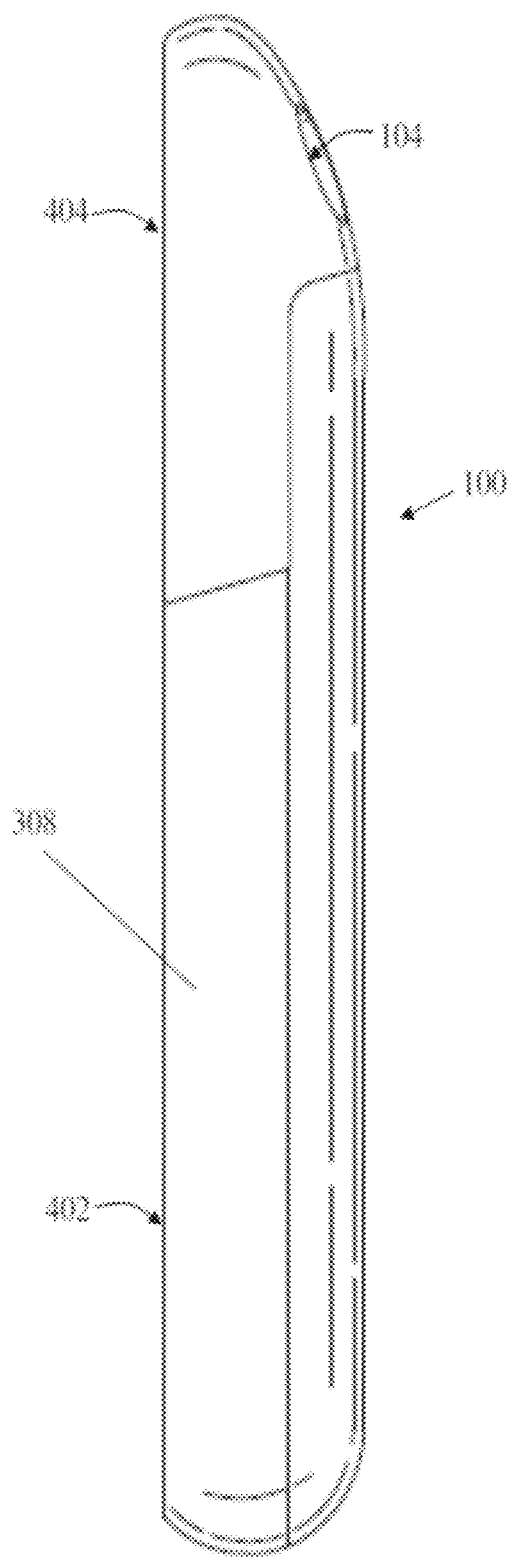
FIG. 11 illustrates a second side view of the battery pack of FIG. 1.

FIG. 11 illustrates a second side view of the battery pack of FIG. 1.

Figure 12:
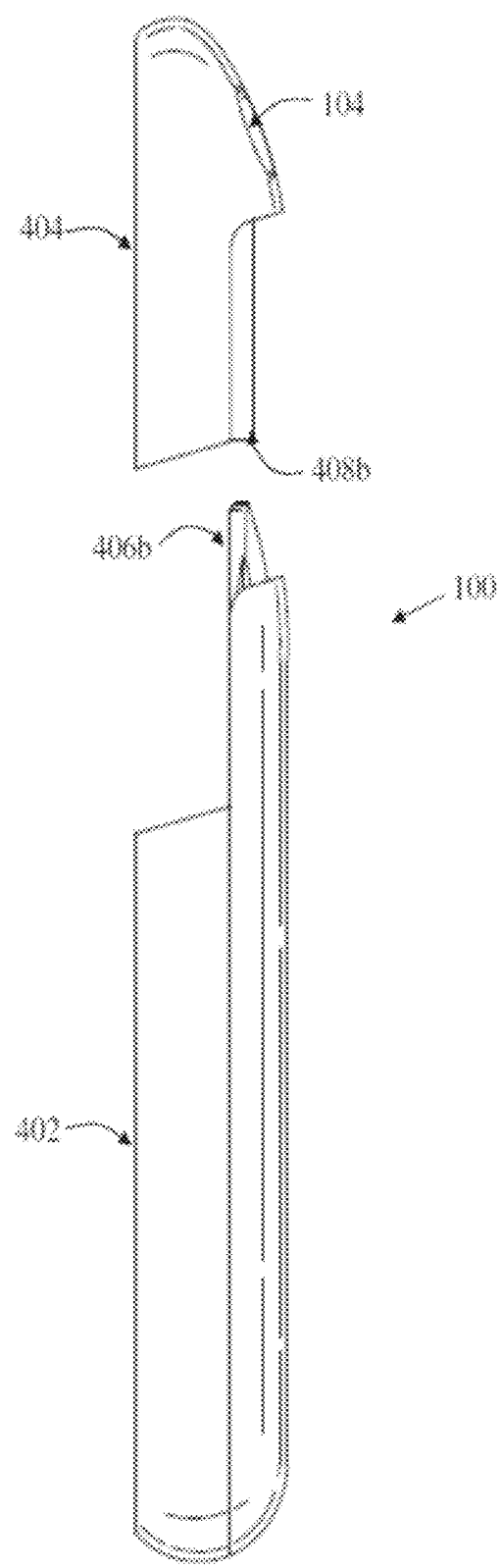
FIG. 12 illustrates the second side view of the battery pack of FIG. 1 in an open position.

FIG. 12 illustrates the second side view of the battery pack of FIG. 1 in an open position.

Figure 13:
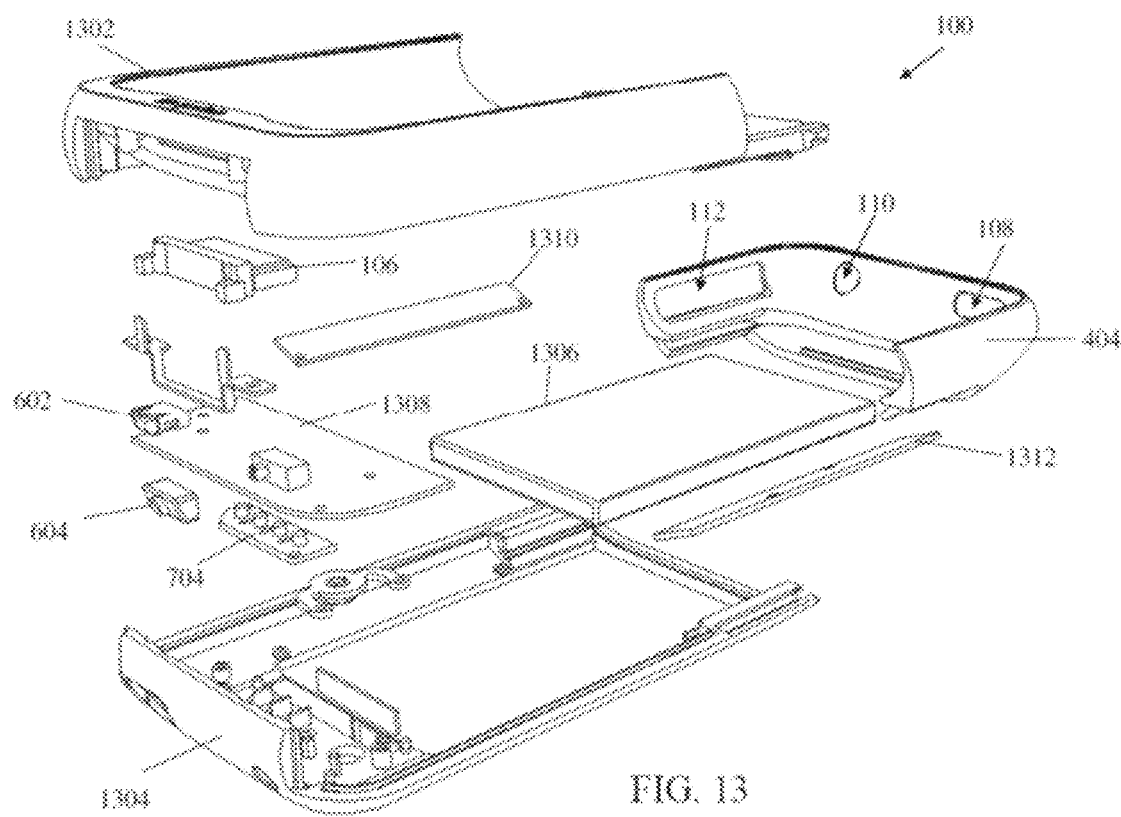
FIG. 13 is an exploded view of components of the battery pack of FIG. 1.

FIG. 13 is an exploded view of components of the battery pack of FIG. 1. In this example, the battery pack may include a first bottom section 1302 and a second bottom section 1304 which form a top and bottom shell in between which one or more circuit boards 1308, 1310, and/or 1312 and/or one or more power cells 1306 are housed. That is, the circuits boards 1308, 1310, 1312 and/or power cents) 1306 are sandwiched between the top and bottom sections 1302 and 1304 of the battery pack 100. Consequently, the rechargeable power cell(s) 1306 may be housed within the thickness of the back plane of the battery pack.

In some instance, the circuit boards and or power cell of the battery pack may cause interference with the antenna or signaling of the mobile device which is in close proximity. Consequently, one aspect provides for reducing the size of a primary circuit board 1308 by adding secondary circuit boards 1310 and 1312 which are electrically coupled to the primary circuit board 1308. This allows reducing the size of the circuit board 1308 thereby reducing interference to the antenna of the mobile device. Additionally, the ground for the power cell 1306 may be coupled to the ground for the mobile device (via the internal interface 106) to reduce interference to the mobile device.

Figure 14:
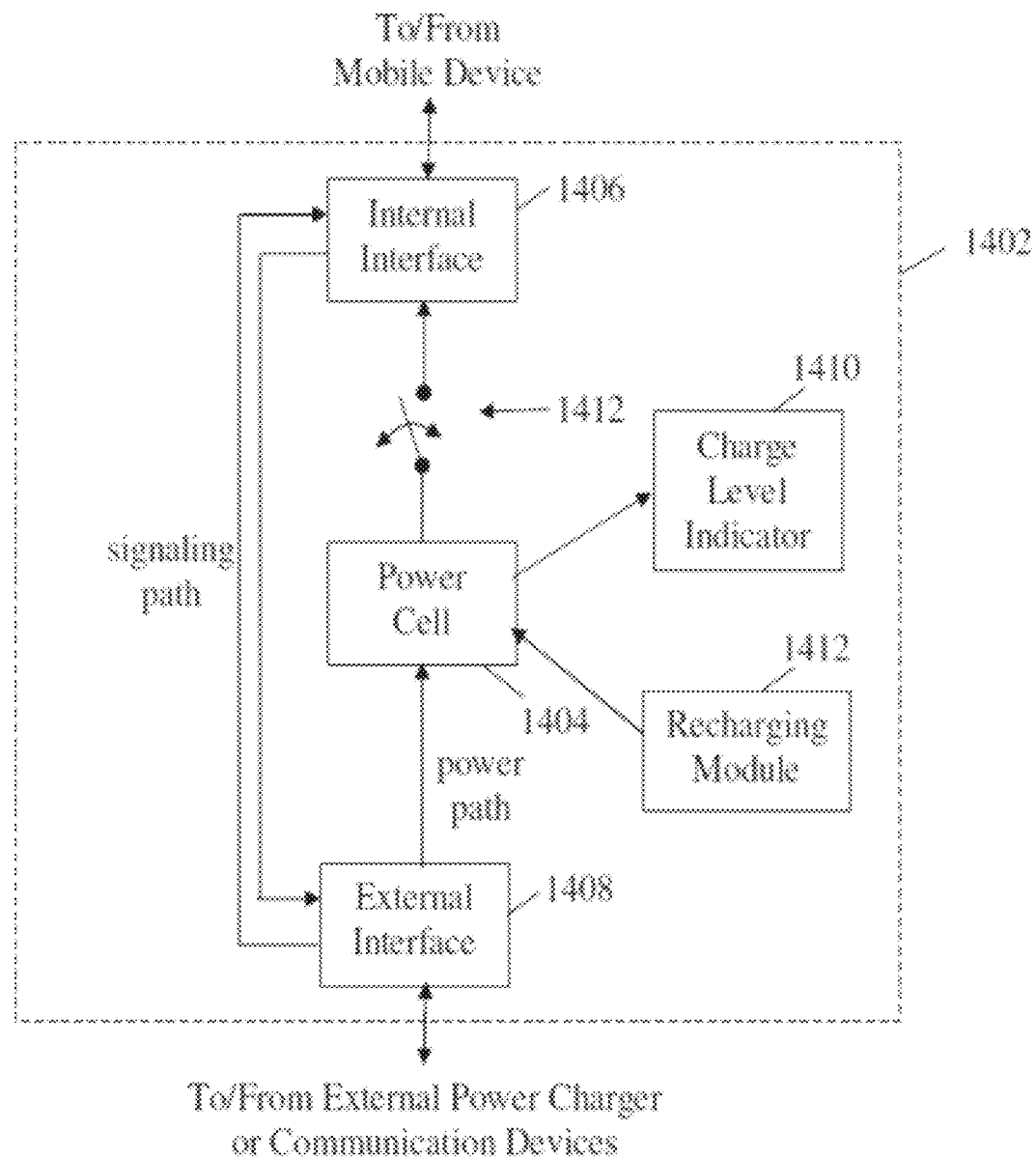
FIG. 14 illustrates a block diagram for the battery pack of FIG. 1.

FIG. 14 illustrates a block diagram for the battery pack 100 of FIG. 1. The battery pack 1402 may include a power cell 1404, an internal interface 1406, an external interface 1408, and charge level indicator 1410. The internal interface 1406 may be adapted to provide a mobile device power from the power cell 1404 as well as passing signal to/from the mobile device to the external interface 1408. The external interface 1408 may allow recharging of the power cell 1404 as well as passing signals to/from the mobile device via the internal interface 1406. A switch 1412 may allow switching power from the power cell 1404 to the mobile device On and Off as desired. Also, a charge level indicator 1410 permits displaying of the charge level of the power cell 1404. Additionally, a recharging module 1412 serves to recharge to power cell 1404 when needed.

Second Embodiment of Battery Pack

FIGS. 15-16 and 18-22 illustrate yet another embodiment of the power pack. In this embodiment, the power pack may operate as previously disclosed but does not include a top section. By removing the top section, the battery pack is more compact in size and ergonomic so that it does not significantly increase or change the size, thickness, and/or shape of mobile communication device 1602 secured thereto.

Figure 15:
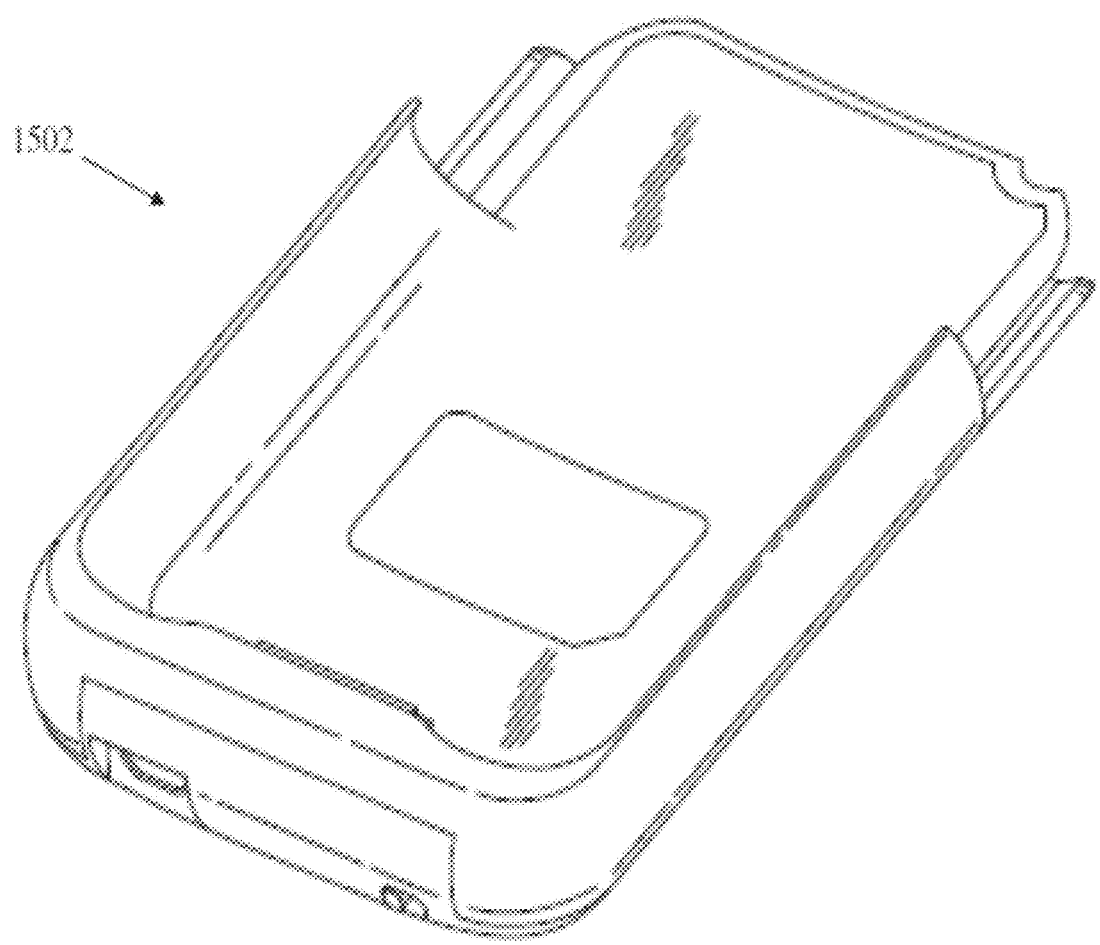
FIG. 15 illustrates a perspective view of the battery pack.

FIG. 15 illustrates a perspective view of the battery pack 1502.

Figure 16:
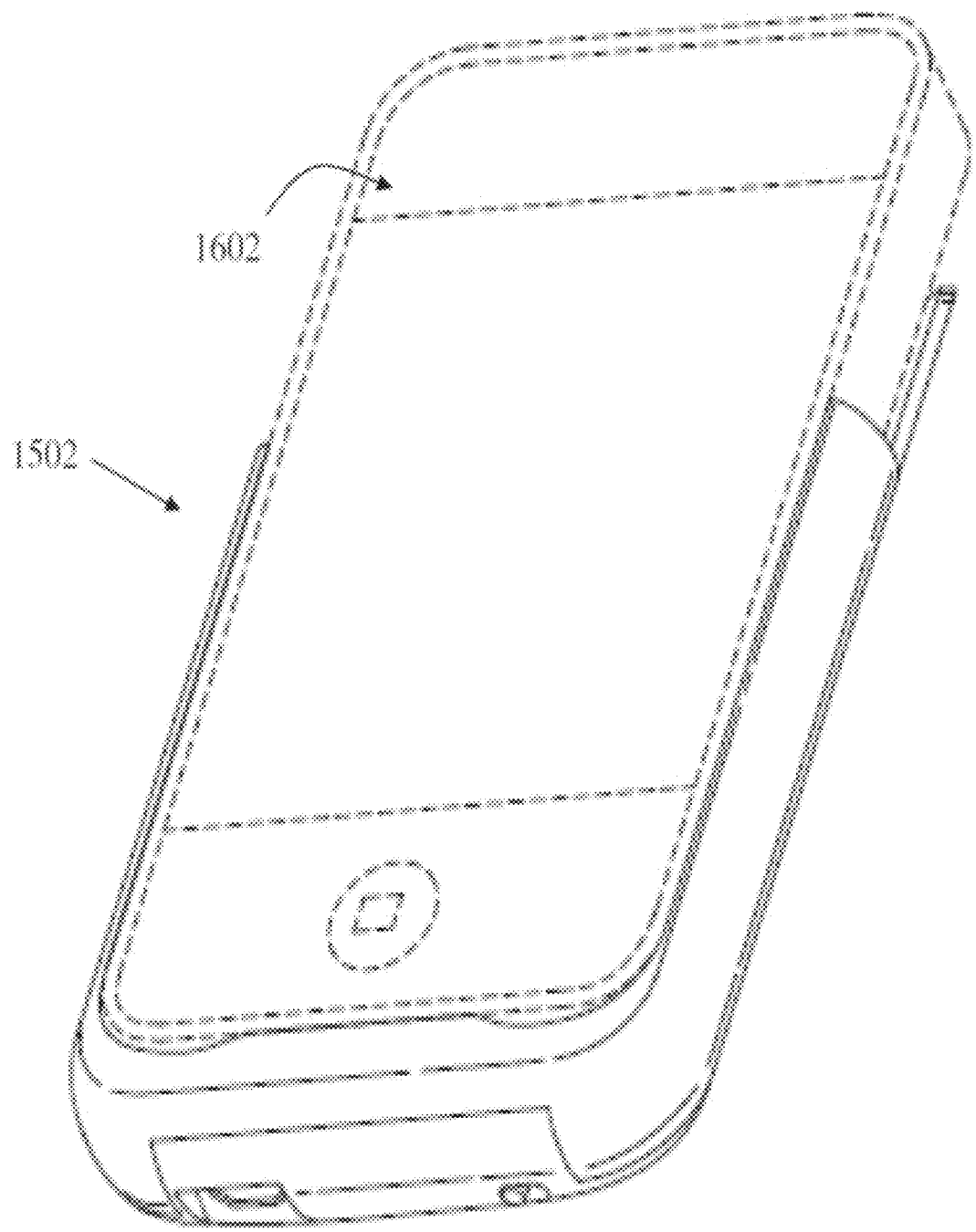
FIG. 16 illustrates a perspective view of the battery pack with a mobile device 1602 inserted therein.

FIG. 16 illustrates a perspective view of the battery pack 1502 with a mobile device 1602 inserted therein.

Figure 18:
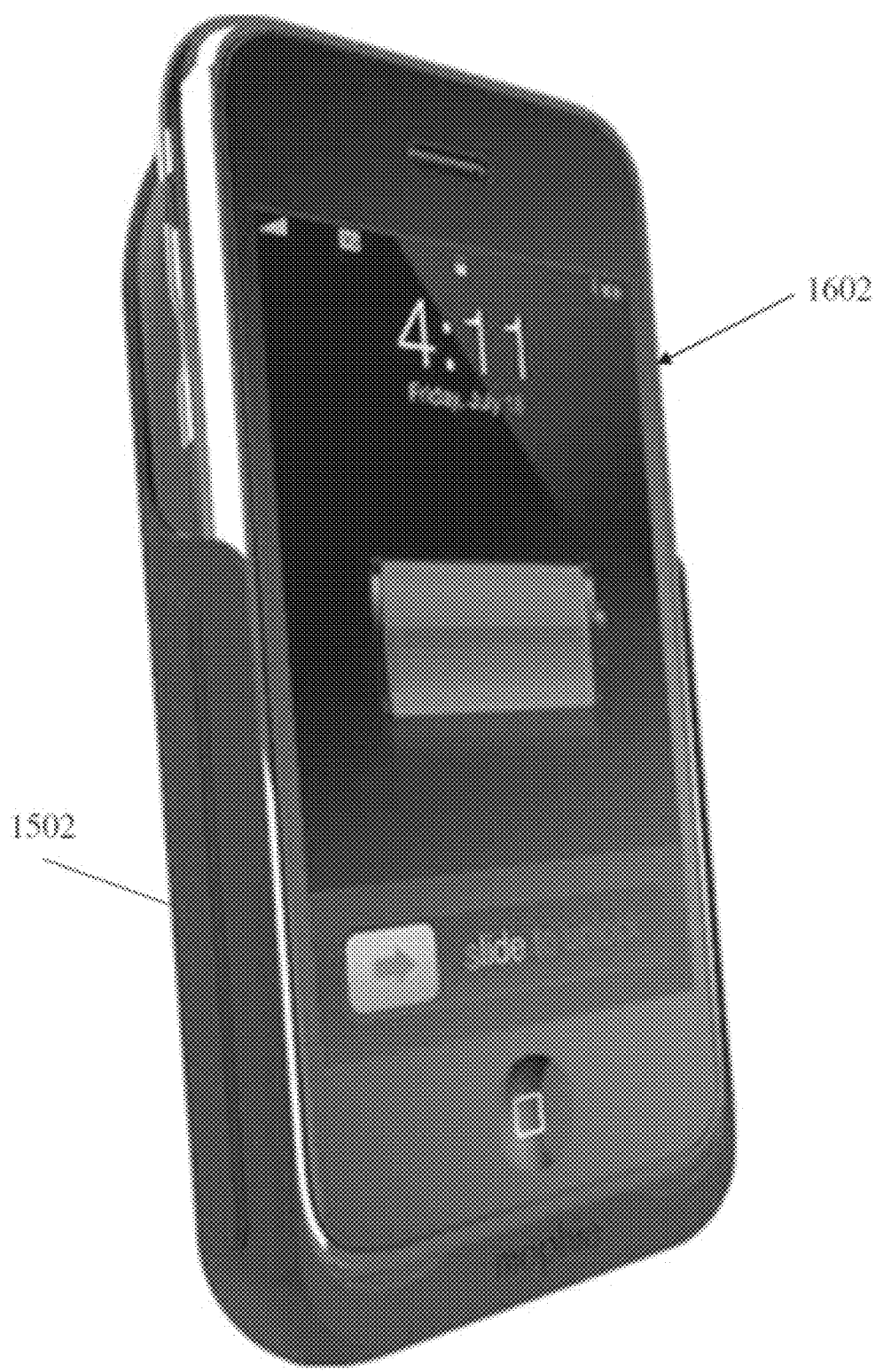
FIG. 18 illustrates another perspective view of the battery pack.

FIG. 18 illustrates another perspective view of the battery pack 1502.

Figure 19:
FIG. 19 illustrates a front view of the battery pack.

FIG. 19 illustrates a front view of the battery pack 1502.

Figure 20:
FIG. 20 illustrates a front view of the battery pack 1502 with the mobile device inserted therein.

FIG. 20 illustrates a front view of the battery pack 1502 with the mobile device inserted therein.

Figure 21:
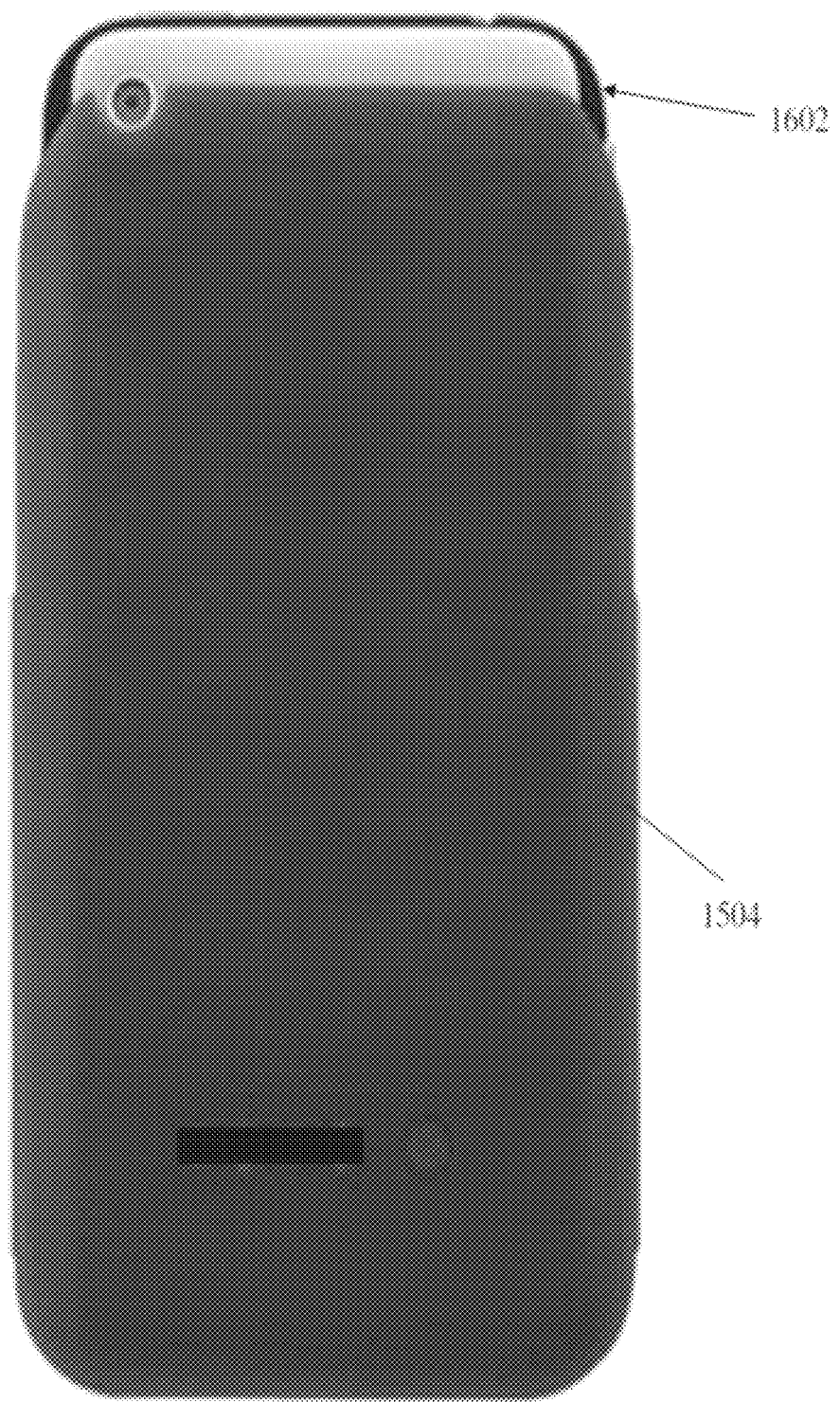
FIG. 21 illustrates a back view of the battery pack with the mobile device inserted therein.

FIG. 21 illustrates a back view of the battery pack 1502 with the mobile device 1602 inserted therein.

Figure 22:
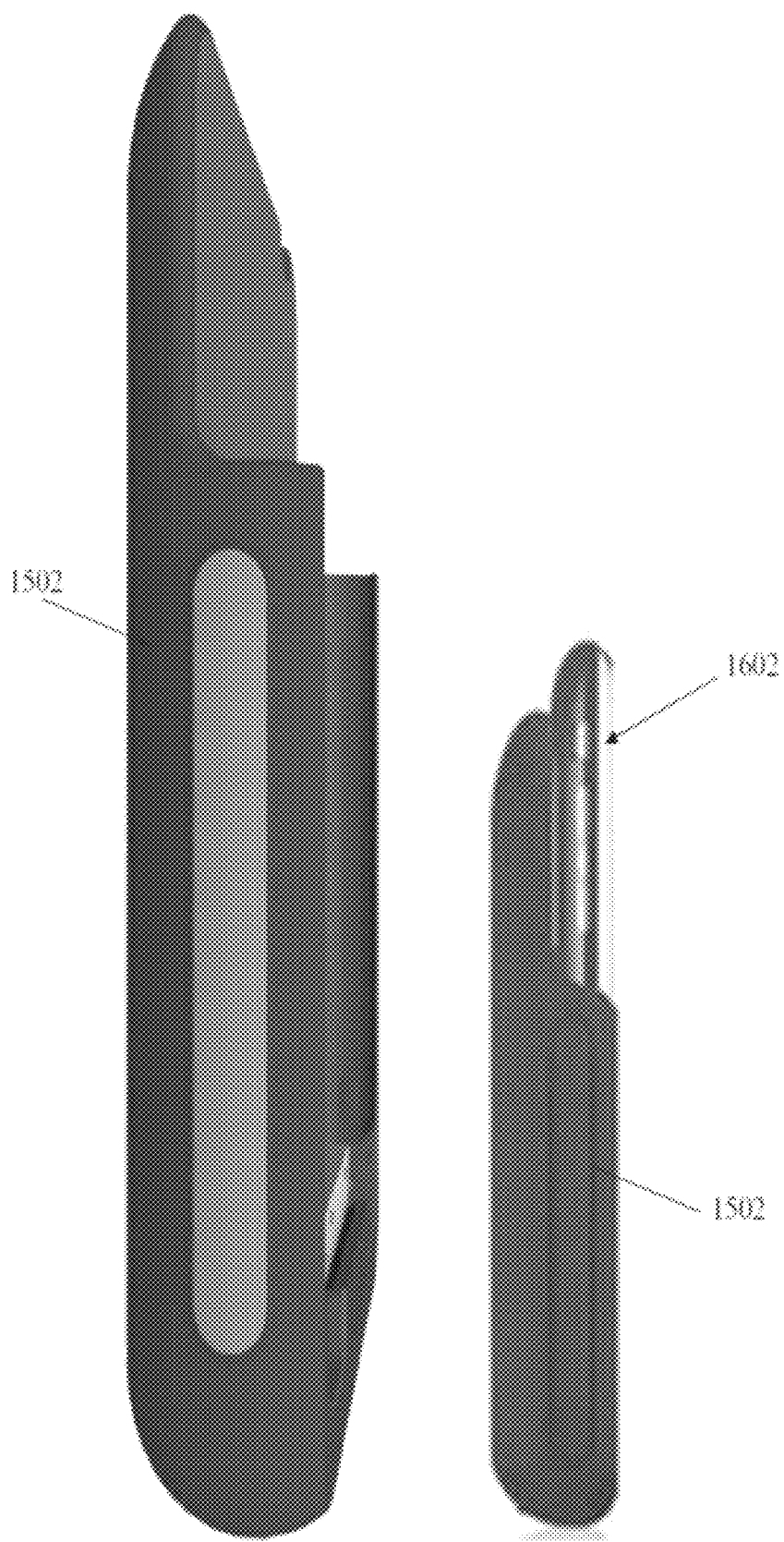
FIG. 22 illustrates a side view of the battery pack with and without the mobile device.

FIG. 22 illustrates a side view of the battery pack 1502 with and without the mobile device 1602. Note that, in some embodiments, the left and right sides may be symmetrical.

Extendible Processing and Interfacing Platform

Figure 17:
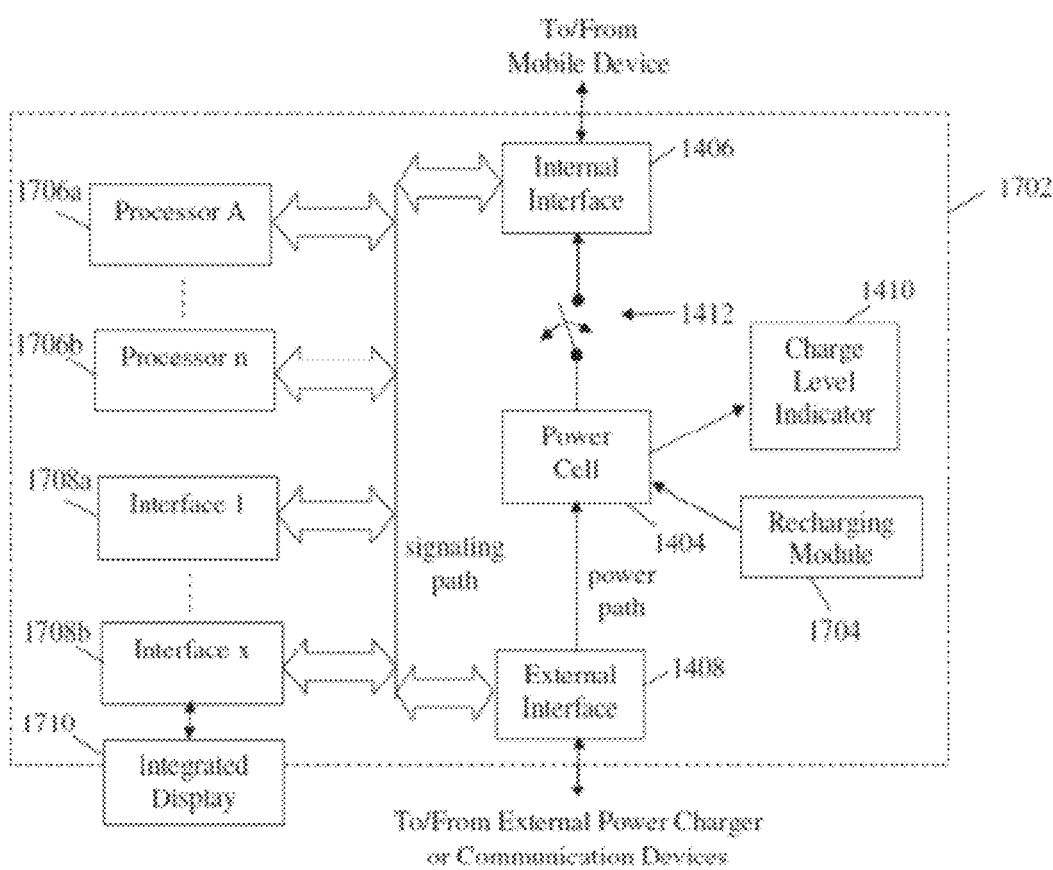
FIG. 17 illustrates a battery pack that also operates as an extendible processing and/or interfacing platform for a mobile device

FIG. 17 illustrates a battery pack that also operates as an extendible processing and/or interfacing platform for a mobile device. In one example, the battery pack 1702 may operate as described with reference to FIG. 14. In addition, the battery pack may also include one or more processors 1706 and/or one or more interfaces 1708. The one or more processors 1706a and 1706b may allow a mobile device coupled to the internal interface 1406 to extend its processing capabilities. For instance, the mobile device may cause one or more applications to be executed on the one or more processors 1706 while using a user display on the mobile device as an output interface. Additionally, the processors 1706a and/or 1706b may be purpose-specific processors that allow the mobile device to perform particular tasks not otherwise possible on its own. For example, the processors 1706 may provide analog-to-digital conversion, audio signal sampling, temperature measuring, etc., which may not be available to the standard mobile device.

The one or more interfaces 1708a and 1708b may also provide the mobile device a method by which to communicate or acquire signals. These interfaces 1708 may effectively expand the communication interfaces available to the mobile device by providing wired and/or wireless communication interfaces for various types of signals (e.g., audio, infrared, etc.).

The battery pack 1702 may also include a recharging module 1704 that facilitates recharging of the power cell 1404. For example, the recharging module 1704 may be a wireless or cordless charging device that inductively or otherwise facilitates recharging of the power cell 1404.

In one example implementation, the battery pack 1702 may be adapted to function as a Medical Processing Unit which may have build-in capabilities for monitoring real-time health conditions (e.g., alcohol levels in breath, pulse, temperature, blood pressure, test and/or diagnose diabetes, etc.) via build-in test port. Consequently, the battery pack 1702 can collect and/or process such collected data and store it in the mobile device. Note that the processing of such data may be directed by an application that operates either on the one or more processors of the battery pack 1702 and/or the processor(s) of the mobile device. According to one feature, if an abnormal health condition occurs (e.g., a heart attack, fainting, seizure, etc.), the Medical Processing Unit may detect this condition and automatically activate the mobile device (e.g., cellular phone) to send urgent text message or emails to a doctor, hospital, or emergency responder. The responding party (doctor, hospital, emergency responder) may be able to locate the patient via a global positioning system or information from the mobile device.

In another example implementation, the battery pack 1702 may be adapted to function as a Gaming Processing Unit that may include the capability of turning the mobile device into a real handheld gaming device with joysticks or large PSP/DS type of gaming buttons and communication devices. Consequently, the mobile device may be configured to operate as an input and/or output interface (e.g., via a display on the mobile device or battery pack) for a game.

In yet another example, the battery pack 1702 may be adapted to function as a Home Entertainment Unit that may include the capability of turning the mobile device into a Universal Smart Remote Control which can control all the IR activated units in a home or office (e.g., control garage doors, television sets, security alarm, air conditioning, etc.). For this purpose, the battery pack 1702 may include various interfaces 1708 that provide the specific infrared and/or wireless protocols and/or signaling to control such devices.

External Processing Mobile Accessory

As discussed above, in reference to FIG. 17, the battery pack 1702 may operate as an extendible processing unit that comprises one or more processors 1706a and 1706b, and one or more interfaces 1708a and 1708b. The one or more processors 1706a and 1706b may allow a mobile device coupled to the internal interface 1406 to extend its processing capabilities, while the one or more interfaces 1708a and 1708b may also provide the mobile device a method by which to communicate or acquire signals. This concept may be extended to an external processing mobile accessory that may include one or more processors and/or devices (with or without the external battery) that extends the functionality of, or adds capabilities to the mobile device.

More particularly, the external processing accessory may serve as a processing platform to which other application specific accessories may interchangeably couple to, in order to take advantage of the external processing accessory's hardware (e.g., processing circuitry, memory, I/O interfaces, etc.), and/or software (e.g., firmware, applications, operating system, etc.). For example, a third party vendor may wish to manufacture an application specific mobile device accessory that measures blood glucose levels. Ordinarily, the manufacturer of the blood glucose measuring accessory would have to design and manufacture the accessory to have complex hardware components and associated software/firmware that serve to measure, analyze, and communicate the blood glucose level information collected to the mobile device. For example, the accessory may have to comprise, at least, one or more processors, memory, and an interface that communicates with the mobile device. However, these hardware components used within a blood glucose measuring apparatus are all used to perform only one function: reporting a user's blood glucose levels. The blood glucose measuring apparatus would also necessarily require other hardware too, such as, an input that receives blood from the user.

If the third party vendor now wished to manufacture another application specific mobile device accessory, such as a bar code reader, another accessory would have to be designed and manufactured having processors, memory, and a mobile device communications interface, all dedicated—this time—to reading barcodes. Duplication of such hardware resources to perform different tasks is not cost effective. Therefore, there is a need for an external processing accessory that may be removably coupled to a plurality of different application specific accessories, so that the application specific accessories may share the external processing accessory's processors, memory, and communications interfaces to handle common tasks such as processing, storing data, and/or communicating with the mobile device. This would reduce the design complexity and cost of the application specific accessories.

Figure 51:
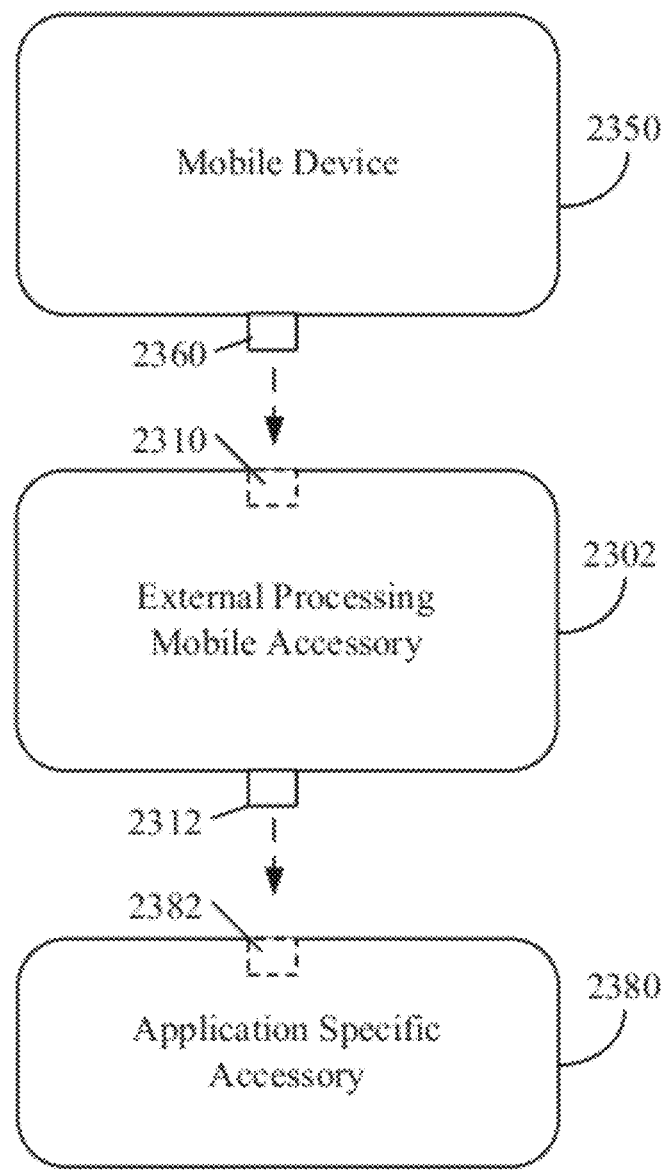
FIG. 51 illustrates a functional block diagram of one embodiment of an external processing mobile accessory configured to provide additional hardware and/or software resources to an application specific mobile device accessory and a mobile device.

FIG. 51 illustrates a functional block diagram of one embodiment of an external processing mobile accessory 2302 configured to provide additional hardware and/or software (e.g., firmware, applications, operating system, etc.) resources to an application specific mobile device accessory 2380 and a mobile device 2350. The external processing accessory 2302 may be housed within a casing that removably couples to the mobile device 2350. The internal interface 2310 of the external processing accessory 2302 transmits data to and receives data from the mobile device interface 2360 of the mobile device 2350. The external processing accessory 2302 also removably couples to the application specific accessory 2380. The external interface 2312 of the external processing accessory 2302 transmits data to and receives data from the communication interface 2390 of the application specific accessory 2380.

The external processing accessory 2302 serves as a bridge between the application specific accessory 2380 and the mobile device 2350. The external processing accessory 2302 may provide for a bulk of the processing, storing, and mobile device interface communication needs of the application specific device 2380. Thus, the application specific device 2380 may only need to comprise those hardware components that are uniquely necessary to perform its task (e.g., a barcode scanner input device for a barcode reader accessory; a blood reception unit for a blood glucose measuring accessory, etc.). Various application specific devices 2380 may be interchangeably coupled to the external processing accessory 2302 for use with the mobile device 2350. The various application specific devices 2380 may be manufactured by different third party entities.

The application specific accessory 2380 may be, for example, a blood glucose measuring accessory, a blood or breath alcohol measuring accessory, a finger print image reader accessory, a retinal image reader accessory, a barcode reader accessory, a matrix code (i.e., 2D barcode) reader accessory, a near field communication device accessory, a magnetic strip payment card reader accessory, a smart card (contactless and contact) payment card reader, or an inventory management accessory. The application specific accessory 2380 is not limited to these embodiments, but rather, it may be any accessory device with a specific application.

Figure 23A:
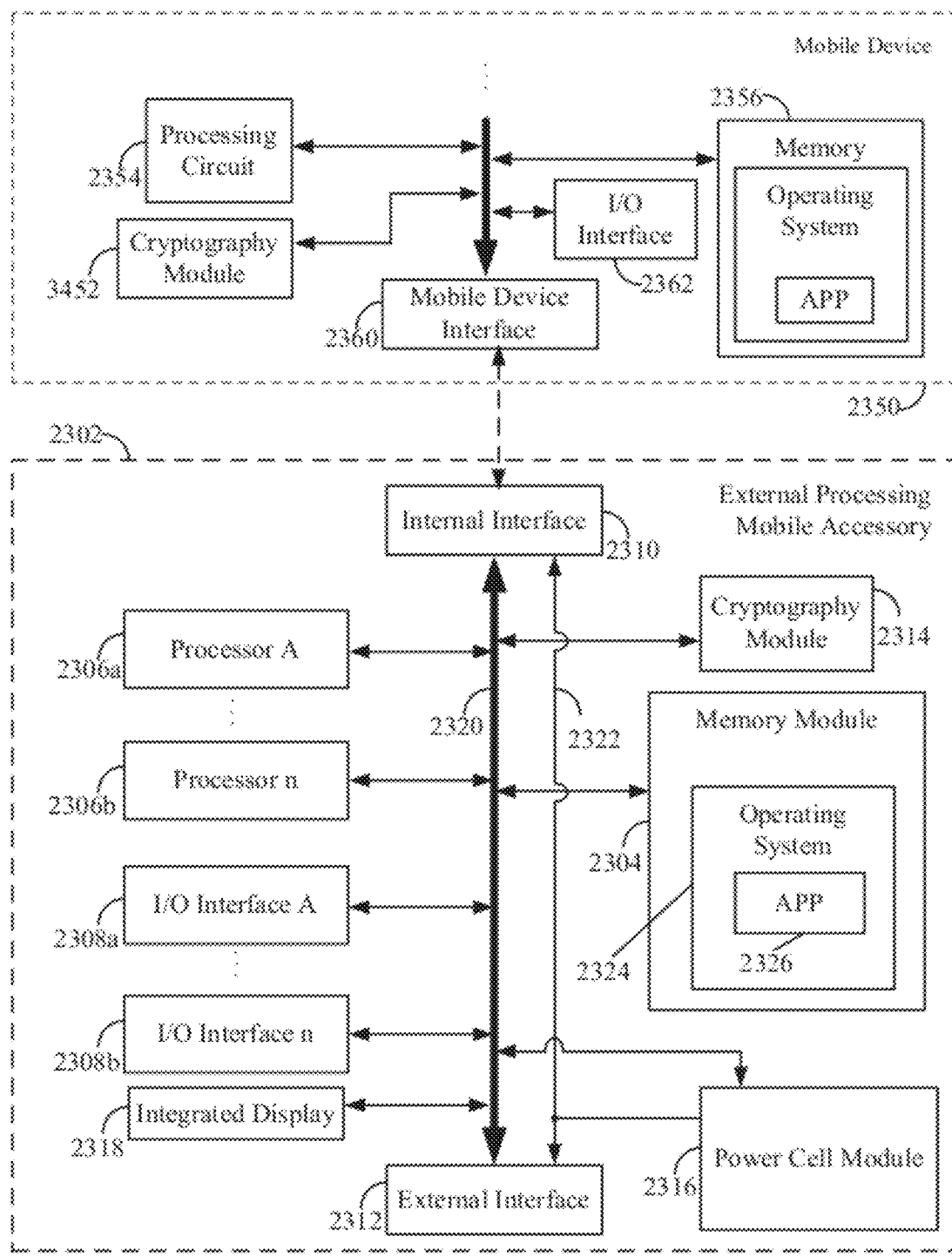
FIGS. 23A and 23B illustrate a functional block diagram of one embodiment of the components of the mobile device, the external processing accessory, and the application specific accessory.
Figure 23B:
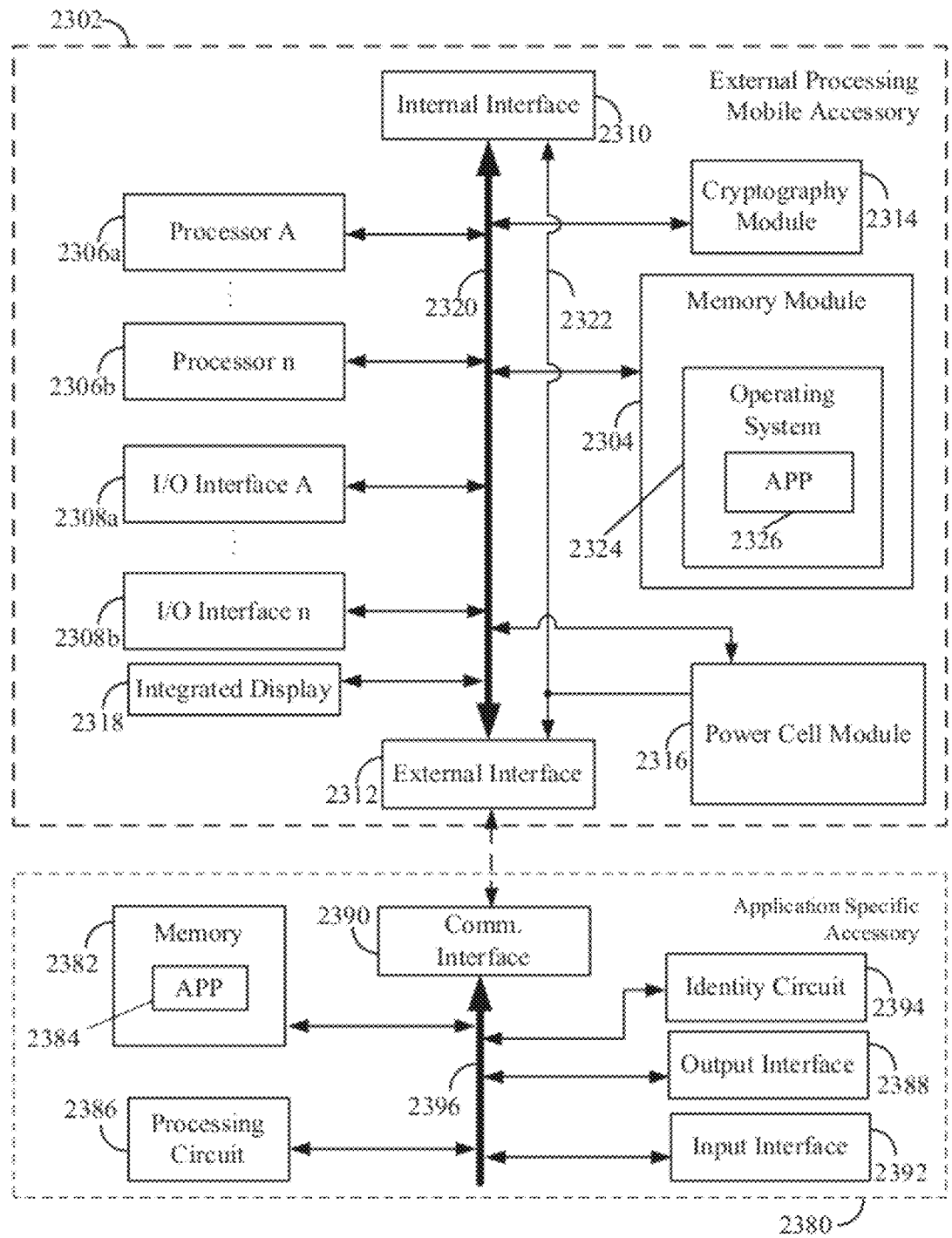

FIGS. 23A and 23B illustrate a functional block diagram of one embodiment of the components of the mobile device 2350, the external processing accessory 2302, and the application specific accessory 2380. The external processing accessory 2302 may comprise a memory circuit 2304 (also referred to as memory circuits), one or more processors 2306a and 2306b (also referred to as processing circuits), one or more input and output (I/O) interfaces 2308a and 2308b, an internal interface 2310, an external interface 2312, a cryptography module 2314, a power cell module 2316 (e.g., battery power source), an integrated display 2318, a bus 2320, and/or a power bus 2322. The bus 2320 serves as a communication interface between the one or more processors 2306a and 2306b, the one or more I/O interfaces 2308a and 2308b, the memory circuit 2304, the internal interface 2310, the external interface 2312, the cryptography module 2314, the power cell module 2316, and/or integrated display 2318.

The external processing accessory 2302 may transmit and receive data to the mobile device 2350. Specifically, the internal interface 2310 of the external processing accessory 2302 communicatively couples to the mobile device interface 2360 of the mobile device 2350. In one embodiment, the internal interface 2310 and mobile device interface 2360 physically couple to one another to transmit data through a wire, bus, and/or electrical contact connection. Such a connection may also serve to physically secure the external processing device 2302 to the mobile device 2350. Alternatively, or in addition to such a wired connection, the internal interface 2310 may transmit and receive data to the mobile device 2350 wirelessly, using for example a Bluetooth standard, or any one of the 802.11 standards.

Moreover, the external processing accessory 2302 may transmit to and receive data from the application specific accessory 2380. Specifically, the external interface 2312 of the external processing accessory 2302 communicatively couples to the communication interface 2390 of the application specific accessory 2380. In one embodiment, the external interface 2312 and communication interface 2390 physically couple to one another to transmit data through a wire, bus, and/or electrical contact connection. Such a connection may also serve to physically secure the external processing device 2302 to the application specific accessory 2380. Alternatively, or in addition to such a wired connection, the external interface 2312 may transmit and receive data to the application specific accessory 2380 wirelessly, using for example a Bluetooth standard, or any one of the 802.11 standards.

The power cell module 2316 is an optional module that may comprise the power cell 1404, charge level indicator 1410, recharging module 1704, and switch 1412 of FIG. 17. The power cell module 2316 and its components may perform some or all of the functions of the battery pack described in FIGS. 1-22. For example, the power cell module 2316 may provide power to the mobile device 2350 through the internal interface 2310 via the power bus 2322. The power cell module 2316 may also provide power to the application specific accessory 2380 through the external interface 2312 via the power bus 2322.

The memory circuit 2304 may comprise volatile and/or non-volatile storage devices for storing an operating system 2324, software applications 2326, and/or data. In one example, the memory circuit 2304 may comprise one or more independent computer data storage devices, such as, but not limited to, FLASH memory, ROM, RAM, hard disks, optical disks, and the like. The operating system (OS) 2324 can be any type of OS that adequately manages and coordinates the activities and sharing of the external processing accessory's 2302 resources, such as, but are not limited to, Android™, iPhone OS™, Symbian OS™, BlackBerry OS™, Windows Mobile™, Linux, Palm webOS™, and Maemo™. The OS 2324 may also host a variety of computing applications that are resident on memory circuit 2304.

In one embodiment, the memory circuit 2304 may include one or more software applications 2326 (also referred to as firmware) that are each associated with an application specific accessory 2380. For example, the memory circuit 2304 may contain an application 2326 specific to a glucose level measuring accessory, that when executed by the processors 2306a, 2306b, controls the glucose level measure accessory device and/or the external processing accessory 2302. The application 2326 controls the hardware associated with the application specific accessory 2380 and the external processing accessory 2302 and may control transmission and reception of data with the mobile device 2350. For example, the application 2326 when executed may cause the external interface 2312 to receive data from the communications interface 2390 of the application specific accessory 2380. The application 2326 may then cause the data to be processed by the processors 2306a, 2306b. The processed data may then be transmitted to the mobile device 2350 for display on the output interface 2362 (e.g., a display) of the mobile device 2350. The application 2326 may also control the internal interface 2310 to receive data from the mobile device 2350 in response to user interaction with the input interface (e.g., a keyboard) 2362 of the mobile device 2350.

In one embodiment, an application 2326 associated with a given application specific accessory 2380 is executed by the processor 2306a upon detection of the associated application specific accessory 2380. That is, the external processing accessory 2302 and/or the application specific accessory 2380 contains circuitry that allows for the automatic detection of a particular application specific accessory 2380 when it is coupled to the external processing accessory 2302 or otherwise turned on. When the application specific accessory 2380 is detected, the associated application 2326 of the application specific accessory 2380 is executed within the external processing accessory 2302 by one or more of the processors 2306a, 2306b. For example, in one embodiment, one or more of the pins of the external interface 2312 detects an identity circuit 2396 (See FIG. 23B) located within the applications specific accessory 2380 upon connection to the communication interface 2390. The identify circuit 2394 may comprise, for example, resistors and/or capacitors that have values uniquely associated with the specific application specific accessory 2380. The unique resistance and/or capacitance value associated with each application specific accessory 2380 allows the external processing accessory 2302 to determine which application(s) to execute upon connection and detection of a particular application specific accessory 2380. In other embodiments, the identity circuit 2394 may comprise identity information that is stored within memory, such as memory circuit 2382, and transmitted to the external processing accessory 2302 upon connection.

In one embodiment, the plurality of applications 2326 that are associated with application specific accessories 2380 may be stored on the memory circuit 2304 near the time of production of the external processing accessory 2302. In other embodiments, applications may be downloaded onto the memory circuit 2304 of the external processing accessory 2302 at a later time via the internal interface 2310 and/or one of the I/O interfaces 2308a, 2308b. In yet other embodiments, the application 2326 may be stored within the memory 2382 of the application specific accessory 2380 and transferred to the external processing accessory 2302 for storage and/or execution when the application specific accessory 2380 is coupled to the external processing accessory 2302. Updates to the applications 2326 may be downloaded to the external processing accessory 2302 by any of the above ways.

The cryptography module 2314 of the external processing accessory 2302 may serve to encrypt and/or decrypt data sent wirelessly or by wire between the internal interface 2310 and the mobile device interface 2360. The cryptography module 2314 may also serve to encrypt and/or decrypt data sent wirelessly or by wire between the external interface 2312 and the communication interface 2390 of the application specific accessory 2380. Various types of data encryption techniques may be utilized that are well known in the art including: symmetric-key cryptography such as Data Encryption Standard (DES), Advanced Encryption Standard (AES), hashing functions (MD5, SHA-1, SHA-2, SHA-3, etc.); and asymmetric-key cryptography such as digital signature schemes like the Rivest, Shamir and Adleman (RSA) algorithm and the Digital Signature Algorithm (DSA). The cryptography modules 2314 and 2352 may be implemented using hardware circuitry, software, or both.

Referring to FIG. 23B, the application specific accessory 2380 may comprise a memory circuit 2382, a processing circuit 2386, an output interface 2388, a communication interface 2390, one or more input interfaces 2392, an identity circuit 2394, and a bus 2396. The bus communicatively couples the memory 2382, the processing circuit 2386, the output, input, and communication interfaces 2388, 2392, and 2390, and the identity circuit 2394 to one another. The communication interface 2390 allows for wireless or wire line communication with the external processing accessory 2302. The specific input interface 2392 for a particular application specific accessory 2380 may vary widely depending on the type of application specific accessory 2380. For example, a blood glucose level measuring accessory may have a receiver adapted to receive blood and measure its glucose level as one of its input interface 2392. A barcode reader accessory may have a barcode scanner as its input and output interface 2392, 2388 to read barcodes.

Ideally, the processing circuit 2386 and memory circuit 2382 of the application specific accessory 2380 are simple in design and low cost. The bulk of the processing and storing functions should ideally be carried out by the external processing accessory 2302 to minimize the complexity and cost of the application specific accessory 2380. Thus, the processing circuit 2386 and memory circuit 2382 of the application specific accessory 2380 may perform only those functions necessary to communicate data received from the input interface 2392 and/or identity circuit 2394 to the external processing accessory 2302 via the communication interface 2390. The processing circuit 2386 and memory circuit 2382 may also control the output interface 2388.

In one embodiment, the memory circuit 2382 stores applications 2384 associated with the application specific accessory 2380. The applications 2384 may be transmitted to the external processing accessory 2302 upon connection to the external processing accessory 2302. The external processing accessory 2302 may then execute the applications 2384 to control communication and operation of the application specific accessory 2380, and transmit any received and/or processed data to the mobile device 2350. In some embodiments, one or more of the applications 2384, may be executed on the processing circuit 2386 of the application specific accessory 2380 to control hardware components of the application specific accessory 2380.

A software development kit (SDK) may also be provided to a potential manufacturer of an application specific accessory 2380. The manufacturer may use the SDK to create unique applications 2326 for a given application specific accessory 2380. The SDK 2326 may include such tools as, but not limited to, a source code editor, a compiler, build automation tools, a debugger, and other utilities that may be presented in an integrated development environment (IDE). The SDK allows users and potential manufacturers to create a variety of unique applications for application specific accessories 2380 that are executed on the one or more processors 2306a and 2306b, and may also utilize the various types of resources available on a particular embodiment of the external processing accessory 2302.

Payment Processing Mobile Accessories
Magnetic Strip Card Reader Embodiment

Figure 24:
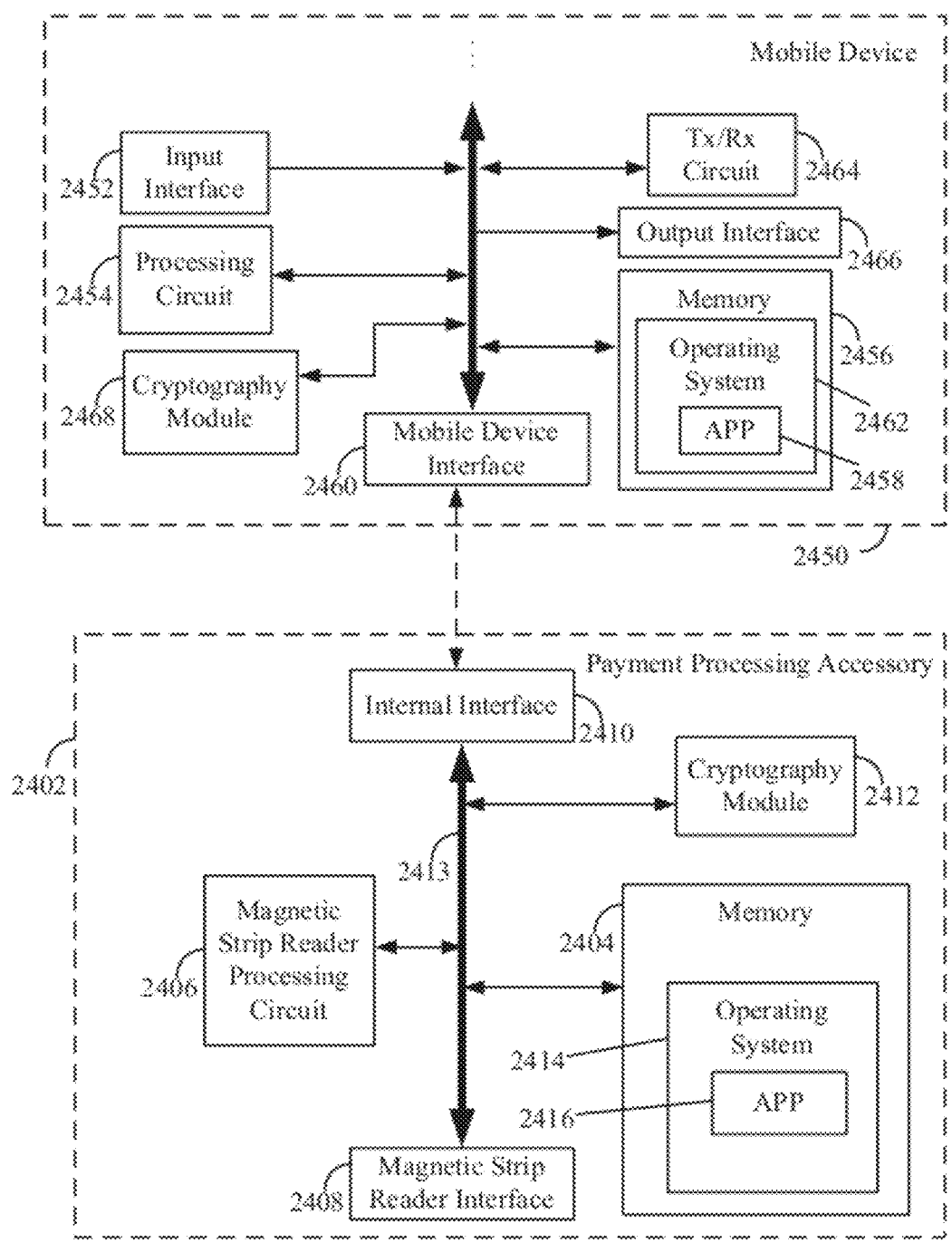
FIG. 24 illustrates a functional block diagram of one embodiment of a payment processing mobile accessory adapted to read data stored on magnetic strips of a payment card.

In other embodiment, an accessory for a mobile device is described that allows the mobile device to receive and process payment transactions from a magnetic strip credit card and/or "smart card" (RFID contact or contactless) based payment card. FIG. 24 illustrates a functional block diagram of one embodiment of a payment processing mobile accessory 2402 (also referred to as a "payment processing accessory 2402") adapted to read data stored on one or more magnetic strips associated with a payment card. The payment processing accessory 2402 may comprise a memory circuit 2404, a magnetic strip reader processing circuit 2406, a magnetic strip reader interface 2408, an internal interface 2410, a cryptography module 2412, and a bus 2413. The bus 2413 allows for communication between the memory circuit 2404, the magnetic strip reader processing circuit 2406, the magnetic strip reader interface 2408, the internal interface 2410, and the cryptography module 2412.

The memory circuit 2404 may comprise volatile and/or non-volatile storage devices for storing an operating system 2414, software applications 2416 (including firmware), and/or data. The memory circuit 2404 may comprise one or more independent computer data storage devices, such as, but not limited to, flash memory, ROM, RAM, hard disks, optical disks, solid-state memory such as flash memory, or any other computer data storage known in the art. The operating system (OS) 2414 can be any type of OS that adequately manages and coordinates the activities and sharing of the payment processing accessory's 2402 resources, such as, but are not limited to, Android™, iPhone OS™, Symbian OS™, BlackBerry OS™, Windows Mobile™, Linux, Palm webOS™, and Maemo™. The OS 2414 may also host a variety of applications 2416 that are resident on memory module 2404. The applications 2416, when executed by magnetic strip reader processing circuit 2406, may control operation of the payment processing accessory 2402. For example, the application 2416 may control how and when payment data is received from the magnetic strip reader interface 2408, how that data is processed, and how it is transmitted to the mobile device 2450 for further processing.

The cryptography module 2412 of the payment processing accessory 2402 may serve to encrypt and/or decrypt any data received or transmitted wirelessly or by wire from the internal interface 2410 to the mobile device interface 2460. The cryptography module 2412 may also serve to encrypt and/or decrypt any data received from the magnetic strip reader interface. For example, at some point after receiving data associated with a payment card from the magnetic strip reader interface, the cryptography module 2412 may encrypt the received data with an encryption scheme before transmitting the data to the mobile device 2450. The encrypted data may then be transmitted to a merchant account provider for decryption and approval. Various types of data encryption techniques may be utilized including: symmetric-key cryptography such as DES, AES, hashing functions (MD5, SHA-1, SHA-2, SHA-3, etc.); and asymmetric-key cryptography such as digital signature schemes like RSA and DSA. The cryptography modules 2412 and 2468 may be implemented using hardware circuitry, software, or both.

In one embodiment, a private and public key pair may be shared between a merchant account provider and the payment processing accessory 2402. Specifically, the merchant account provider that issues the payment cards stores the private key within its system and keeps this key secure. The merchant account provider may then distribute a corresponding public key to the payment processing accessory 2402, which may be stored on the memory circuit 2404. The cryptography module 2412 may then use the public key stored to sign/encrypt data associated with a payment card received from the magnetic strip reader interface 2408. The signed data may then be securely transmitted to the mobile device 2450 which then transmits the account information and purchase amount to the merchant account provider for decryption and approval. In one embodiment, the public key may be programmed into the memory 2404 near the time the accessory 2402 is manufactured. In other embodiments, the public key may be transmitted to the accessory 2402 via a mini-USB interface 2702 (see FIG. 27A). In yet other embodiments, the public key may be transmitted to the accessory 2402 by the mobile device 2450 through the internal interface 2410.

The magnetic strip reader interface 2408 is configured to read magnetic strips on various payment cards, such as credit cards, debit cards, charge cards, pre-paid credit cards, and/or any other card based payment systems that utilize magnetic strips. Magnetic strip reader interface 2408 can be, for example, capable of reading standard three-track strip cards following the ISO/IEC standard 7811.

The magnetic strip reader interface 2408 is configured to read account information and other data associated with a magnetic strip payment card (hereinafter referred to as a "Magcard"). In one example, account information and other data received from the Magcard is read by the magnetic strip reader interface 2408 in connection with and/or to facilitate a purchase transaction. For example, upon swiping a Magcard through the magnetic strip reader interface 2408, the account information and other data is received by the magnetic strip reader interface 2408 and transmitted via the bus 2413 to the magnetic strip reader processing circuit 2406 for processing. The processing circuit 2406 may execute one or more applications 2416 stored within the memory 2404 to carry out specific tasks in connection to facilitating the purchase transaction. For example, the magnetic strip reader processing circuit 2406 may control the magnetic strip reader interface 2408 to receive the account information and the other data. The processing circuit 2406 may then process the data by confirming its authenticity (valid bit string length, unexpired card, etc.). The processing circuit 2406, in conjunction with the cryptography module 2412 may also encrypt the data received. The processing circuit 2406 may then process the data for transmission to the mobile device 2450 through the internal interface 2410. These steps may be performed automatically after the Magcard is swiped through the magnetic strip reader interface 2408.

In other embodiments, the account information and other data may also be transmitted via the bus 2413 to the memory module 2404 for storage. In one example, the magnetic strip reader processing circuit 2406 may be a programmable logic array that processes account information and other data directly received from the magnetic strip reader interface 2408.

In one embodiment, the mobile device 2450 may execute a payment processing application 2458 on the mobile device processing circuit 2454 to receive and process the account information and other data received from the payment processing accessory 2402. The payment processing application 2458 may be a unique application specially developed by a particular merchant account provider using a software development kit (SDK) provided to the merchant account provider by the manufacturer of the payment processing accessory 2402. The application 2458, once executed, may allow a user of the mobile device 2450 to enter detailed information related to the particular purchase transaction. For example, the user may be prompted to enter purchase amount information, a card holder's signature, date of transaction, etc. into an input interface 2452, such as a keyboard, touch-screen display, etc., of the mobile device 2450. Other information may also be entered such as any security passwords necessary to proceed with the transaction, for example, a PIN known to either the card holder or the merchant processing the transaction.

Once the necessary account information and other data has been received by the mobile device 2450 from the payment processing accessory 2402, and any details regarding the purchase amount have been entered, the transmission and receive (Tx/Rx) circuit 2464 of the mobile device 2450 may wirelessly transmit the account information (e.g., credit card number) and purchase transaction information (e.g., transaction amount, etc.) through the mobile device's wireless network to the merchant account provider for approval. The Tx/Rx circuit 2464 of the mobile device 2450 may also receive an acknowledgment message from the merchant account provider that the charge was approved (or another message that it was declined). The acknowledgment message may be communicated to the purchaser or merchant via the output interface 2466 of the mobile device 2450.

Upon approval, a receipt detailing the transaction may be generated by the mobile device 2450. A signature of the card holder may also be entered through the input interface 2452 of the mobile device to validate the transaction. The receipt information along with any signature may be transmitted wirelessly, or by wire contact, to a local printer for printing. In other embodiments, an email address associated with the purchaser or the Magcard may be entered into the mobile device 2450 via the input interface 2452. Then, upon approval of the transaction the receipt can be emailed to the email address entered by the mobile device 2450. In yet, other embodiments, a receipt detailing the transaction may be generated either before or after a signature is acquired from the purchaser via the input interface 2452.

In other embodiments, a user may start a purchase transaction by launching the payment processing application 2458 on the mobile device 2450 to initialize the payment processing accessory 2402. The processing circuit 2454 may then execute the application 2458 to generate a read request signal that is transmitted to the magnetic strip reader processing circuit 2406 through the mobile device interface 2460—internal interface 2410 connection. Once the processing circuit 2406 of the payment processing accessory 2402 receives the read request signal, it initializes the magnetic strip reader interface 2408 to enter an idle state that is ready to receive account information and other data from a Magcard. In the idle state, the magnetic strip reader interface 2408 will receive the data once a Magcard is swiped. When no read request signal is present, or has not been received in a given time period, hardware components within the payment processing accessory 2402 may be turned off or put in a lower power standby mode thereby minimizing power consumption by the payment processing accessory 2402 when no purchase transaction is expected.

If during the idle state, a Magcard is swiped through the magnetic strip reader interface 2408, the processing 2406 receives the account information and associated data of the Magcard and may process, encrypt, and/or store the data as discussed above. The data may also be transmitted to the mobile device 2450 for completion of the purchase transaction as discussed in the embodiment above.

In other embodiments, the payment processing accessory 2402 may do more than read information from a Magcard and provide it to the mobile device 2450 for processing a purchase transaction. For instance, in cases where the mobile device may not have a connection to a network through which a transaction can be validated (e.g., through which a credit card payment can be approved), the payment processing accessory 2402 may itself include a wireless connection that is capable of communicating with a merchant account provider to validate the transaction. In some implementations, the payment processing accessory 2402 may be powered by the mobile device 2450 via the internal interface 2410, while in other implementations the payment processing accessory 2402 may have its own internal power source (e.g., power cell module 2316 in FIG. 23A).

In yet other implementations, the payment processing accessory 2402 may include an input device to authenticate the user of the Magcard. For example, the payment processing accessory 2402 may include a finger print scanner that collects the payor's finger print and provides it to the mobile device 2450 via the internal interface 2410. The finger print information may be subsequently sent to a merchant account provider for verification as part of authenticating the payment using the Magcard.

It should be understood that the payment processing accessory 2402 is not limited to just a magnetic card reader. In various implementations the payment processing accessory 2402 may include a smart card, proximity reader, and/or bar code scanner adapted to collect information from a payor's payment card.

Figure 25:
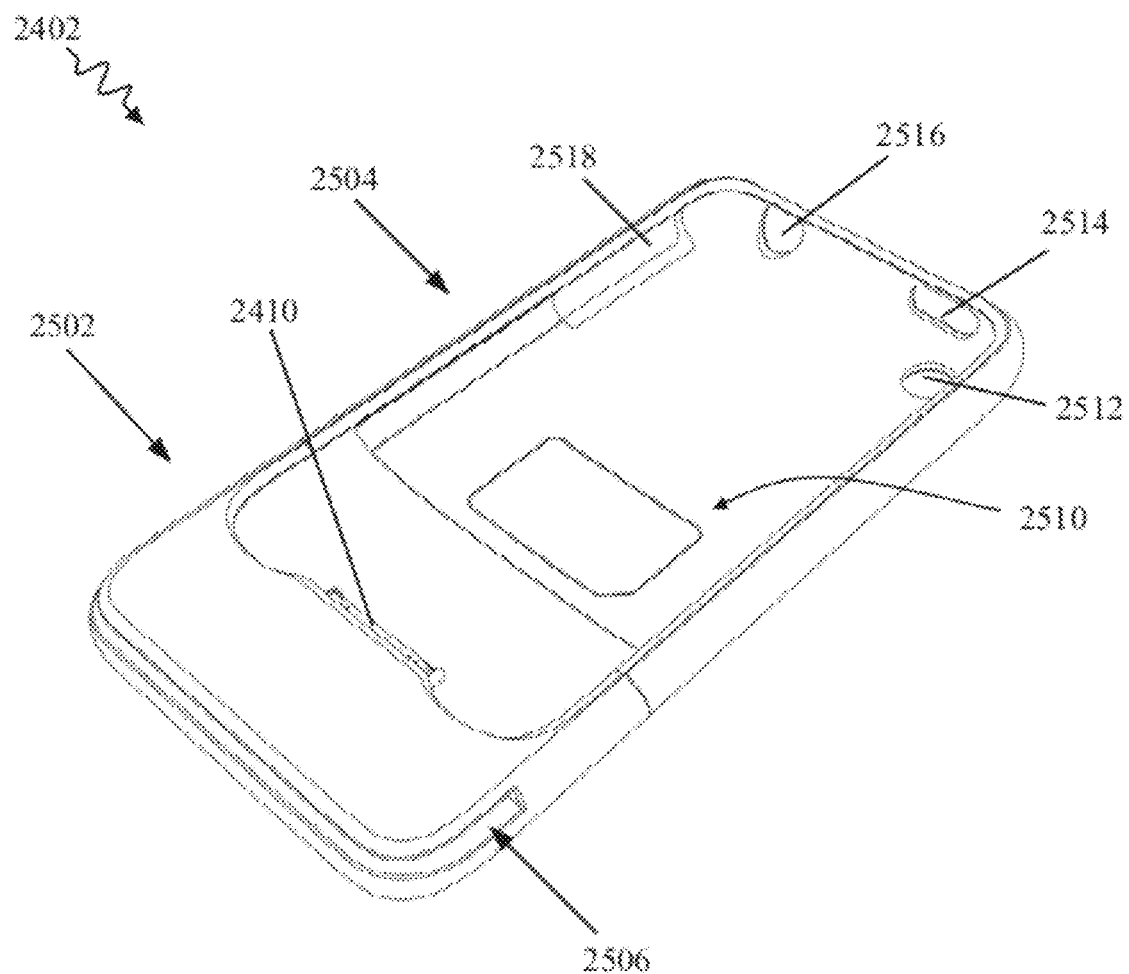
FIG. 25 illustrates a front perspective view of the payment processing accessory.

FIG. 25 illustrates a perspective view of one embodiment of the payment processing accessory 2402. In this example, the payment processing accessory 2402 comprises a casing or holster that is shaped to receive or house a mobile device within a cavity 2510. The cavity 2510 may be contoured to match the outer shape of the particular mobile device the payment processing accessory 2402 is intended to mate with and provide payment card transaction processing capabilities to. FIG. 25 illustrates the internal interface connector 2410 that couples to the corresponding mobile device interface 2460 for the transmission of data between the accessory 2402 and mobile device 2450. The internal interface connector 2410 may snap or lock into place with the mobile device interface 2460 to provide a secure physical connection between the accessory 2402 and mobile device 2450.

The payment processing accessory 2402 may include one or more openings 2512, 2514, 2516, and 2518 to facilitate access to various features of the mobile device. For instance, a first opening 2512 may allow an unobstructed view for a camera lens on the back of the mobile device. A second opening 2514 may provide access to a screen on/off switch for the mobile device. A third opening 2516 may provide access to an audio jack on the mobile device. A fourth opening 2518 may provide access to a volume control sliding switch.

Figure 26:
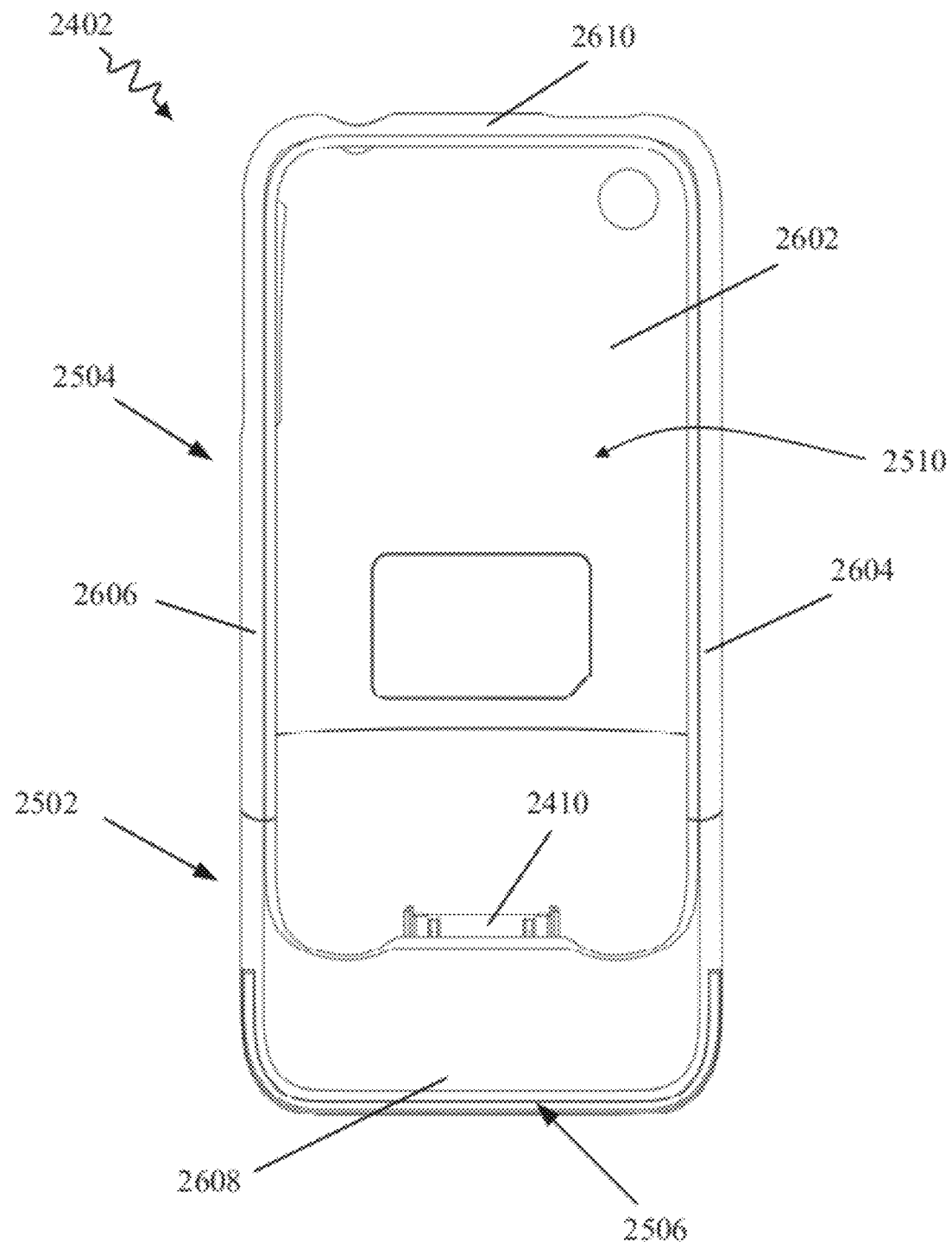
FIG. 26 illustrates a front view of the payment processing accessory.

FIG. 26 illustrates a front view of the payment processing accessory 2402 of FIG. 25. The payment processing accessory 2402 includes a back plane 2602, first and second sides 2604 and 2606, a bottom side 2608, and a top side 2610. The back plane 2602, first and second sides 2604 and 2606, bottom side 2608, and top side 2610 may be shaped to form a pocket or cavity 2510 in which a mobile device can be housed. The top side 2610 of the payment processing accessory 2402 may slide out to allow insertion and removal of the mobile device.

Referring back to FIG. 25, the payment processing accessory 2402 comprises a bottom section 2502 and a top section 2504 that can be separated from each other to allow a mobile device to be inserted within the cavity 2510. The two sections can then be coupled together to secure the mobile device in place. The payment processing accessory 2402 also comprises a magnetic strip swiping region 2506 within which the magnetic strip reader interface is housed. The magnetic strip reader interface is configured to read Magcard account information and other data associated with the Magcard. The magnetic strip reader interface obtains this information when the Magcard is swiped through the magnetic strip swiping region 2506 causing the magnetic strip of the Magcard containing aforementioned data to come into contact with the magnetic strip reader interface.

In the embodiment shown, the magnetic strip swiping region 2506 is located along the bottom side 2608 of the mobile device 2450. This feature allows a user to conveniently hold the mobile device and payment processing accessory 2402 in his/her palm along the first and second sides 2604 and 2606, while sliding a Magcard along the magnetic strip swiping region 2506. In this fashion the magnetic strip swiping region 2506 is not obstructed by the user's hand when the payment processing accessory 2402 housing the mobile device is held is held along the first and second sides 2604 and 2606.

The circuits and/or components of the payment processing device 2402 may be housed within the bottom section 2502 and/or top section 2504. For example, the magnetic strip reader processing circuit 2406 and magnetic strip reader interface 2408 may be housed within the bottom section 2502. A power cell module 2316 may be housed within the thickness of the back plane 2602 of the top section 2504.

Figure 27A:
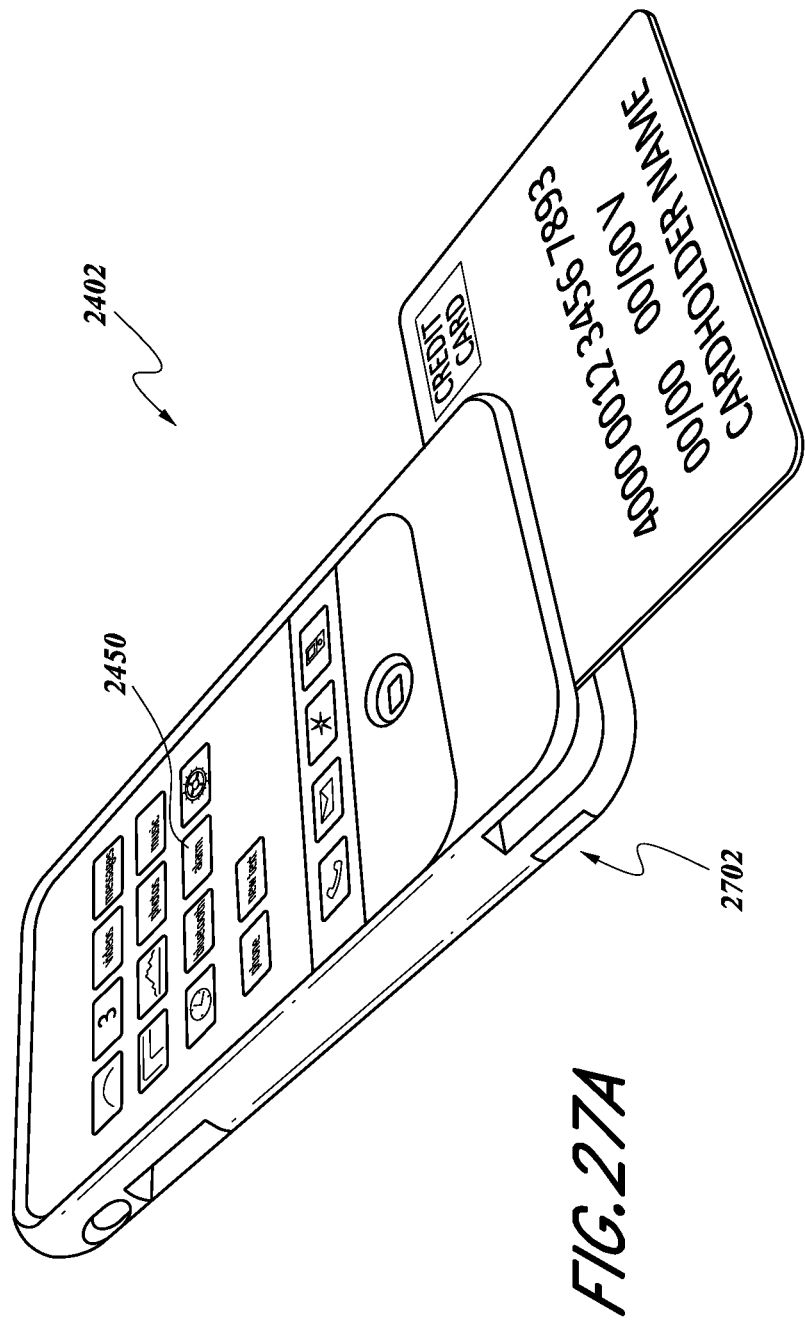

FIGS. 27A and 27B illustrate perspective views of a mobile device 2450 housed within the casing of the payment processing accessory 2402. As can be appreciated from the figures, the payment processing accessory 2402 is shaped to closely wrap around the mobile device 2450, and serves as a protective case for the mobile device 2450. FIGS. 27A and 27B illustrate how a credit card may be swiped through the magnetic strip swiping region 2506. FIG. 27A illustrates an embodiment of the payment processing accessory 2402 that features a mini-USB interface 2702 for charging of the battery of the mobile device 2450, and/or providing communication with the payment processing accessory 2402. FIG. 27B illustrates how an interface cable may be connected to the mini-USB interface 2702 to charge the mobile device 2450 and/or communicate with payment processing accessory 2402.

Figure 28:
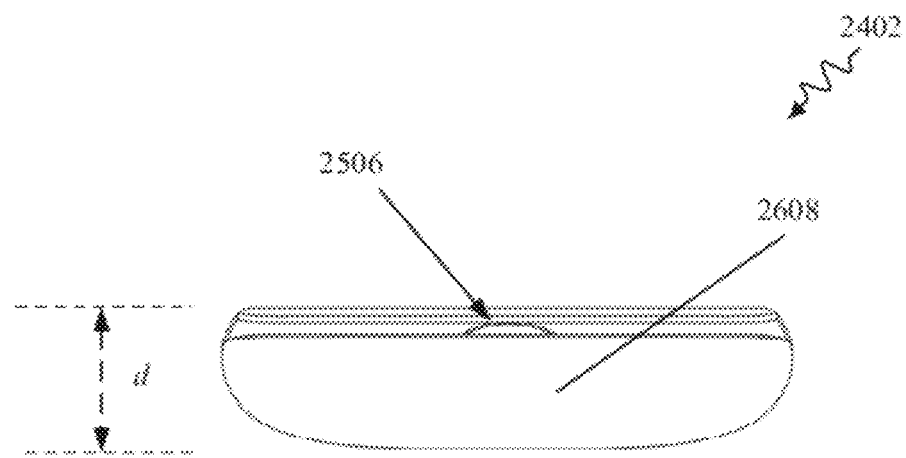
FIG. 28 illustrates a bottom view of the payment processing accessory.
Figure 29:
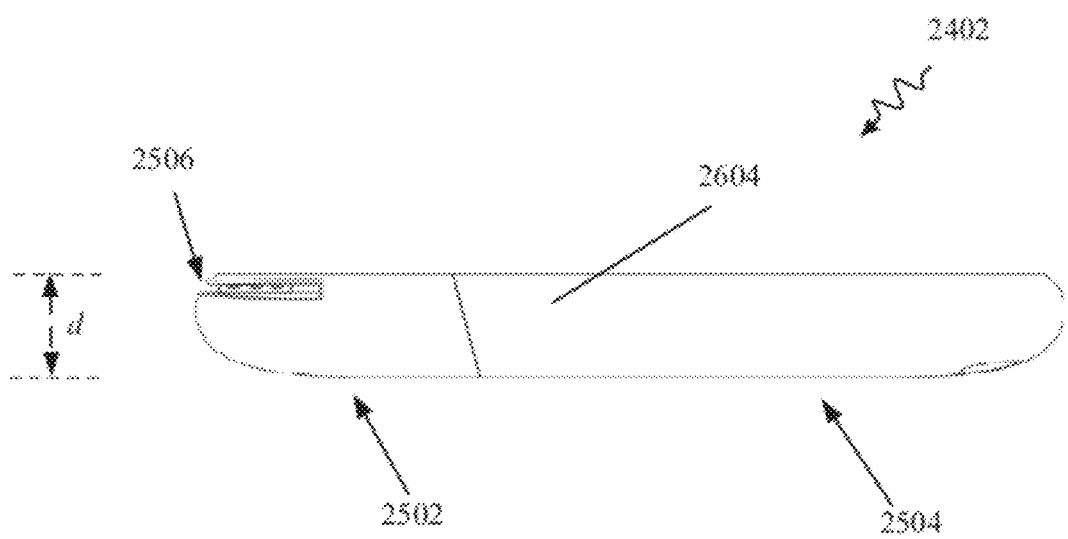
FIG. 29 illustrates a side view of the payment processing accessory.

FIG. 28 illustrates a bottom view of the payment processing accessory 2402. FIG. 29 illustrates a side view of the payment processing accessory 2402. FIGS. 28 and 29 illustrate a measurement d that represents the maximum depth of the casing of the payment processing accessory 2402 (also referred to as the thickness of the payment processing accessory 2402). In one embodiment, the depth d is designed to be as thin as possible so that the overall depth/thickness of the mobile device 2450 and payment processing accessory 2402, together is not substantially more than the depth/thickness of the mobile device 2450 by itself. In one embodiment, the depth d of the payment processing accessory 2402 is less than the depth/thickness of the mobile device 2450 plus 0.25 inches. In another embodiment, the depth d of the payment processing accessory 2402 is less than the depth/thickness of the mobile device 2450 plus 0.125 inches. In another embodiment, the depth d of the payment processing accessory 2402 is less than 1 inch. In yet another embodiment, the depth d of the payment processing accessory 2402 is less than 0.75 inches. In yet other embodiments, the depth d of the payment processing accessory 2402 is less than 0.5 inches. By having a thin depth/profile, the payment processing accessory 2402 housing the mobile device 2450 can be conveniently stored, for example, in the pocket of the user. Payment processing accessories for mobile devices that have a substantially thicker depth/profile cannot comfortably be stored in the pocket of a user.

Figure 30:
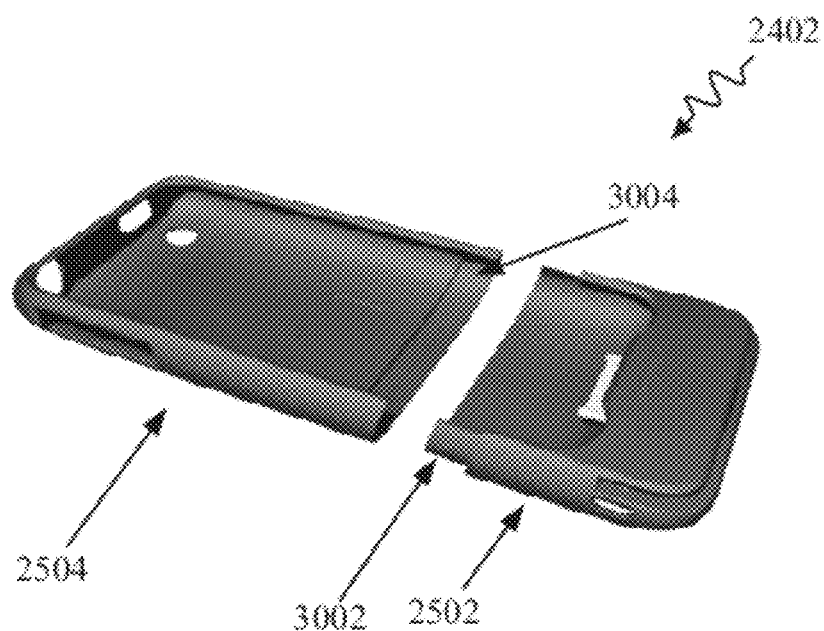
FIG. 30 illustrates the top section of the payment processing accessory detached from the bottom section.

FIG. 30 illustrates the payment processing accessory 2402 of FIG. 25 in an open configuration where the top section 2504 and a bottom section 2502 have been separated. The top section 2504 and the bottom section 2502 may come apart to allow the mobile device 2450 to be inserted into the cavity 2510. The top and bottom section 2504 and 2502 may then be secured to one another to secure the mobile device 2450 within the cavity 2510. In one embodiment, the top section 2504 may include a female connector groove 3004 that receives a male connector rail 3002 of the bottom section 2502. The mail connector rail 3002 is configured to fit inside the female connector groove 3004 to secure the top section 2504 to the bottom section 2502. In this manner, the top section 2504 can be coupled to the bottom section 2502 by pressure fit.

Figure 31:
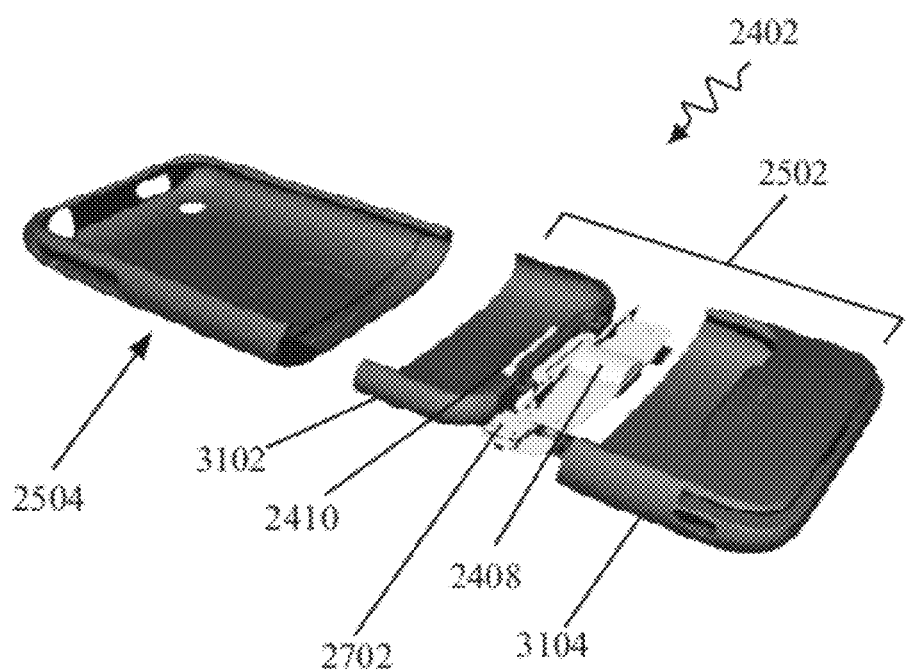
FIG. 31 illustrates an exploded view of the bottom section of e payment processing accessory.

FIG. 31 illustrates the payment processing accessory 2402 with an exploded view of the bottom section 2502. For example, the bottom section 2502 may comprise an inner section 3102, an outer section 3104, the mini-USB interface 2702, the magnetic strip reader interface 2408, and the internal interface 2410. The inner section 3102 and outer section 3104 form a top and bottom shell in between which the mini-USB interface 2702 and the magnetic strip reader interface 2408 are substantially housed. A portion of the internal interface 2410 is also housed within the inner section 3102 and outer section 3104. Consequently, the mini-USB interface 2702, the magnetic strip reader interface 2408, and the internal interface 2410 may be housed within the thickness of the bottom section 2502 of the payment processing accessory 2402.

Figure 32A:
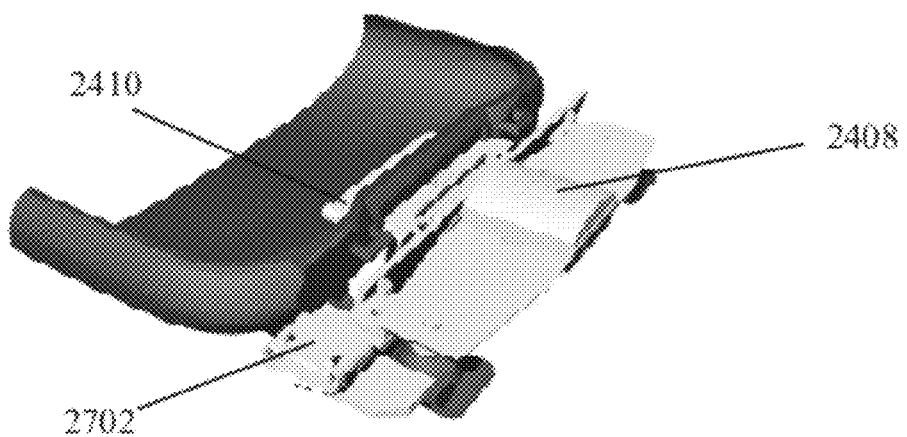
FIG. 32A-32C illustrate perspective views of the internal contents of the bottom section of the payment processing accessory.
Figure 32B:
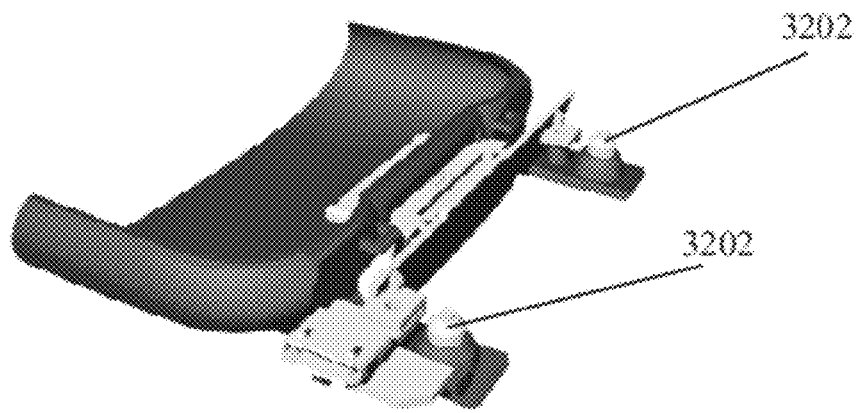
Figure 32C:
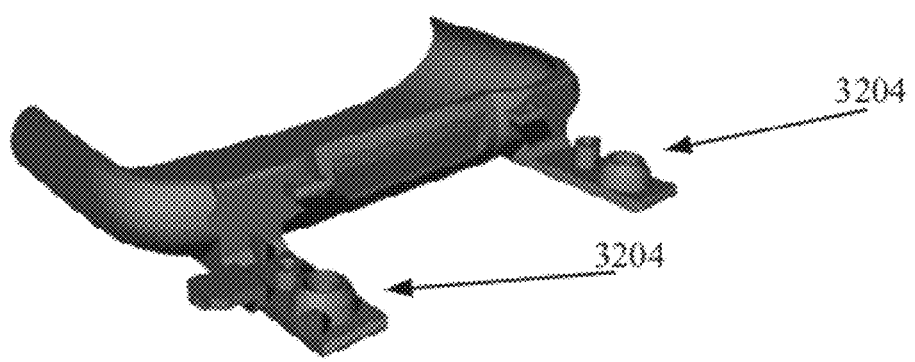

FIG. 32A illustrates a perspective view of the internal contents of the bottom section 2502, including, for example, the magnetic strip reader interface 2408, the internal interface 2410, and the mini-USB interface 2702. FIG. 32B illustrates a perspective view of the magnetic strip reader interface contact points 3202 to which the magnetic strip reader interface 2408 may secure to. FIG. 32C illustrates a perspective view of the mounting rails 3204 that secure the magnetic strip reader interface contact points 3202, the magnetic strip reader interface 2408, the internal interface 2410, and the mini-USB interface 2902.

In other embodiments, the payment processing accessory 2402 may be adapted to have an additional interface that is configured to read "chip and pin" based payment systems, such as, but not limited to, "smart cards." In yet other embodiments, the payment processing accessory 2402 may be adapted to have yet another interface that is configured to read radio frequency identification (RFID) tags that are associated with an electronic payment system of a merchant account provider. In yet other embodiments, the payment processing accessory 2402 may comprise only one of or any combination of: a magnetic card reader interface, chip and pin reader interface, and/or RFID reader interface.

Smart Card Reader Embodiment

Figure 33:
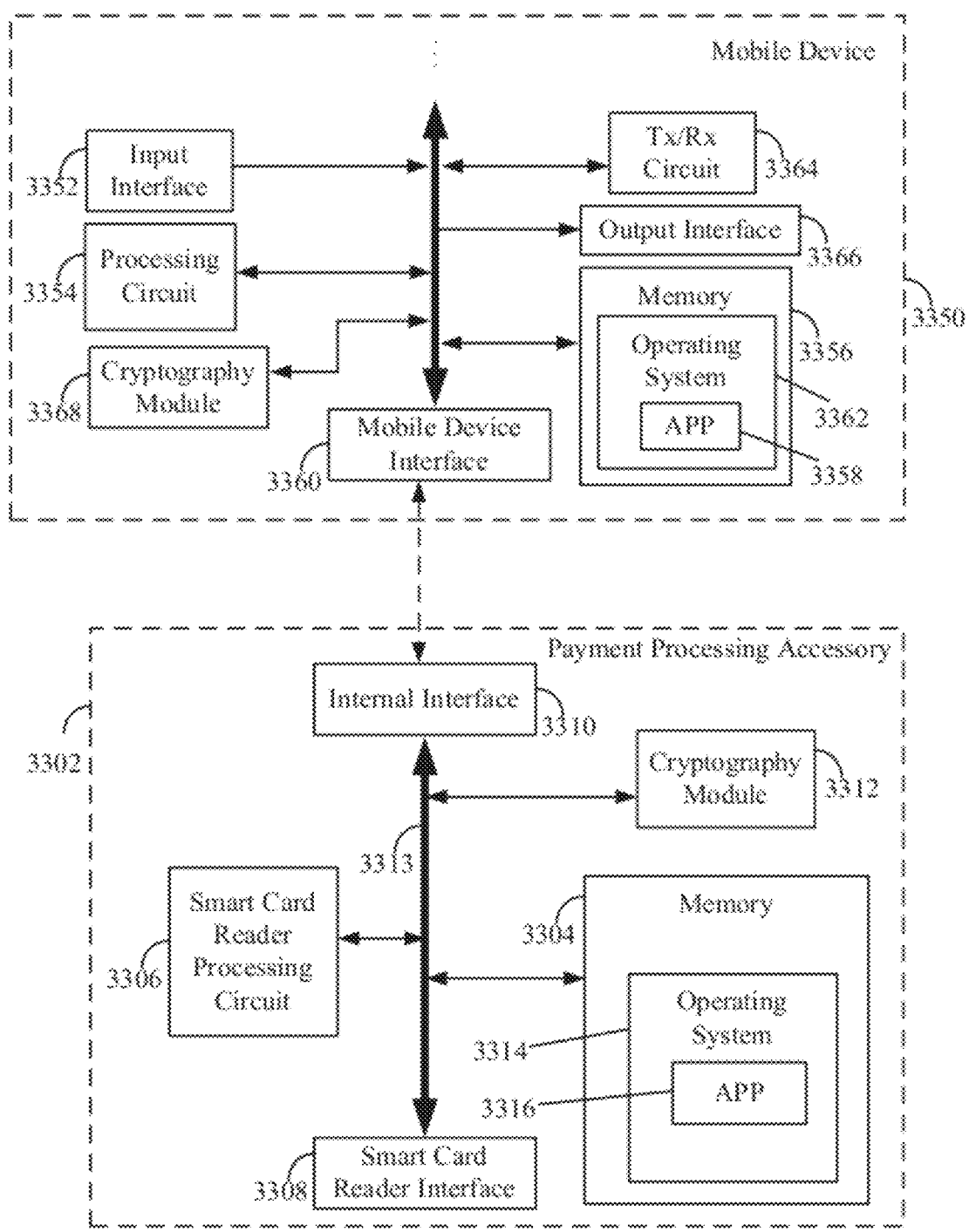
FIG. 33 illustrates a functional block diagram of one embodiment of a payment processing mobile accessory adapted to read data stored on a chip embedded into a payment card.

FIG. 33 illustrates a functional block diagram of another embodiment of a payment processing mobile accessory 3302 adapted to read data stored on an integrated chip embedded into a payment card, such as a "smart card" and/or contactless (near field communication) smart card. The payment processing accessory 3302 may comprise a memory module 3304, a smart card reader processing circuit 3306, a smart card reader interface 3308, an internal interface 3310, an encryption module 3312, and a bus 3313. The bus 3313 allows for communication between the memory module 3304, the smart card reader processing circuit 3306, the smart card reader interface 3308, the internal interface 3310, and the encryption module 3312.

The steps and functions performed by the payment processing accessory 3302 may be very similar to those described in relation to the magnetic payment processing accessory 2402 in FIG. 24. The memory module 3304 may comprise an operating system 3314, and one or more applications 3316. The memory module 2404 may comprise one or more independent computer data storage devices, such as, but not limited to, flash memory, ROM, RAM, hard disks, optical disks, and the like. The operating system (OS) 3314 can be any type of OS that adequately manages and coordinates the activities and sharing of the payment processing accessory's 3302 resources, such as, but are not limited to, Android™, iPhone OS™, Symbian BlackBerry OS™, Windows Mobile™, Linux, Palm webOS™, and Maeme™. The OS 3314 may also host a variety of computing applications that are resident on memory module 3304.

The smart card reader interface 3308 may be configured to read account information and other related data stored on a chip embedded into payment card, such as a smart card. In one embodiment, the smart card reader interface 3308 can be configured to accept and read data from a smart card featuring electrical contacts. In another embodiment, the smart card reader interface 3308 can be configured to accept and read data from a contactless smart card. In such an embodiment, the smart card reader interface uses radio-frequency waves to communicate with the chip embedded within the contactless smart card. In either embodiment, account information and/or other related data stored on the chip within the smart card is read by the smart card reader interface 3308.

Once the account information and/or other data has been received by the mobile device 3350 from the payment processing accessory 3302, and any details regarding the purchase amount and a user pin have been entered, the transmission and receive (Tx/Rx) circuit 3364 of the mobile device 3350 may wirelessly transmit the account information, pin information, and purchase transaction information through its wireless network to the merchant account provider for approval. The Tx/Rx circuit 3364 of the mobile device 3350 may also receive an acknowledgment message from the merchant account provider that the charge was approved. The acknowledgment message may be communicated to the purchaser or merchant via the output interface 3366 of the mobile device 3350.

Upon approval, a receipt detailing the transaction may be generated by the mobile device 3350. The receipt information may be transmitted wirelessly, or by wire contact, to a local printer for printing. In other embodiments, an email address associated with the purchaser or the smart card may be entered into the mobile device 3350 via the input interface 3352. Then, upon approval of the transaction the receipt can be emailed to the email address entered by the mobile device 3350. In yet, other embodiments, a receipt detailing the transaction may be generated either before or after a signature is acquired from the purchaser via the input interface 3352.

Note that, in some implementations, a payment processing accessory may include a combination of payment input interfaces, such as a smart card reader interface 3308, a magnetic strip reader interface 2408, and/or other types of payment input interfaces.

Near Field Communication Accessory

Figure 34:
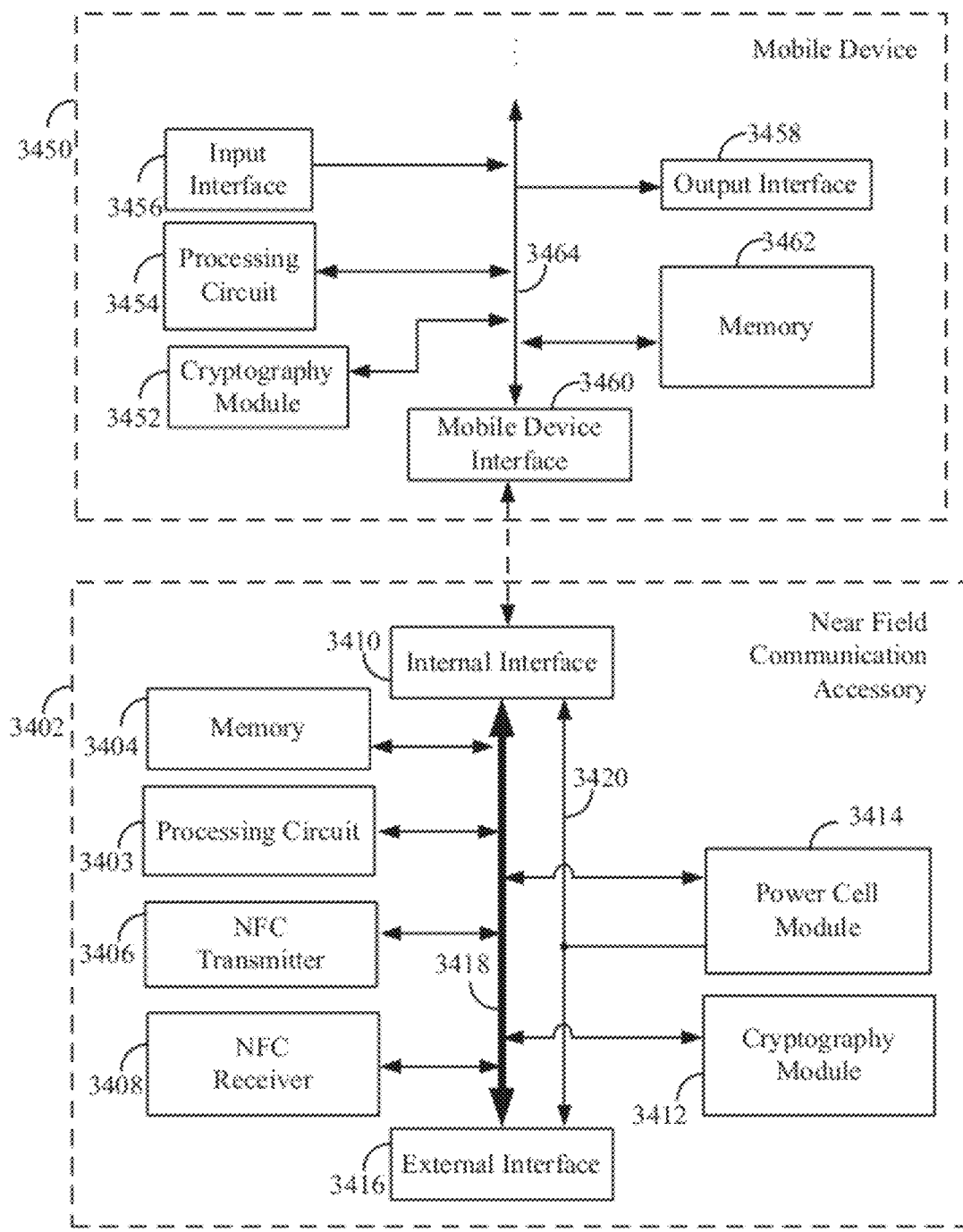
FIG. 34 illustrates a functional block diagram of a near field communication mobile accessory.

In another embodiment, FIG. 34 illustrates a near field communication (NFC) accessory 3402 for a mobile device 3450. The NFC accessory 3402 is capable of communicating with ISO/IEC 14443 smartcards and readers, as well as with other NFC devices, thereby equipping the mobile device 3450 with NFC capability. The NFC accessory 3402 may comprise a processing circuit 3403, a memory circuit 3404, an NFC transmitter 3406, an NFC receiver 3408, an internal interface 3410, a cryptography module 3412, a power cell module 3414, an external interface 3416, a data bus 3418, and a power bus 3420. The data bus 3418 communicatively couples the processing circuit 3403, the memory circuit 3404, the NFC transmitter 3406, the NFC receiver 3408, the internal interface 3410, the cryptography module 3412, the power cell module 3114, and the external interface 3416.

The NFC accessory 3402 may transmit to and receive data from the mobile device 3450. Specifically, the internal interface 3410 of the NFC accessory 3402 communicatively couples to the mobile device interface 3460 of the mobile device 3450. In one embodiment, the internal interface 3410 and mobile device interface 3460 physically couple to one another to transmit data through a wire, bus, and/or electrical contact connection. Such a connection may also serve to physically secure the NFC accessory 3402 to the mobile device 3450. Alternatively, or in addition to such a wired connection, the internal interface 3410 may transmit and receive data to the mobile device 3450 wirelessly using, for example, a Bluetooth standard, or any one of the 802.11 standards.

The power cell module 3414 is an optional module that may comprise the power cell 1404, charge level indicator 1410, recharging module 1704, and switch 1412 of FIG. 17. The power cell module 3414 and its components may perform some or all of the functions of the battery pack described in FIGS. 1-22. For example, the power cell module 3414 may provide power to the mobile device 3450 through the internal interface 3410 via the power bus 3420, and/or power the NFC accessory 3402.

The memory circuit 3404 may comprise volatile and/or non-volatile storage devices for storing an operating system, software applications, and/or data. In one example, the memory circuit 3401 may comprise one or more independent computer data storage devices, such as, but not limited to, flash memory, ROM, RAM, hard disks, optical disks, and other computer data storage devices known in the art. The operating system (OS) can be any type of OS that adequately manages and coordinates the activities and sharing of the NFC accessory's 3402 resources, such as, but not limited to, Android™, iPhone Symbian OS™, BlackBerry OS™, Windows Mobile™, Linux, Palm webOS™, and Maemo™. The OS may also host a variety of computing applications that are resident on memory circuit 3404.

The cryptography module 3412 of the external processing accessory 3402 may serve to encrypt and/or decrypt data sent wirelessly or by wire between the internal interface 3410 and the mobile device interface 3460. Various types of data encryption techniques may be utilized that are well known in the art including: symmetric-key cryptography such as DES, AES, hashing functions (MD5, SHA-1, SHA-2, SHA-3, etc.); and asymmetric-key cryptography such as digital signature schemes like RSA and DSA. The cryptography modules 3412 and 3452 may be implemented using hardware circuitry, software, or both.

The NFC transmitter 3406 and NFC receiver 3408 are responsible for transmitting and receiving, respectively, data to and from another target NFC device (also referred to as an external NFC device) using near field communication. The transmitter 3406 and receiver 3408 may utilize magnetic field induction to communicate with the target NFC device over a short distance, such as, 20 centimeters. The NFC accessory 3402 can communicate with both existing ISO/IEC 14443 smartcards and readers, as well as with other NFC devices. The transmitter 3406 and receiver 3408 may operate in either a passive communication mode or an active communication mode. Various types of data may be exchanged between the NFC accessory 3402 and the target NFC device.

For example, in one embodiment, an application executed on the mobile device 3450 allows a user to enter in payment card information, such as, credit card numbers, debit card numbers, and information associated with each payment card such as, expiration dates, PIN numbers, billing addresses, etc. via an input interface 3456. The data entered may be stored on the mobile device memory 3462 (which may also store the application executed), and/or transmitted to the NFC accessory 3402 via the mobile device interface 3460 and internal interface 3410 connection. The processing circuit 3403 of the NFC accessory 3402 may receive the payment card data for each payment card and program the NFC transmitter 3406 with the payment card data and associated information.

A user then desiring to make a payment with one of the stored cards may select a card (e.g., through the application on the mobile device 3450) and request that the NFC transmitter 3406 transmit the payment card data to another NFC device responsible for receiving the payment card data. The other NFC device may be pay station that receives and processes payment. For example, the other NFC device may transmit the payment data to a merchant account provider that processes the payment and approves the transaction. The NFC device may then communicate an acceptance message (or denial) to the NFC accessory 3402, which receives the communication via the NFC receiver 3408. The acceptance or denial message may then be transmitted to the mobile device 3450 from the NFC accessory 3402 for any further processing. In one embodiment, the cryptography module 3412 encrypts the payment card data prior to transmission of the data by the NFC transmitter 3406.

In this manner, the combination of the mobile device 3450 and NFC accessory 3402 may serve as an "electronic wallet" whereby a user may avoid having to carry a multitude of physical credit cards. This scheme may also provide improved security over traditional credit cards since the application may request the user to authenticate themselves by, for example, entering a password or PIN prior to clearance of the transaction.

In another embodiment, an application on either the mobile device 3450 or the NFC accessory 3402 keeps track of all such payment transactions and logs information related to the payment transactions to generate expense reports and the like. For example, the application may store time, date, and purchase price information for all payment card transactions that take place. This may assist a user later by having a convenient record of where each transaction took place and how much it was for. For example, a user on a business trip may keep track of all business related expenses and print out the expense report for reimbursement. The application may also utilize GPS hardware resident on the mobile device 3450 or within the accessory 3402 to monitor exactly where the transactions took place. In this fashion, the application can store the time, date, purchase price, and location information for all payment transactions executed. By further utilizing information available on the internet, the application can make an educated guess as to what specific retailer the transaction was executed at by cross referencing the GPS coordinates with a public directory of businesses according to a map.

In another embodiment, the NFC accessory 3402 may provide the mobile device with payment processing capabilities. Specifically, the NFC receiver 3408 may receive data associated with a payment card, such as credit card numbers, expiration date, etc. from another NFC device such as a smart card based credit card. In another embodiment, the NFC accessory 3402 may receive data associated with a coupon from an NFC enabled billboard. For example, an NFC capable kiosk or advertising station may store a plurality of coupon data that is available for download. A user of the NFC accessory 3402 may place the NFC accessory 3402 near the advertising station so that the NFC receiver 3408 may receive and download coupon data using near field communication. The NFC accessory 3402 may then store the coupon data within its memory 3404 and/or transmit it to the mobile device 3450 for storage and/or display of the information acquired to the user.

In another embodiment, the NFC accessory 3402 may transmit coupon data to another NFC device. For example, coupon data that was previously acquired from an advertising station as discussed above may then be redeemed by transmitting the coupon data to a coupon data receiver at, for example, the cashier of the merchant associated with the coupon. The coupon data may also have been acquired from the intern& For example, the mobile device 3150 may connect to the internet and download coupon data from a merchant's website and then transmit this data using the NFC transmitter 3406 to receiving NFC device for redemption.

In another embodiment, the NFC accessory 3402 may be programmed to store access key card information used to open doors and gain access to areas restricted by NFC door locks. Thus, a user would not have to carry around a plurality of NFC access cards. Instead, the user may program all such access card information onto the NFC accessory 3402 and use the NFC accessory 3402 to transmit this information to gain access to restricted areas.

In another embodiment, the NFC accessory 3402 may be programmed to store public transportation account information that allows a user to gain access to a subway car or other public transportation system. For example, the NFC transmitter 3406 may transmit public transportation account information such as travel credit to an NFC kiosk at the public transportation station. The NFC kiosk is configured to receive the travel credit, deduct it from the user's balance, and allow the user access to the public transportation system.

The NFC accessory 3402 can be programmed to store a plethora of information that can later be transmitted to another NFC device receiver. Other such uses may include programming plane or train ticket information onto the NFC accessory 3402 for expedited processing at the airport or train station; programming user identification and/or passport information to the NFC accessory 3402; and purchasing and receiving event tickets from a kiosk or transmitting event ticket information for redemption.

Television Signal Receiver and Battery Pack Mobile Accessory

Figure 35:
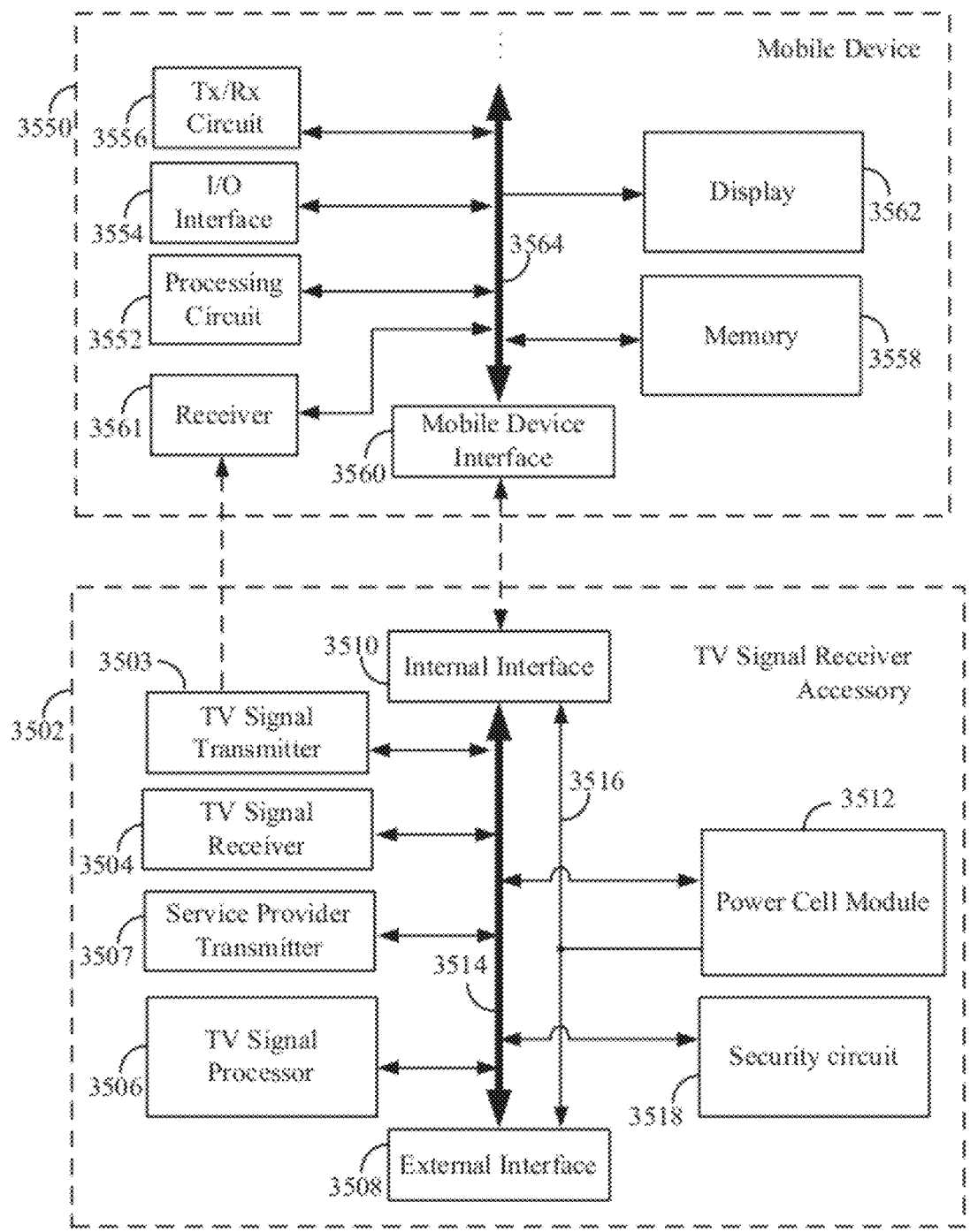
FIG. 35 illustrates a functional block diagram of a television signal receiver and battery pack mobile accessory.

In another embodiment, a television signal receiver accessory for a mobile device is disclosed. FIG. 35 illustrates a functional block diagram of a television signal receiver and battery pack mobile accessory 3502 (hereinafter "TV receiver accessory 3502"). The TV receiver accessory 3502 may comprise a TV signal receiver 3504, a TV signal processor 3506, a TV signal transmitter 3503, a service provider transmitter 3507 an external interface 3508, an internal interface 3510, a power cell module 3512, a data bus 3514, and/or a power bus 3516. The data bus 3514 may allow for communication between the TV signal receiver 3504, TV signal transmitter 3503, TV signal processor 3506, service provider transmitter 3507, the external interface 3508, the internal interface 3510, and/or the power cell module 1512.

The power cell module 3512 is an optional module that may comprise the power cell 1404, charge level indicator 1410, recharging module 1704, and switch 1412 of FIG. 17. The power cell module 3512 and its components perform all the functions of the battery pack described above. For example, the power cell module 3512 may provide power to the mobile device 3550 through the internal interface 3510 via the power path 3516. The power cell module 3512 may also power the hardware components of the TV receiver accessory. The power cell module 3512 may also recharge the battery of the mobile device 3550 through the internal interface 3510 via the power path 3516.

The TV receiver accessory 3502 may be configured to receive and process analog and/or digital television signals, and transmit the television signal data to the mobile device 3550 for viewing on the mobile device output display 3562. In one embodiment of the TV receiver accessory 3502, the TV signal receiver 3504 is configured to receive various types of television transmission signals. The TV signal receiver 3504 may comprise one or more antenna adapted for such a task. These television signals received may include, but are not limited to, one or more of the following: locally broadcast analog television signals, locally broadcast digital television signals, satellite digital multimedia broadcasting (S-DMB) signals, terrestrial digital multimedia broadcasting (T-DMB) signals, 1Seg signals, digital video broadcasting—handheld (DVB-H or DVB-H2) signals, and MediaFLO based signals, such as FLOTV™ signals. In other embodiments, the TV signal receiver 3504 may also be configured to receive satellite digital audio radio service (SDARS) signals, such as XM™ and Sirius™ signals. In yet other embodiments, the TV receiver accessory 3502 may comprise additional circuitry and a separate antenna that is dedicated to receiving SDARS signals.

After the TV signal receiver 3504 receives the TV signals, the TV signal processor 3506 may perform any required processing, such as decryption, filtering, and/or data conditioning. The processed data may then be transmitted to the mobile device 3550 for display on the mobile device's display 3562. The processed data may either be transmitted wirelessly by the TV signal transmitter 3503 or by wire line connection through the internal interface 3510. The TV signal transmitter 3503 may transmit the data to a corresponding wireless receiver 3561 on the mobile device 3550. For example, the TV signal transmitter 3503 may utilize a BlueTooth™ comunication protocol, or any 802.11 wireless protocol. The wireless link should have a bandwidth capable of transmitting audio and video signal components, including high definition video and sound signals.

In another embodiment, the TV signals may be transmitted to the mobile device 3550 through a wire line connection via the internal interface 3510 coupled to the corresponding mobile device interface 3560. The internal interface 3510 and the mobile device interface 3560 may physically and electrically couple to one another to facilitate transmission and reception of data between the mobile device 3550 and the TV receiver accessory 3502. This data may include the TV signals transmitted from the TV receiver accessory 3502 to the mobile device, service order data (e.g., pay per view order requests) transmitted from the mobile device 3550 to the TV receiver accessory 3502, and also power from the power cell module 3512 to the mobile device 3550.

The mobile device 3550 may comprise, among other things, a processing circuit 3552, an input and output (I/O) interface 3554, a transmission and receive (Tx/Rx) circuit 3556, memory 3558, the mobile device interface 3560, a TV signal receiver 3561, a display 3562, and/or a bus 3564. The bus 3564 may allow for communication between the processing circuit 3552, the I/O interface 3554, the transmit and/or receive (Tx/Rx) circuit 3556, memory 3558, the mobile device interface 3560, the receiver 3561, the display 3562, and/or other components of the mobile device 3550.

The processing circuit 3552 may receive the TV signals from the TV receiver accessory 3502 (via either the receiver 3561 or mobile device interface 3560), and perform further processing. For example, in one embodiment, the mobile device's memory 3558 contains an application that can be executed by the processing circuit 3552 to further process the television signal data received. The application may allow a user of the mobile device 3550 to display a channel guide feature by which the user may select a television program channel. The input interface 3554 may be used to select a channel, select recording options for recording select programs at select times, and change resolution and other display features. The processing circuit 3552 may also transmit the TV signals to the display 3562 for viewing by a user of the mobile device 3550.

In one embodiment, the TV receiver accessory 3502 comprises a service provider transmitter 3507 that allows the TV receiver accessory 3502 to transmit data to the service provider of the TV signals. For example, a user may choose to purchase certain programs (e.g., pay per view programs or movies) offered for purchase by the service provider. The selection may be made via the I/O interface 3554 (e.g., a keyboard) on the mobile device 3550 and transmitted to the TV receiver accessory 3502. The TV receiver accessory may then transmit this purchase order information to the service provider for processing.

In one embodiment, the user of the mobile device 3550 can utilize the Tx/Rx circuit 3556 of the mobile device 3550 to communicate with a television signal service provider (e.g., FLOTV™) to order and/or pay for select services. Communication may be performed wirelessly and carried out by the wireless network and/or service associated with the mobile device 3550. Thus, pay per view services may be ordered utilizing the transmitter circuit 3556 that the mobile device ordinarily uses for making and placing calls or data transfers.

In another embodiment, the TV receiver accessory comprises a security circuit 3518 that is configured to identify a subscriber/user of the TV accessory. For example, the security circuit may be a subscriber identity module (SIM) card that is removably coupled to the TV receiver accessory 3502 and contains a unique subscriber identity number. The security circuit 3518 may disable the TV receiver accessory if the SIM is not authenticated. For example, if a subscriber loses their TV receiver accessory 3502 or does not financially maintain their account, the service provider can disable functionality of the TV receiver accessory 3502 through the SIM card.

Thus, the TV receiver accessory 3502 allows a mobile device 3550 that does not have an integrated television tuner or circuit to receive and display over-the-air television signals (e.g., analog and/or digital).

Additional Features of the External Processing Accessory

Referring again to FIG. 23A, in various implementations the external processing mobile accessory 2302 may comprise an input interface 2308a that is configured to scan bar codes, such as, but not limited to, universal product codes (UPC) and two dimensional bar codes. The processor 2306a may process the data scanned by the bar code scanning input interface 2308a, and transmit the product information to the mobile device 2350 via the internal interface 2310. An application resident on the mobile device's memory 2356 may enable the user of the mobile device 2350 to identify the product/item scanned and carry out certain functions including, updating inventory records, generating purchase/sale transactions, etc. In another embodiment, the external processing accessory 2302 communicatively couples through external interface 2312 to an application specific accessory 2380 configured to scan such barcodes.

In another embodiment, the external processing mobile accessory 2302 may comprise an input interface 2308a that is configured to scan finger prints. The processor 2306a may process the finger print data scanned by the finger print reader input interface 2308, and transmit the finger print data to the mobile device 2350 via the internal interface 2310. An application resident on the mobile device's memory 2356 may be executed by the processing circuit 2354 to identify the finger print scanned. In one embodiment, the finger print scanned is compared to finger print data stored in either memory module 2304 and/or the mobile device memory 2356 for authentication. If the scanned finger print data matches finger print data stored then the user authentication is deemed successful and functionality of the mobile device 2350 is unlocked/allowed to the user. In another embodiment, the external processing accessory 2302 communicatively couples through external interface 2312 to an application specific accessory 2380 configured to scan such finger print data.

In another embodiment, the external processing mobile accessory 2302 may comprise an input interface 2308a that is configured to wirelessly receive restaurant menu information that is broadcast locally from a dining establishment. The processor 2306a may process the data received from the input interface 2308a, and transmit the menu information data to the mobile device 2350 via the internal interface 2310. An application resident on the mobile device's memory 2356 may be executed by the processing circuit 2354 to cause the menu to be displayed on the mobile device's output interface 2362. In one embodiment, the user of the mobile device 2350 may then select one or more food or beverage items, and/or make other requests, and this information may then be transmitted via an output transmitter interface 2308b to a receiver of the dining establishment. In this fashion, a user can see the menu items available and order without the need for a menu or wait staff for assistance. In another embodiment, the external processing accessory 2302 communicatively couples through external interface 2312 to an application specific accessory 2380 configured to receive such menu information broadcast, and transmit menu selection information to a receiver in the dining establishment for quicker order preparation.

Two Piece Casing for Mobile Accessories

Figure 36:
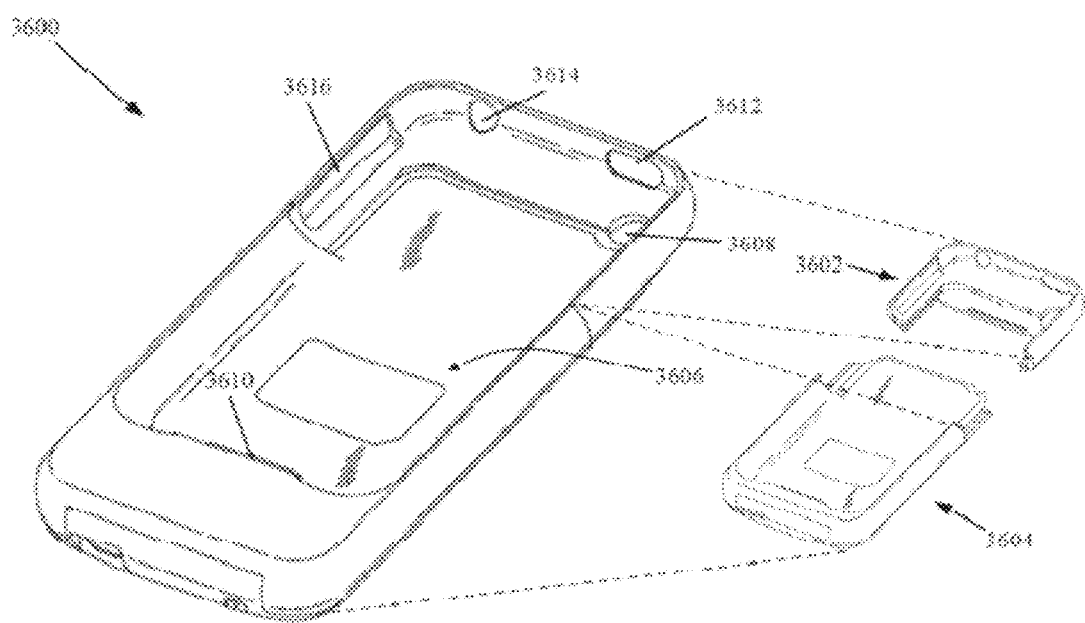
FIG. 36 illustrates a perspective view of a two piece casing that may be used to house an external processing accessory, NFC accessory, TV receiver accessory, or a payment processing accessory.

All of the mobile device accessories disclosed herein, including for example, the external processing accessory 2302, magnetic card payment processing accessory 2402, smart card payment processing accessory 3302, NFC accessory 3402, and TV receiver accessory 3502 may be housed within a casing 3600 (also referred to as a holster) as shown in FIGS. 36-42. FIG. 36 illustrates a perspective view of one embodiment of the casing 3600 in an open and a closed configuration. Specifically, the casing 3600 may comprise a top section 3602 and a bottom section 3604 that separates to allow a mobile device to be housed within a cavity 3606.

Figure 37:
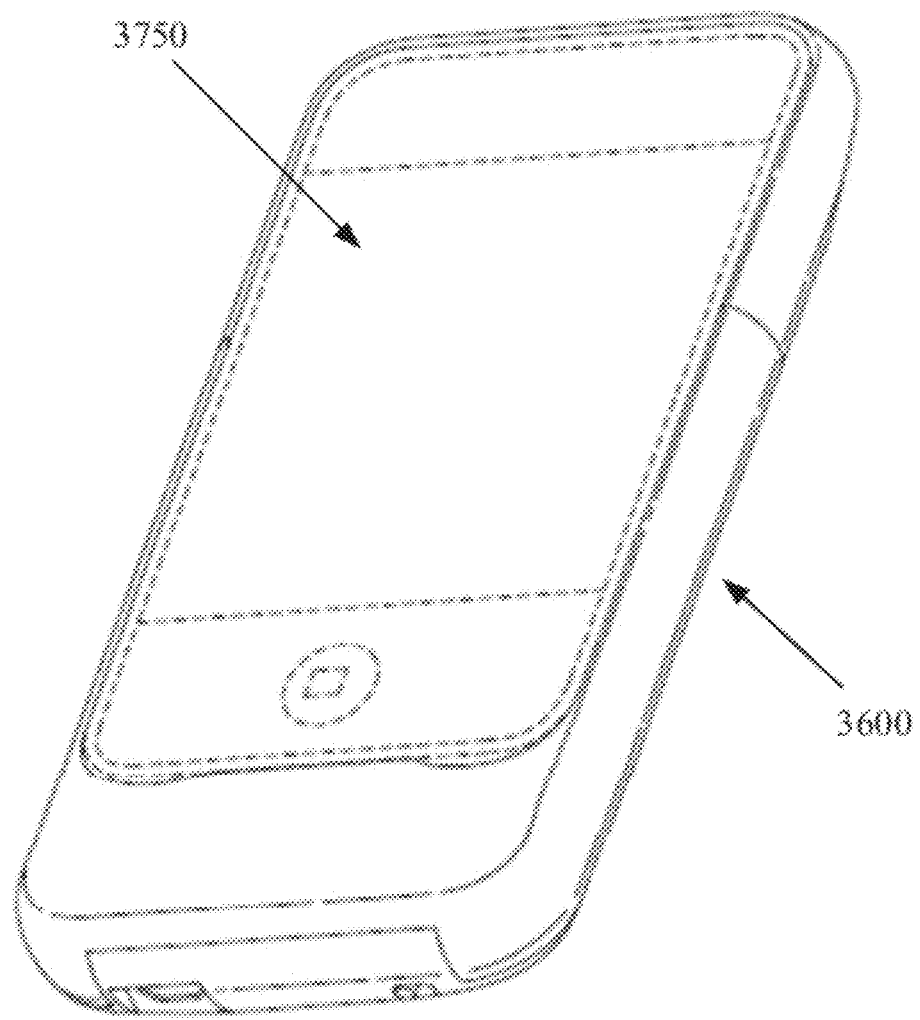
FIG. 37 illustrates the casing of FIG. 36 with a mobile device housed therein.

FIG. 37 illustrates how a mobile device can be housed within the cavity 3606 of the casing 3600. As can be appreciated from this figure, the casing 3600 is shaped to closely wrap around the mobile device 3750, and serves as a protective case for the mobile device 3750.

Figure 38:
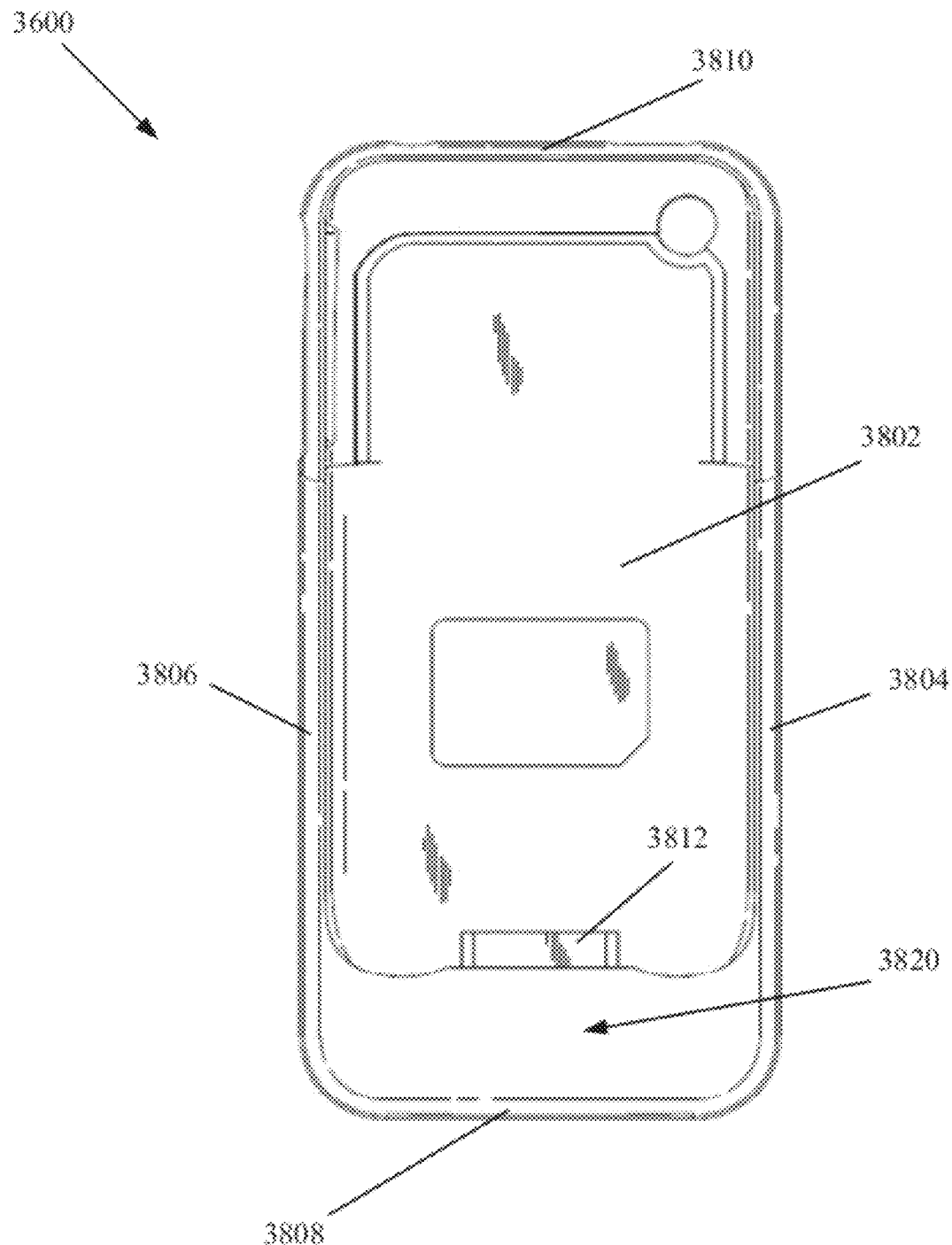
FIG. 38 illustrates a front view of the casing of FIG. 36 in a closed configuration.

FIG. 38 illustrates a front view of the casing 3600. The casing 3600 includes a back plane 3802, first and second sides 3804 and 3806, a bottom side 3808, a top side 3810, an internal interface 3812, and an end section 3820. The back plane 3802, first and second sides 3804 and 3806, bottom side 3808 and top side 3810 may be shaped to form a pocket or cavity 3606 in which the mobile device 3750 may be housed. The top side 3810 of the casing 3600 may slide out to allow insertion and removal of the mobile device 3750. The casing 3600 comprises a bottom end portion 3820 that may house within its thickness the hardware components of the various accessories 2302, 2402, 3302, 3402, and 3502. For example, the bottom end portion 3820 of the casing 3600 may house the internal interface 2310, processors 2306a, 2306b, I/O interfaces 2308a, 2308b, cryptography module 2314, memory circuit 2304, external interface 2312, power cell module 2316, the data bus 2320, and the power bus 2322 of the external processing accessory 2302. In another embodiment, the bottom end portion 3820 of the casing 3600 may house the internal interface 2410, cryptography module 2412, magnetic strip reader processing circuit 2406, magnetic strip reader interface 2408, memory 2404, and the data bus 2413 of the magnetic strip payment processing accessory 2402. In another embodiment, the bottom end portion 3820 of the casing 3600 may house the internal interface 3310, cryptography module 3312, smart card reader processing circuit 3306, smart card reader interface 3308, memory circuit 3304, and the data bus 3313 of the smart card payment processing accessory 3302. In another embodiment, the bottom end portion 3820 of the casing 3600 may house the internal interface 3410, the cryptography module 3412, near field communication processing circuit 3403, near field communication memory circuit 3404, near field communication transmitter 3406, near field communication receiver 3408, power cell module 3414, external interface 3416, data bus 3418, and power bus 3420 of the near field communication accessory 3402. In another embodiment, the bottom end portion 3820 of the casing 3600 may house the internal interface 3510, TV signal transmitter 3503, TV signal receiver 3504, service provider transmitter 3507, TV signal processor 3506, external interface 3508, security circuit 3518, data bus 3514, power bus 3516, and power cell module 3512 of the TV receiver accessory 3502.

FIG. 38 also illustrates the internal interface connector 3812 that couples to the corresponding mobile device interface (e.g., mobile device interface 2460) of the mobile device for the transmission of data between mobile device and the internal interfaces 2310, 2410, 3310, 3410, or 3510 of the particular accessory 2302, 2402, 3302, 3402, or 3502 the casing 3600 houses. The internal interface connector 3812 may snap or lock into place with the mobile device interface to provide a secure physical connection between the accessory 2302, 2402, 3302, 3402, or 3502 and mobile device. The internal interface may also transmit power from a power cell module 2316, 3414, or 3512 that may be present in the accessory 2302, 3402, or 3502. In one embodiment the power cell modules 2316, 3414, and 3512 may be housed within the bottom end portion 3820 as disclosed above. However, in another embodiment, the power cell modules 2316, 3414, and 3512 may be housed within the thickness of the back plane 3802 of the easing 3600. In this case the power cells should be thin so that they can adequately fit within the thickness of the back plane 3802 without significantly increasing the depth/thickness of the casing 3600.

Referring again to FIG. 36, the casing 3600 may include one or more openings 3608, 3612, 3614, 3616 to facilitate access to various features of the mobile device 3750. For instance, a first opening 3608 on the back plane 3802 of the casing 3600 may allow an unobstructed view for a camera lens on the back of the mobile device 3750. A second opening 3612 may provide access to a screen on/off switch for the mobile device 3750. A third opening 3614 may provide access to an audio jack on the mobile device 3750. A fourth opening 3616 on the second side 3806 may provide access to a volume control sliding switch.

Figure 39:
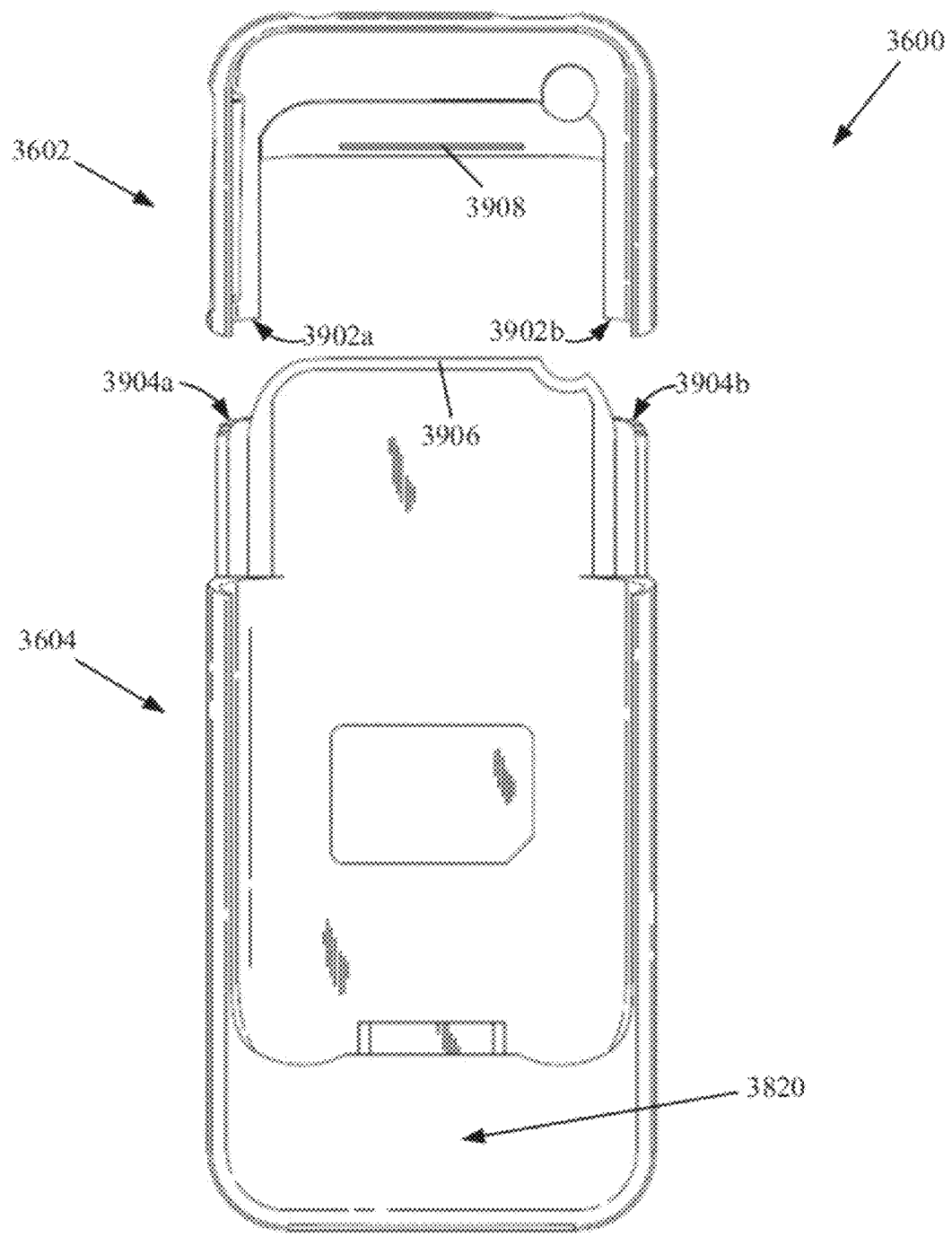
FIG. 39 illustrates a front view of the casing of FIG. 36 in an open configuration.

FIG. 39 illustrates the casing 3600 in an open configuration. The casing 3600 may include a top section 3602 and a bottom section 3604 that can be separated from each other to insert a mobile device within the casing 3600, and then be coupled together to secure the mobile device in place. For example, the top section 3602 may include receiving female grooves 3902a and 3902b that receive male rails 3904a and 3904b located on the bottom section 3604. In this manner, the top section 3602 can be coupled to the bottom section 3604 by pressure fit. For example, a tongue section 3906 (see also FIG. 42) may slide on to an engaging tab 3908 on the top section 3602 to couple the engaging tab 3908 to a receiving groove 4208 (see FIG. 42) to secure the top section 3602 to the bottom section 3604.

Figure 40:
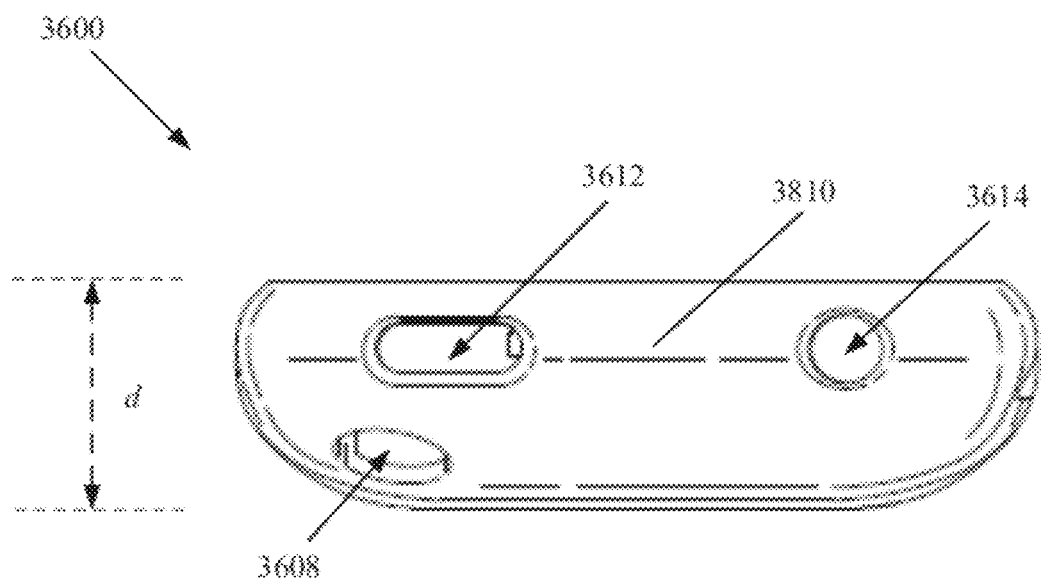
FIG. 40 illustrates a top view of the casing of FIG. 36.
Figure 41:
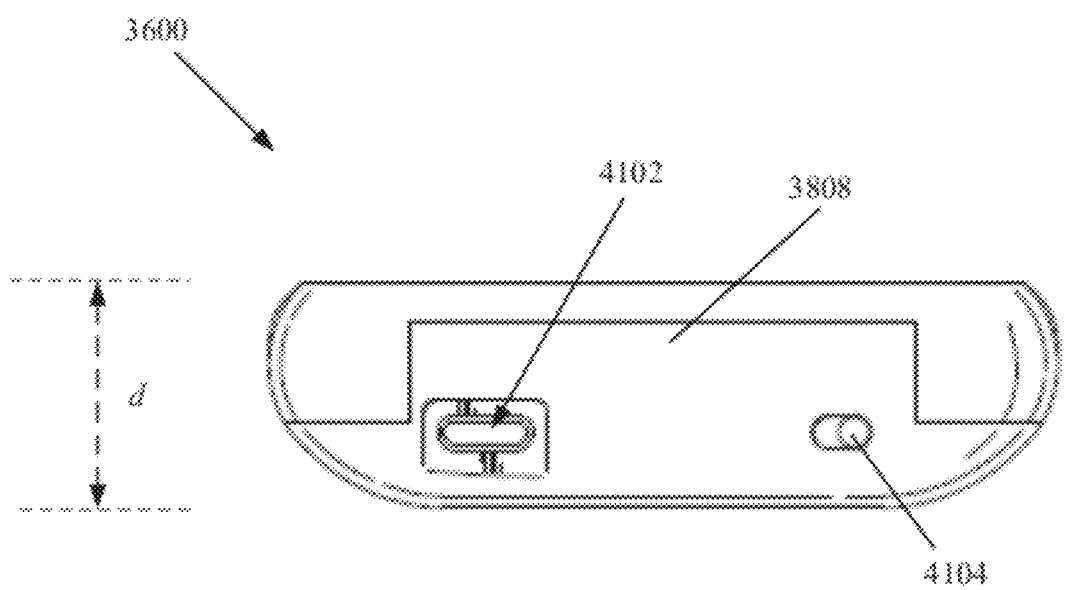
FIG. 41 illustrates a bottom view of the casing of FIG. 36.

FIGS. 40 and 41 illustrate a top view and a bottom view, respectively, of the casing 3600. FIG. 40 shows the top side 3810 of the casing 3600, including the first opening 3608, second opening 3612, and third opening 3614. FIG. 41 shows the bottom side 3808 of the casing 3600, including an external interface 4102 (e.g., external interface 2312, of the external processing accessory 2302, external interface 3416 of the near field communication accessory 3402, or the external interface 3508 of the TV receiver accessory 3502), such as a mini-USB connector. The external interface 4102 may serve to recharge a power cell module 2316, 3414, and 3512 within the casing 3600, and/or recharge the mobile device 3750 via the internal interface connector 3812. Additionally, the external interface 4102 may provide a pass-through signaling interface for the internal interface connector 3812, thereby allowing the mobile device 3750 to communicate to an external source via the external interface 4102. A switch 4104 may also be located on the bottom side 3808 of the casing 3600. The switch 4104 may power on or off the external processing accessory 2302, near field communication accessory 3402, or TV receiver accessory 3502 on one setting, and allow the power cell modules within these accessories 2302, 3402, and 3502 to recharge fire mobile device 3750 on another setting.

FIGS. 40 and 41 also illustrate a measurement d that represents the maximum depth of the casing 3600 (also referred herein as the maximum thickness of the casing 3600). In one embodiment, the depth d is designed to be as thin as possible so that the overall depth/thickness of the mobile device 3750 and casing 3600 when joined together is not substantially more than the depth/thickness of the mobile device 3750 by itself. In one embodiment, the depth d of the casing 3600 is less than the depth/thickness of the mobile device 3750 plus 0.50 inches. In another embodiment, the depth d of the casing 3600 is less than the depth/thickness of the mobile device 3750 plus 0.25 inches. In another embodiment, the depth d of the casing 3600 is less than the depth/thickness of the mobile device 3750 plus 0.125 inches. In another embodiment, the depth d of the casing 3600 is less than 1 inch. In yet another embodiment, the depth d of the casing 3600 is less than 0.75 inches. In yet other embodiments, the depth d of the casing 3600 is less than 0.5 inches. By having a thin depth/thickness/profile, the casing 3600 housing the mobile device 3750 can be conveniently stored, for example, in the pocket of the user. Casings for mobile device accessories that have a thick depth/profile cannot comfortably be stored in the pocket of a user.

Figure 42:
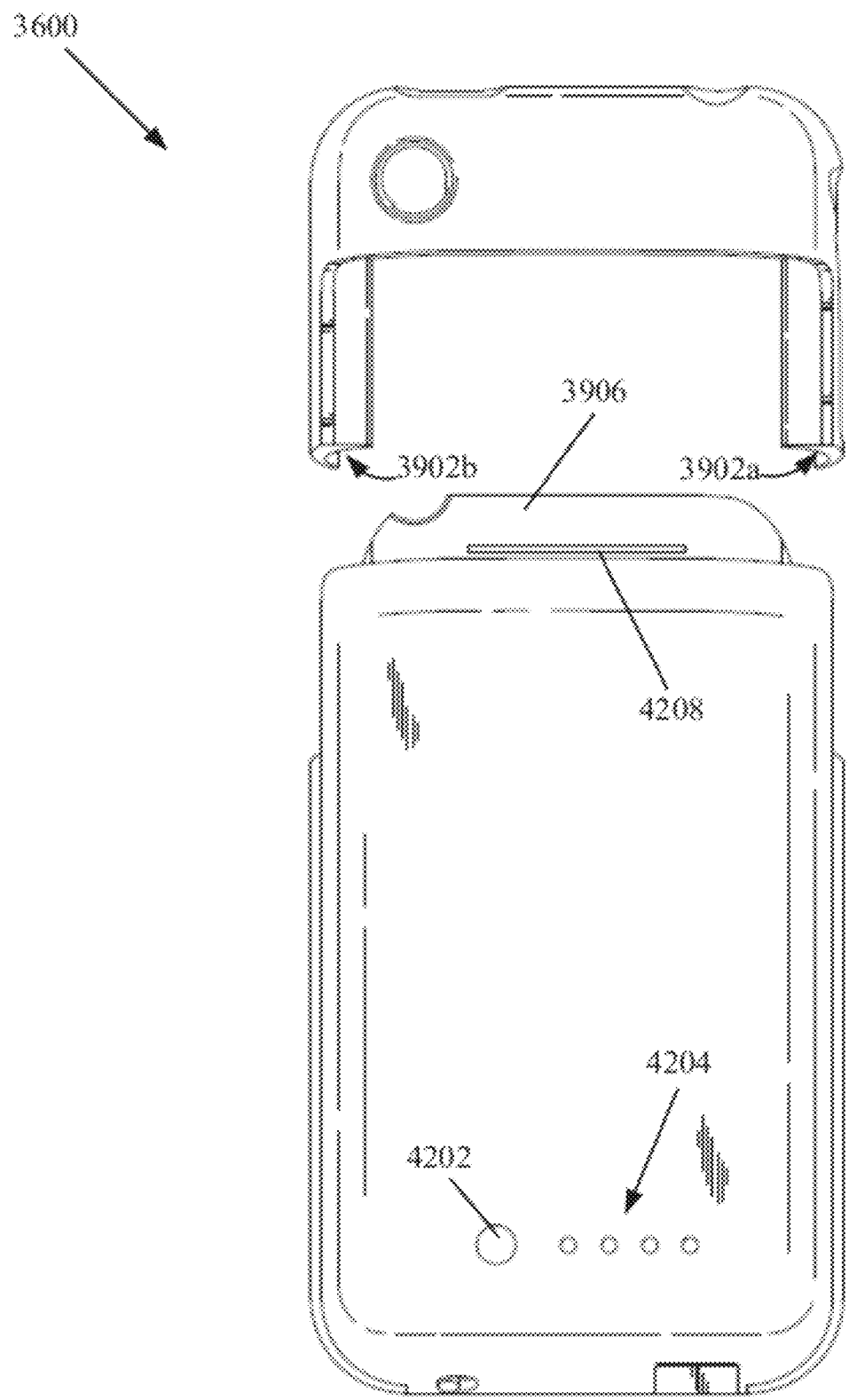
FIG. 42 illustrates a back view of the casing of FIG. 36.

FIG. 42 illustrates a back view of the casing 3600. In one embodiment, the casing 3600 may feature a test button 4202 that when pushed causes plurality of LED lights 4204 to light up. In one embodiment, the LED lights 4204 may indicate the power or charge level of the power cell module 2316, 3414, and 3512. In another embodiment, the LED lights 4204 may indicate the signal strength of the TV signals being received from the TV service provider by the TV receiver accessory 3502. In another embodiment, the LED lights 4204 may indicate the signal strength detected by a near field communication device to which the near field communication accessory 3402 is attempting to communicate with.

Single Piece Bottom Mounted Casing

Figure 43:
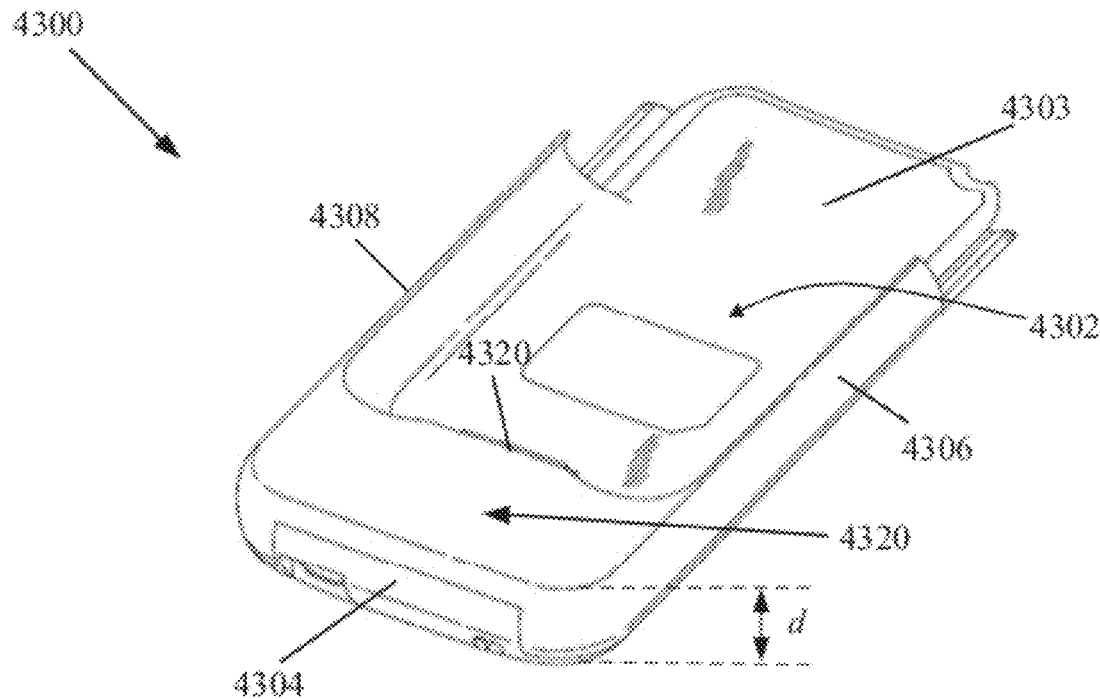
FIG. 43 illustrates a perspective view of a single piece casing that leaves at least one surface of the mobile device exposed. The casing may be used to house an external processing accessory, NFC accessory, TV receiver accessory, or a payment processing accessory.
Figure 44:
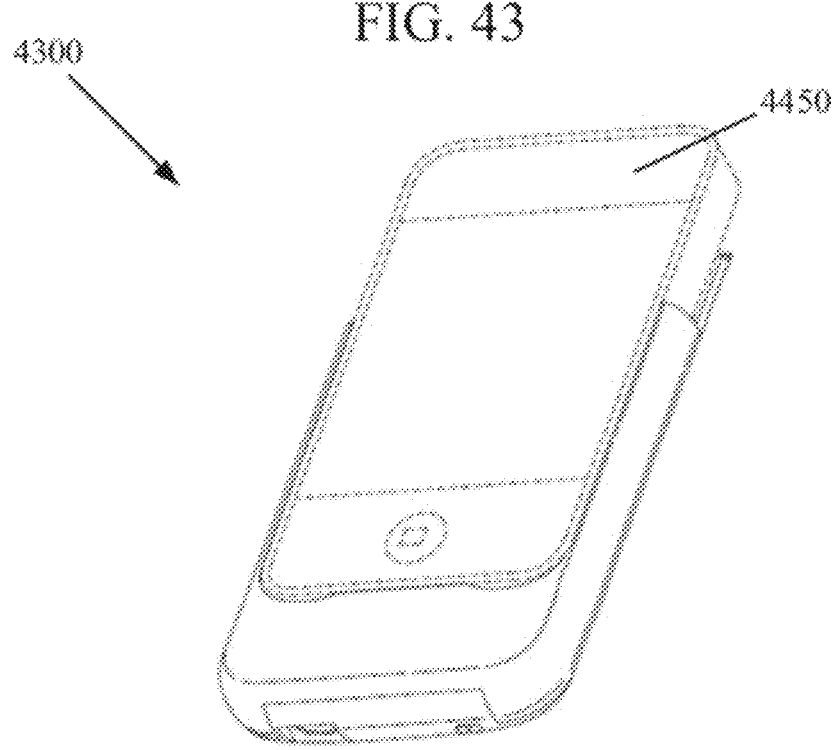
FIG. 44 illustrates the casing of FIG. 43 with a mobile device housed therein.

All of the mobile device accessories disclosed herein, including for example, the external processing accessory 2302, magnetic card payment processing accessory 2402, smart card payment processing accessory 3302, NFC accessory 3402, and TV receiver accessory 3502 may be housed within a casing 4300 (also referred to as a holster) as shown in FIGS. 43 and 44. The casing 4300 is similar to the casing 3600 shown in FIG. 36 but it does not have a top section. Instead, the casing 4300 leaves at least one side of the mobile device 4450 exposed. The casing 4300 comprises a back plane 4303, a bottom side 4304, a first side 4306, and a second side 4308. The back plane 4303, the bottom side 4304, the first side 4306, and the second side 4308 together form a cavity 4302 in which a mobile device may be housed.

FIG. 44 illustrates how a mobile device 4450 may be housed within the cavity 4302 of the casing 4300. FIGS. 43 and 44 also illustrate that the casing 4300 comprises an end section 4320 that—similar to the end section 3820—may house within its thickness the hardware components of the various accessories 2302, 2402, 3302, 3102, and 3502. As can be appreciated from FIG. 44, the casing 4300 is shaped to closely wrap around the mobile device 4450, and serves as a protective case for the mobile device 4450.

The casing 4300 also comprises an internal interface connector 4310 that couples to the corresponding mobile device interface (e.g., interface 2410) of the mobile device for the transmission of data between the mobile device 4450 and the internal interfaces 2310, 2410, 3310, 3410, or 3510 of the particular accessory 2302, 2402, 3302, 3402, or 3502 the casing 4300 houses. The internal interface connector 4310 may snap or lock into place with the mobile device interface to provide a secure physical connection between the accessory 2302, 2402, 3302, 3402, or 3502 and mobile device 4450. The internal interface may also transmit power from a power cell module 2316, 3414, or 3512 that may be present in the accessory 2302, 3402, or 3502. In one embodiment the power cell modules 2316, 3414, and 3512 may be housed within the bottom end portion 4320 as disclosed above. However, in another embodiment, the power cell modules 2316, 3414, and 3512 may be housed within the thickness of the back plane 4303 of the casing 4300. In that case, the power cells should be thin so that they can adequately fit within the thickness of the back plane 4303 without significantly increasing the depth/thickness of the casing 4300.

FIG. 43 illustrates a measurement d that represents the maximum depth of the casing 4300 (also referred herein as the maximum thickness of the casing 4300). In the one embodiment, the depth d is designed to be as thin as possible so that the overall depth/thickness of the mobile device 4450 and casing 4300 when joined together is not substantially more than the depth/thickness of the mobile device 4450 by itself. In one embodiment, the depth d of the casing 4300 is less than the depth/thickness of the mobile device 4450 plus 0.50 inches. In another embodiment, the depth d of the casing 4300 is less than the depth/thickness of the mobile device 4450 plus 0.25 inches. In another embodiment, the depth d of the casing 4300 is less than the depth/thickness of the mobile device 4450 plus 0.125 inches. In another embodiment, the depth d of the casing 4300 is less than 1 inch. In yet another embodiment, the depth d of the casing 4300 is less than 0.75 inches. In yet other embodiments, the depth d of the casing 4300 is less than 0.5 inches. By having a thin depth/thickness/profile, the casing 4300 housing the mobile device 4450 can be conveniently stored, for example, in the pocket of the user.

By removing the top section, the mobile accessory may be more compact in size and ergonomic so that it does not significantly increase or change the size, thickness, and/or shape of the mobile device secured there to.

Bottom Mounted Simple Casing

Figure 45:
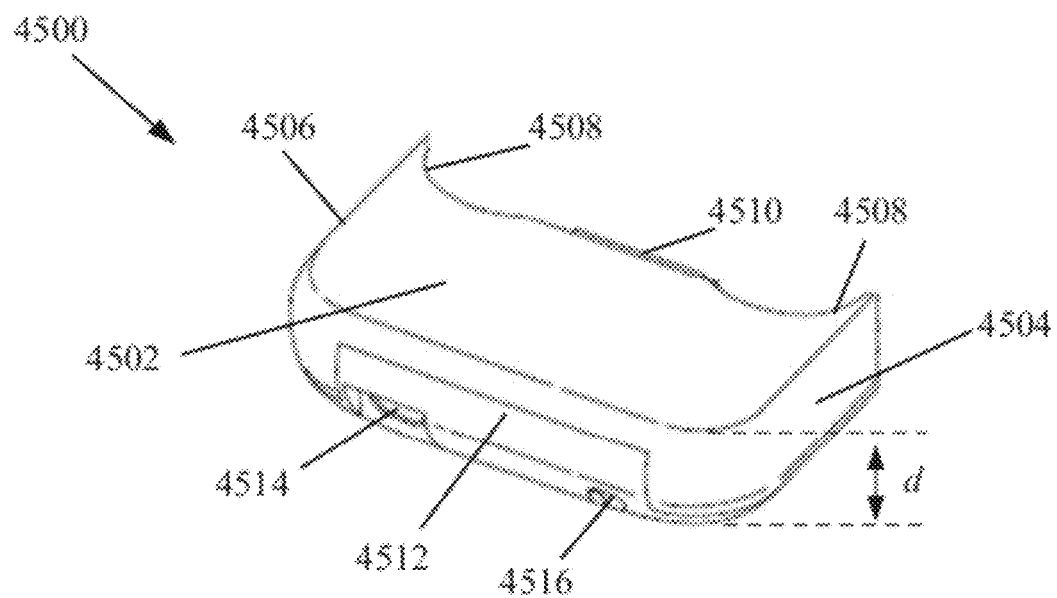
FIG. 45 illustrates a perspective view of a single piece casing that attaches onto the end of the mobile device. The casing may be used to house an external processing accessory, NFC accessory, TV receiver accessory, or a payment processing accessory.
Figure 46:
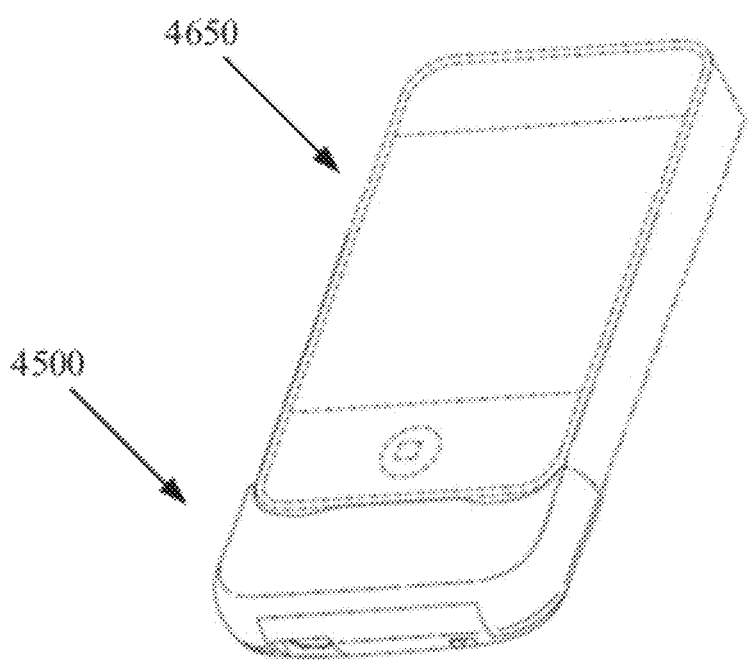
FIG. 46 illustrates a perspective view of a single piece casing attached onto the end of the mobile device.

All of the mobile device accessories disclosed herein, including for example, the external processing accessory 2302, magnetic card payment processing accessory 2402, smart card payment processing accessory 3302, NFC accessory 3402, and TV receiver accessory 3502 may be housed within a casing 4500 as shown in FIGS. 45 and 46. The casing 4500 is configured to mount onto an end portion of a mobile device. In the embodiment, the casing 4500 mounts onto the end portion of the mobile device having a mobile device interface, such as, interface 2460 to allow for wire line communication between the mobile device and the accessory that may be necessary.

The casing 4500 may include a front side 4502, a back side, a first side 4504, a second side 4506, a top side 4508, a bottom side 4512, an internal interface connector 4510, an external interface 4514, and a switch 4516. Hardware components of the various accessories 2302, 2402, 3302, 3402, and 3502 may be housed within the space formed by the front 4502, back, first 4504, second 4506, top 4508 and bottom 4512 sides. The top side 4508 of the casing may be shaped to match the end portion of the mobile device to which the casing will adhere to. The internal interface connector 4510 is configured to physically and communicatively couple to a corresponding mobile device interface of the mobile device. As shown in FIG. 46, once attached to the mobile device interface, the connector 4510 secures the accessory to the mobile device 4650.

The casing 4500 shown in FIGS. 45 and 46 allows an accessory 2302, 2402, 3302, 3402, or 3502 to be coupled to a mobile device 4650 without the accessory significantly increasing the weight, thickness and overall size of the mobile device 4650. The thin depth (also referred to as the thickness) of the casing 4500 and mobile device 4650 combination allows a user to put the combination (accessory and mobile device) in a small space, such as, a pocket. For example, FIG. 45 illustrates a measurement d that represents the maximum depth of the casing 4500. In one embodiment, the depth d is designed to be as thin as possible so that the overall depth/thickness of the mobile device 4650 and casing 4500 when joined together is not substantially more than the depth/thickness of the mobile device 4650 by itself. For example, in one embodiment, the depth d of the casing 4500 is less than the depth/thickness of the mobile device 4650 plus 0.125 inches. In another embodiment, the maximum depth d of the casing 4500 may be equal or less than the depth/thickness of the mobile device 1650.

FIG. 45 illustrates the external interface 4514, which in one embodiment may be a mini-USB connector, that enables communication for the external interface 2312 of the external processing accessory 2302, external interface 3416 of the near field communication accessory 3402, or the external interface 3508 of the TV receiver accessory 3502. The external interface 4514 may serve to recharge a power cell module 2316, 3414, and 3512 within the casing 4500, and/or recharge the mobile device 4650 via the internal interface connector 4510. Additionally, the external interface 4514 may provide a pass-through signaling interface for the internal interface connector 4510, thereby allowing the mobile device 4650 to communicate to an external source via the external interface 4514. A switch 4516 may also be located on the bottom side 4512 of the casing 4500. The switch 4516 may power on or off the external processing accessory 2302, near field communication accessory 3402, or TV receiver accessory 3502 on one setting, and allow the power cell modules within these accessories 2302, 3402, and 3502 to recharge the mobile device 4650 on another setting.

Thus, the mobile device accessories disclosed herein, including the external processing accessory 2302, magnetic strip payment processing accessory 2402, smart card payment processing accessory 3302, NFC accessory 3402, TV receiver accessory 3502, a bar code reader mobile accessory, a finger print reader mobile accessory, and/or a menu viewing and ordering mobile accessory may all be housed within any one of the casings 3600, 4300, and 4500.

Modular Mobile Accessory Configurations

In various implementations, the mobile accessory may include multiple different functionalities and/or capabilities. In order to allow a consumer to tailor the mobile accessory to his/her needs, the mobile accessory may be comprised of separate modules or components that can be coupled together to create the physical enclosure of the mobile accessory.

Figure 47:
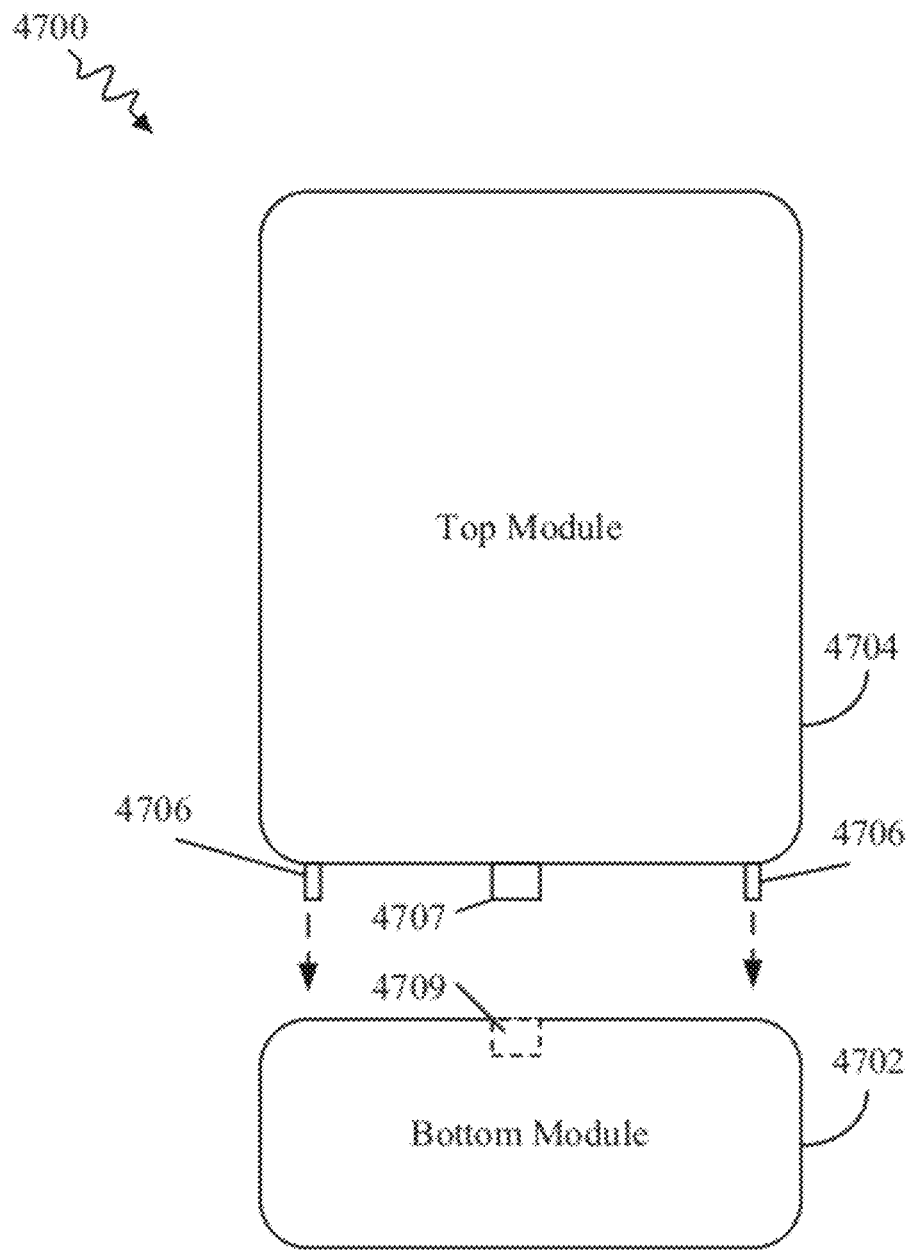
FIG. 47 illustrates a functional block diagram of a two-piece modular mobile device accessory scheme that comprises a bottom module and top module.
Figure 48:
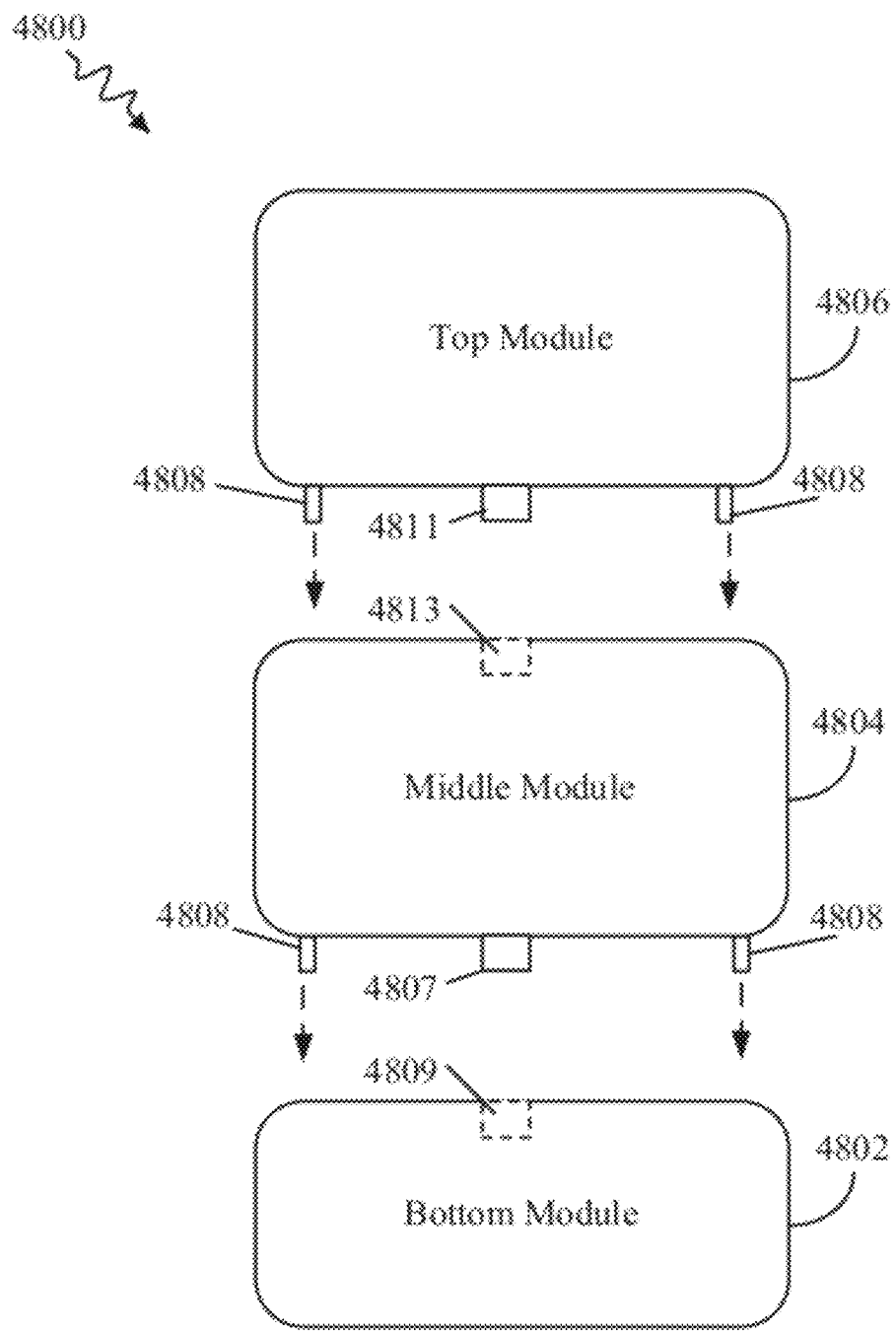
FIG. 48 illustrates a functional block diagram of a three-piece modular mobile device accessory scheme that comprises a bottom module, middle module, and top module.

FIGS. 47 and 48 illustrate various examples of a modular mobile accessory, where each module may provide a different function. Thus, a consumer is able to purchase the desired modules and combine them to form the casing enclosure of the mobile accessory.

FIG. 47 illustrates a two-piece modular mobile device accessory scheme 4700 that comprises a bottom module 4702 and top module 4704. Each module may incorporate circuits and/or devices that perform different functions, either alone or in combination with other modules. For instance, each module may house any one of the mobile accessories described above. For example, bottom module 4702 and top module 4704 can each be a battery pack, an external processing accessory 2302, a magnetic strip payment processing accessory 2402, a smart card payment processing accessory 3302, an NFC accessory 3402, a television signal receiver and battery pack mobile accessory 3502, a bar code reader mobile accessory, a finger print reader mobile accessory, and/or a menu viewing and ordering mobile accessory.

The top module 4704 and bottom module 4702 may join together via contact points 4706 to substantially enclose a mobile device contained therein. For example, each contact point 4706 may include a pin that engages a corresponding cavity in the opposite module. In alternative implementations, the contact point 4706 may be a magnetic coupler between the top and bottom modules 4704 and 4702. Additionally, the modules 4702 and 4704 may include corresponding connectors 4707 and 4709 (e.g., male/female connectors) that may electrically couple the two modules together to allow for electrical communication (e.g., data and/or control signals) and/or power transfer between the two modules 4702 and 4704. For example, the top module 4704 may be a battery pack and the bottom module 4702 may be a magnetic strip payment processing accessory 2402. In such a configuration, the connectors 4707/4709 may provide power to the magnetic strip payment processing accessory in the bottom module 4702 from the battery pack in the top module 4704.

FIG. 48 illustrates a functional block diagram of a three-piece modular mobile device accessory scheme 4800 that comprises a bottom module 4802, middle module 4804, and top module 4806. Each module may incorporate circuits and/or devices that perform different functions, either alone or in combination with other modules. For instance, each module may house any one of the mobile accessories described above. For example, the bottom module 4802, middle module 4804, and top module 4806 can each be a battery pack, a magnetic strip payment processing accessory 2402, a smart card payment processing accessory 3302, a programmable smart card mobile accessory 3402, a television signal receiver and battery pack mobile accessory 3502, a bar code reader mobile accessory, a finger print reader mobile accessory, or a menu viewing and ordering mobile accessory.

The bottom module 4802, middle module 4804, and top module 4806 may be secured together via contact points 4808 to substantially enclose a mobile device contained therein. That is, the contact points 4808 may provide physical connectors between the modules 4802, 4804, and 4806.

Additionally, the modules 4802, 4804, and 4806 may include corresponding connectors 4807/4809 and 4811/4813 (e.g., male/female connectors) that may electrically couple the modules together to allow for electrical communication (e.g., data and/or control signals) and/or power transfer between the three modules 4802, 4804, 4806. For example, the top module 4806 may be a bar code scanner, the middle module 4804 may be finger print reader, and the bottom module 4802 may be a credit card reader (e.g., magnetic strip payment processing accessory 2402). In such a configuration, the connectors 4807/4809 and 4811/4813 may provide data and/or control signal communications between the modules 4802, 4804, and/or 4806 and, possibly, with the mobile device to which the mobile device accessory 4800 may couple.

The above modular schemes allow multiple mobile accessories to be used with one mobile device at the same time. Moreover, rather than having a top section 2504 that merely secures the bottom section 2502 and protects the mobile device enclosed within, the top, middle, and/or bottom modules of the modular schemes illustrated in FIGS. 47 and 48 may serve to add a plurality of different combinations of functions or capabilities to the mobile device since some of the modules may be interchangeable. For example, a user may select have two modules with battery pack and a third module with a television receiver. Alternatively, a user may select a first module with a bar code scanner, a second module with a credit card reader, and a third module with a programmable smart card device.

Data Management Mobile Accessory

Figure 49:
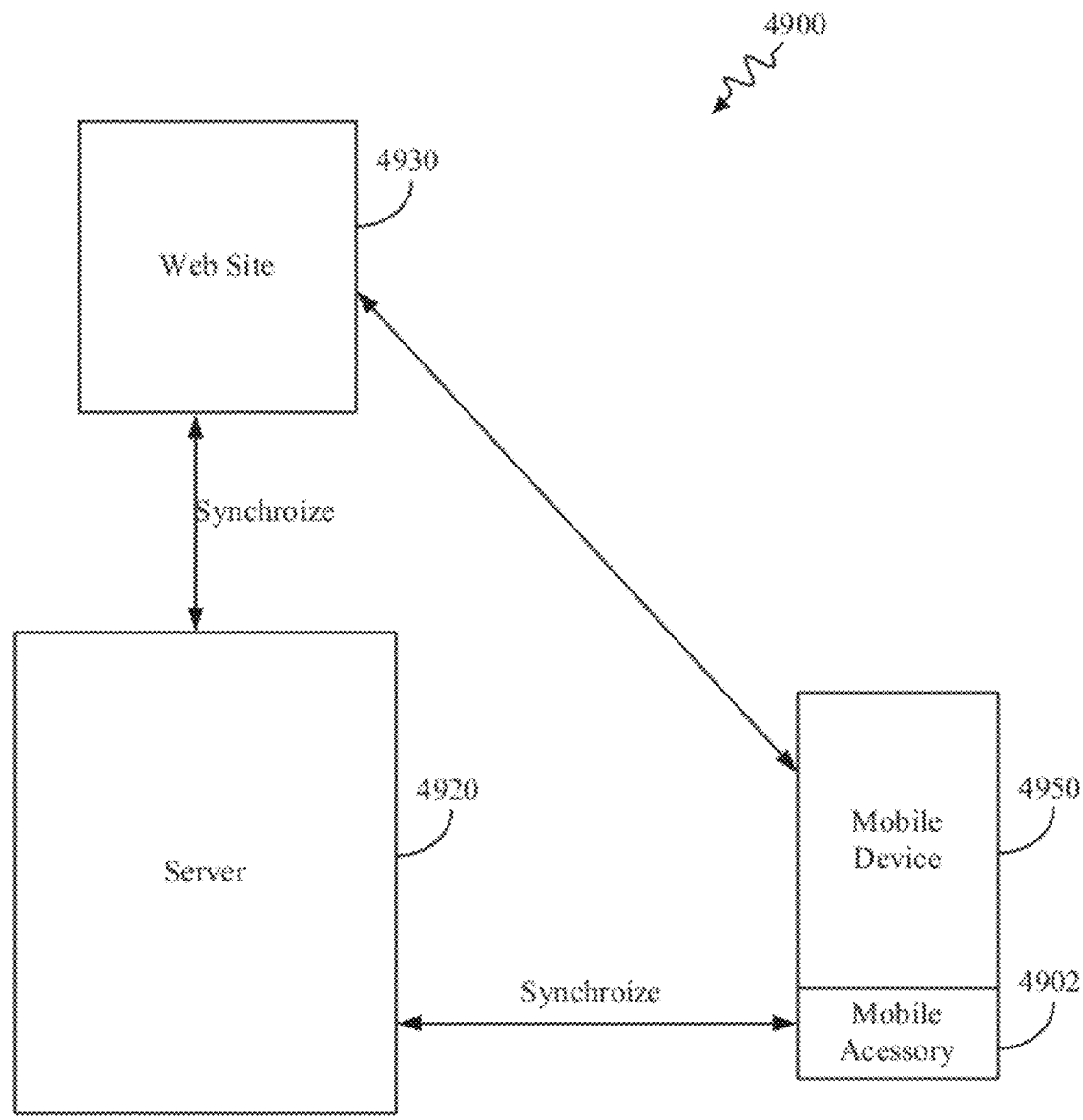
FIG. 49 illustrates a functional block diagram of a data management system that allows a mobile device equipped with a data management mobile accessory to synchronize with and update data stored on a server.

FIG. 49 illustrates a functional block diagram of a data management system 4900 that allows a mobile device 4950 equipped with a data management mobile accessory 4902 to synchronize with and update data stored on a server 4920. For example, the server 4920 may store inventory/product information for one or more distribution centers or warehouses. This inventory/product information may comprise, but is not limited to, type, quantities, images, prices, stock-keeping unit (SKU) identifiers, availability, shipping information, and/or origin of various products. The server 4920 systematically tracks the movement, e.g., in or out, of the products within the one or more distribution centers.

The server 4920 may also be synchronized with a website 4930. The website 4930 may display products and product information associated with the server 4920 to the anyone accessing the website 4930. The website 4930 may also be configured to process purchase orders of the products, and is capable of updating inventory/product information stored in the server 4920.

Figure 50:
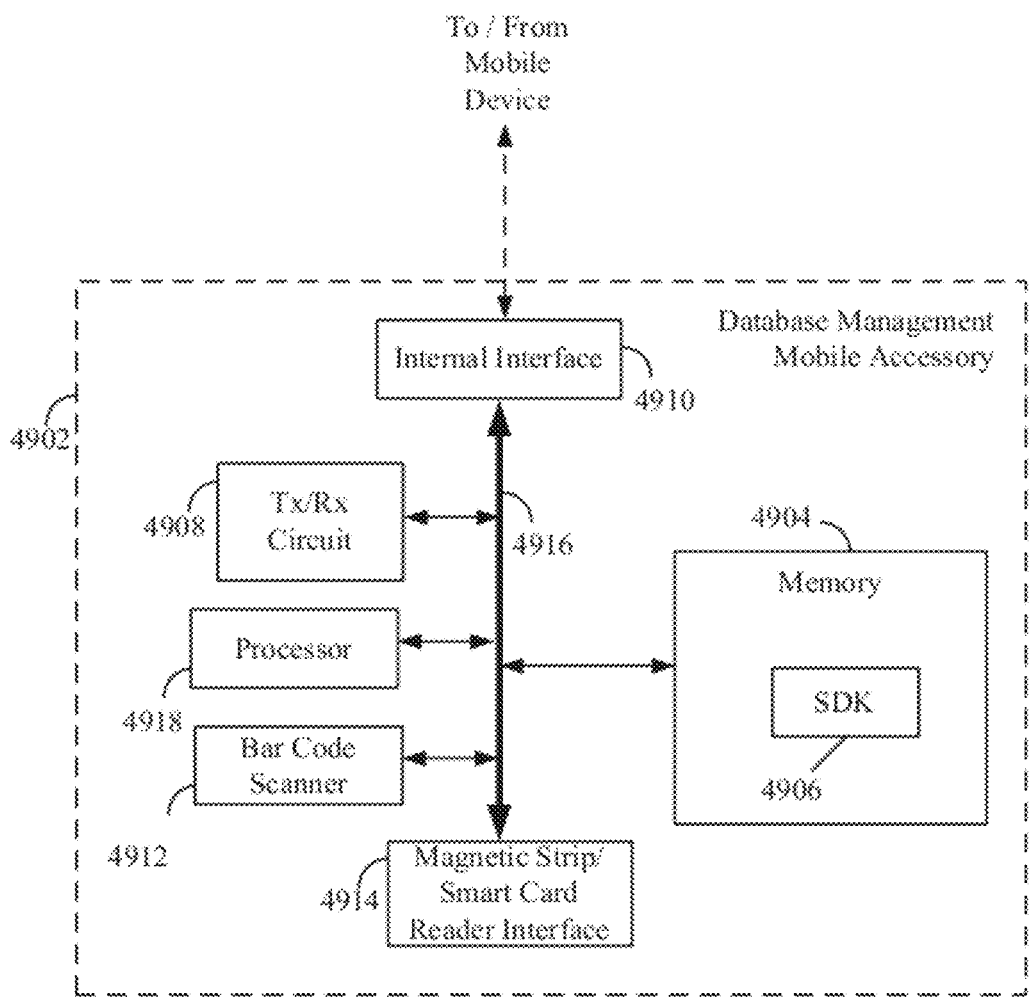
FIG. 50 illustrates a functional block diagram of one embodiment of the data management mobile accessory.

Referring to FIG. 49 and FIG. 50, the data management mobile accessory 4902 and mobile device 4950 include hardware and software that allow it to synchronize with and communicate to the server 4920. For example, a unique database management application for a particular data management system 4900 can be designed and created using the SDK 4906 tools available on the data management mobile accessory's memory 4904. The database management application can be loaded onto and executed on the mobile device 4950 through the internal interface 4910. The database management application allows the user of the mobile device 4950 to connect to and synchronize with the server 4920 using the data management mobile accessory 4902. For example, the data management mobile accessory 4902 may include a transmitter and receiver circuit 4908 (Tx/Rx Circuit) that allows it to wirelessly connect to the server 4920 in order to update any changes that need to be made to the inventory/product information stored within the server 4920, or otherwise access the contents of the server 4920.

In one embodiment, the database management application allows the user of the mobile device 4950 to connect to and synchronize with the server 4920 via the website 4930. The mobile device 4950 can connect to the website 4930 using the wireless network service provider associated with the mobile device 4950. The user of the mobile device 4950 may then wirelessly update any changes that need to be made to the inventory/product information stored within the server 4920, or otherwise access the contents of the server 4920.

In other embodiments, the data management mobile accessory 4902 may further comprise a processor 4918, a bar code scanner 4912, a magnetic strip/smart card reader interface 4914, and a bus 4916. The bus 4916 serves as a line of communication between the internal interface 4910, the processor 4918, the Tx/Rx circuit 4908, the memory 4904, the bar code scanner 4912, and the magnetic strip/smart card reader interface 4914. The bar code scanner 4912 allows the user of the data management mobile accessory 4902 to scan items/products, and update the inventory/product information stored within the server 4920. For example, scanning an item may increment the quantity value stored within the server 1920 for that particular product. The magnetic strip/smart card reader interface 4914 enables the user of the data management mobile accessory 4902 to accept payment card information from a consumer for a sale transaction according to one of the processes described above under "Payment Processing Mobile Accessories." If a sale is made the data management mobile accessory 4902 can update the inventory/product information stored within the server 4920 by, for example, decrementing the quantity value stored within the server 4920 for that particular product sold.

Speakers & Microphone

Another feature may provide for one or more speakers to be included as part of the battery packs or holster (illustrated in FIGS. 1-22). For instance a low-profile speaker may be housed within the back plane of a battery pack so that the sound may be emitted from the rear or sides of the battery pack. When a mobile device is inserted and coupled to the battery pack, it couples to an interface that electrically connects the speaker to the mobile device. The mobile device may send audio or sound signals to the speaker via an interface with the battery pack. This allows a user to listen to audio stored in the mobile device without the need for headphones.

Similarly, another feature may provide for one or more microphones to be included as part of the battery packs (illustrated in FIGS. 1-22). One or more microphones may be housed within the battery pack (e.g., back plane) so that they may capture sound from a user. The microphone may be electrically coupled to an interface that allows sending captured audio signals to a mobile device that may be coupled to the battery pack.

According to yet another feature, when the mobile device is coupled to the battery pack 1702, it may cause one or more applications to execute on the processors 1706. These applications may continue to operate or execute even if the mobile device is removed or decoupled from the battery pack 1702. For example, the battery pack may continue to collect data (e.g., monitor medical conditions for a patient to which it is coupled) and wirelessly transmits the collected data or an alarm to the mobile device. This is possible since the processors 1706 be powered by the power cell 1104 and can be configured to operate whether or not the mobile device is coupled to the battery pack.

Integrated Display

In some embodiments of the battery pack 1702, battery pack 1702 may also include an integrated display or screen. For example, the integrated display may be on the outer surface of the back plane of the battery pack. Alternatively, the display 1710 may slide out from within the housing of the battery pack. This integrated display 1720 may allow displaying additional information or data to a user. The additional display screen may be electrically coupled to the mobile device (via an interface) to allow the mobile device to send images or video to the additional display screen. Alternatively the wireless communication accessory's processor could send a battery charge indicator to the integrated display.

In another example, the rear of the back plane may house a Braille input and/or output interface that electrically coupled a mobile device mounted within the holster or battery pack.

In yet another embodiment, the rear of the back plane may provide a keypad that serves as an input to the mobile device.

According to another feature, the battery pack and/or holster may provide an external interface (e.g., Bluetooth wireless interface, USB port, infrared port, etc.) that may allow the mobile device mounted in the battery pack and/or holster to communicate via that external interface. Thus the external interface may provide a different wireless interface than provided or supported by the internal system of the mobile device.

One or more of the features illustrated in FIGS. 1-51 may be rearranged and or combined into a single component or embodied in several components. Additional components may also be added without departing from the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A wireless communication accessory for a mobile device, comprising:
   a first portion comprising:
      a back portion, wherein the back portion comprises a terminating edge;
      a first sidewall connected to the back portion that will be positioned against a first side edge of the mobile device; and
      a second sidewall connected to the back portion at an end opposite the first sidewall that will be positioned against a second side edge of the mobile device;
   a second portion comprising:
      a third sidewall that will be perpendicular to the first sidewall and the second sidewall and positioned against a third side edge of the mobile device when the second portion is seated against the first portion; and
      an open side end, opposite of the third sidewall wherein the second portion slides onto the first portion through the open side end and when the second portion is seated against the first portion, the mobile device is secured in place by the back portion, the first sidewall the second sidewall and the third sidewall, and the screen of the mobile device will be visible from a direction opposite the back portion;
   a battery cell;
   a processor configured to receive power from the battery cell;
   an external interface coupled to the processor;
   a wireless communication module coupled to the processor, the wireless communication module configured to receive power from the battery cell; and
   an internal interface positioned to connect to a device interface on the mobile device and coupled through the processor to the wireless communication module.

2. The wireless communication accessory of claim 1 wherein:
   the battery cell is coupled through the processor to the internal interface;
   the processor is also configured to receive power from the mobile device through the internal interface; and
   the wireless communication module is configured to receive power from the mobile device through the internal interface.

3. The wireless communication accessory of claim 1 wherein the battery cell is rechargeable.

4. The wireless communication accessory of claim 1 wherein the processor is configured to receive and execute an instruction received through the internal interface, the internal interface being positioned to connect to the device interface on the mobile device.

5. The wireless communication accessory of claim 4 wherein the wireless communication accessory is configured to:
   transmit a first signal via the external interface when a first instruction is sent from the mobile device through the internal interface;
   transmit a second signal via the wireless communication module when a second instruction is sent from the mobile device through the internal interface;
   transmit a third signal via the internal interface to the mobile device when a first data is received at the external interface; and
   transmit a fourth signal via the internal interface to the mobile device when a second data is received by the wireless communication module.

6. The wireless communication accessory of claim 1 wherein the wireless communication module provides a different wireless interface than provided or supported by an internal system of the mobile device.

7. The wireless communication accessory of claim 1 wherein the wireless communication module provides a different wireless interface than provided or supported by an internal system of the mobile device.

8. The wireless communication accessory of claim 1 wherein the wireless communication module is an infrared port.

9. The wireless communication accessory of claim 1 wherein the wireless communication module operates at a radio frequency.

10. The wireless communication accessory of claim 9 wherein the wireless communication module is a Bluetooth wireless interface.

11. The wireless communication accessory of claim 9 wherein the wireless communication module is a nearfield communication (NFC) interface.

12. The wireless communication accessory of claim 9, the wireless communication module comprising:
   a transmitter coupled to the processor, the transmitter configured to transmit a first data; and
   a receiver coupled to the processor, the receiver configured to receive a second data.

13. The wireless communication accessory of claim 12, wherein the transmitter is a nearfield communication (NFC) transmitter and the receiver is a nearfield communication (NFC) receiver.

14. The wireless communication accessory of claim 12, wherein the first data is associated with a payment account information, and the first data is transmitted by the transmitter to execute a purchase transaction.

15. The wireless communication accessory of claim 14, further comprising a cryptography module configured to encrypt the first data prior to transmission by the transmitter.

16. The wireless communication accessory of claim 14, wherein the processor is configured to log, a time, date, and location associated with the purchase transaction upon an execution of the purchase transaction.

17. The wireless communication accessory of claim 14, wherein the processor is configured to receive a password or personal identification number (PIN) prior to the execution of the purchase transaction by the wireless communication accessory.

18. The wireless communication accessory of claim 14, wherein the second data is coupon data associated with a merchant.

19. The wireless communication accessory of claim 12, wherein the first data is associated with restricted area access information, and the first data is transmitted by the transmitter to allow access to a restricted area.

20. The wireless communication accessory of claim 9 wherein the wireless communication module is a radio frequency identification (RFID) module.

21. The wireless communication accessory of claim 1 further comprising a display interface, coupled to the processor, the display interface configured to display information to a user of the mobile device.

22. The wireless communication accessory of claim 1 wherein the internal interface comprises an antenna that is electromagnetically coupled to but not otherwise connected to the mobile device.

23. The wireless communication accessory of claim 1 further comprising a memory module configured to couple to the mobile device through the internal interface, the internal interface being positioned to connect to a device interface on the mobile device.

24. The wireless communication accessory of claim 23 wherein the memory module is removable from the wireless communication accessory.

25. The wireless communication accessory of claim 23 wherein the wireless communication module is removable from the wireless communication accessory.

26. The wireless communication accessory of claim 23 wherein when the second portion is seated against the first portion, a first open-polygon-shaped opening for the first portion merges with a second open-polygon-shaped opening for the second portion to form a cavity of the wireless communication accessory through which a screen of the mobile device will be visible, the cavity closed on at least 4 sides.

27. The wireless communication accessory of claim 1 further comprising a transparent screen opposite the back portion, through which a screen of the mobile device will be visible.

28. The wireless communication accessory of claim 1, wherein the wireless communication accessory is configured to be powered by the mobile device via the internal interface.

29. A wireless communication accessory for a mobile device, comprising:
   a first portion comprising:
      a back portion, against which a back of a housing of a mobile device will be placed, wherein the back portion comprises a terminating edge;
      a first sidewall, connected to the back portion, that will be positioned against a first side edge of the mobile device;
      a second sidewall, connected to the back portion at an end opposite the first sidewall, that will be positioned against a second side edge of the mobile device;
      a third sidewall connected to the back portion at an end opposite of the terminating edge, that will be positioned against a third side edge of the mobile device;
      a battery cell;
      a wireless communication module, enclosed in the first portion, the wireless communication module configured to receive power from the battery cell;
      a processor coupled to the wireless communication module, the processor configured to receive power from the battery cell;
      an external interface coupled to the processor; and
      an internal interface positioned to connect to a device interface on the mobile device and coupled through the processor to the wireless communication module; and
   a second portion comprising:
      a fourth sidewall that will be perpendicular to the first sidewall and the second sidewall and positioned against a fourth side edge of the mobile device opposite the third side edge when the second portion is seated against the first portion; and
      an open side end, opposite the fourth sidewall, wherein the second portion slides onto the first portion through the open side end and when the second portion is seated against the first portion, the mobile device is secured in place by the back portion, the first sidewall, the second sidewall, the third sidewall, and the fourth sidewall, and the screen of the mobile device will be visible from a direction opposite the back portion.

30. The wireless communication accessory of claim 29 wherein the battery cell is enclosed in the first portion and coupled through the processor to the internal interface.

31. A wireless communication accessory or a mobile device, comprising:
   a first portion comprising:
   a back portion, against which a back of a housing of a mobile device will be placed, wherein the back portion comprises a terminating edge;
   a first sidewall connected to the back portion that will be positioned against a first side edge of the mobile device; and
   a second sidewall connected to the back portion at an end opposite the first sidewall that will be positioned against a second side edge of the mobile device;

a second portion comprising:
a third sidewall that will be perpendicular to the first all and the second sidewall and positioned against a third side edge of the mobile device when the second portion is seated against the first portion;
an open side end, opposite of the third sidewall, wherein the second portion slides onto the first portion through the open side end and when the second portion is seated against the first portion, the mobile device is secured in place by the back portion, the first sidewall, the second sidewall, and the third sidewall, and the screen of the mobile device will be visible from a direction opposite the back portion;
a battery cell;
a processor configured to receive power from the battery cell;
a wireless communication module coupled to the processor, the wireless communication module configured to receive power from the battery cell;
an internal interface positioned to connect to a device interface on the mobile device and coupled through the processor to the wireless communication module; and
an external interface coupled to the processor.

32. The wireless communication accessory of claim 31 wherein the first portion and second portion are communicatively coupled when the second portion is seated against the first portion.

33. The wireless communication accessory of claim 32 wherein the battery cell is enclosed in the first portion and communicatively coupled through the processor to the internal interface when the second portion is seated against the first portion.

\* \* \* \* \*

UNITED STATES PATENT AND TRADEMARK OFFICE
CERTIFICATE OF CORRECTION

| | | |
|---|---|---|
| PATENT NO. | : 9,123,935 B2 | Page 1 of 2 |
| APPLICATION NO. | : 13/492785 | |
| DATED | : September 1, 2015 | |
| INVENTOR(S) | : Daniel Huang | |

It is certified that error appears in the above-identified patent and that said Letters Patent is hereby corrected as shown below:

In the specification

In column 2 at line 64, Change "device" to --device.--.

In column 3 at line 29, Change "e" to --the--.

In column 5 at line 5, Change "no" to --so--.

In column 6 at line 44, Change "cents)" to --cell(s)--.

In column 6 at line 50, Change "and or" to --and/or--.

In column 8 at line 30, Change "conditioning," to --conditioning, lighting,--.

In column 9 at line 35, Change "abridge" to --a bridge--.

In column 15 at line 62, Change "processing" to --processing circuit--.

In column 17 at line 55, Change "2402," to --2402--.

In column 19 at line 20, Change "Symbian" to --Symbian OS™,--.

In column 19 at line 21, Change "Maeme™." to --Maemo™.--.

In column 20 at line 15, Change "3114," to --3414,--.

In column 20 at line 42, Change "3401" to --3404--.

In column 20 at line 49, Change "iPhone" to --iPhone OS™,--.

In column 23 at line 3, Change "1512." to --3512.--.

In column 23 at line 49, Change "comunication" to --communication--.

In column 25 at line 60, Change "easing" to --casing--.

In column 26 at line 46, Change "(e,g," to --(e.g.,--.

In column 27 at line 28, Change "2312," to --2312--.

In column 27 at line 45, Change "fire" to --the--.

In column 29 at line 61, Change "1650." to --4650.--.

In column 31 at line 44, Change "1920" to --4920--.

Signed and Sealed this
Twenty-sixth Day of April, 2016

Michelle K. Lee
*Director of the United States Patent and Trademark Office*

CERTIFICATE OF CORRECTION (continued)
U.S. Pat. No. 9,123,935 B2

In the specification

In column 33 at line 16, Change "be" to --may be--.

In column 33 at line 46, Change "and or" to --and/or--.

In the claims

In column 37 at line 2, In Claim 31, change "all" to --sidewall--.